US007146286B2

(12) United States Patent
Takeda et al.

(10) Patent No.: US 7,146,286 B2
(45) Date of Patent: Dec. 5, 2006

(54) MONITORING SYSTEM, INFORMATION PROCESSING APPARATUS AND METHOD, RECORDING MEDIUM, AND PROGRAM

(75) Inventors: Naoki Takeda, Tokyo (JP); Tetsujiro Kondo, Tokyo (JP); Yasuhiro Fujimori, Kanagawa (JP); Naoki Kobayashi, Tokyo (JP); Yoshinori Watanabe, Kanagawa (JP); Tsuyoshi Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/938,519

(22) Filed: Sep. 13, 2004

(65) Prior Publication Data

US 2005/0143954 A1 Jun. 30, 2005

(30) Foreign Application Priority Data

Sep. 19, 2003 (JP) ............................ 2003-328266

(51) Int. Cl.
*G05B 23/00* (2006.01)

(52) U.S. Cl. ...................... 702/127; 702/188; 340/506; 340/517; 340/522; 340/541

(58) Field of Classification Search .................... None
See application file for complete search history.

(56) References Cited

U.S. PATENT DOCUMENTS 4,772,875 A * 9/1988 Maddox et al. ............. 340/522
6,127,926 A * 10/2000 Dando ........................ 340/541
6,972,676 B1 * 12/2005 Kimmel et al. ............. 340/506
6,977,585 B1 * 12/2005 Falk et al. .................. 340/506
2002/0167590 A1 * 11/2002 Naidoo et al. .............. 348/155
2002/0196140 A1 * 12/2002 Streetman et al. .......... 340/523
2003/0025599 A1 * 2/2003 Monroe ...................... 340/531

OTHER PUBLICATIONS

U.S. Appl. No. 10/918,338, filed Aug. 16, 2004, Kondo et al.
U.S. Appl. No. 10/938,519, filed Sep. 13, 2004, Takeda et al.

* cited by examiner

*Primary Examiner*—Marc S. Hoff
*Assistant Examiner*—Manuel L. Barbee
(74) *Attorney, Agent, or Firm*—Oblon, Spivak, McClelland, Maier & Neustadt, P.C.

(57) ABSTRACT

A multi-sensor camera compares status describing data which is described based on a determining rule and sensor data outputted from a microwave sensor with a notification determining table sent from a processing box. If it is determined that an event is notified, the multi-sensor camera sends notifying image data to the processing box, and presents the sent data on a presenting unit. A user inputs, based on a predetermined detecting condition, the determination on the notification need of the event detected based on the sensor data outputted from the sensor. A unit for learning the determining rule adjusts the predetermined condition used for the detection based on the input determination and the feature of the event, and updates the notification determining table so as to notify the event which needs the notification and prevent the notification of unnecessary event.

28 Claims, 28 Drawing Sheets

| | | CLOSE | |
|---|---|---|---|
| | | RESPONSE | NO RESPONSE |
| APART | RESPONSE | STATUS NO. 1 OR 2 | STATUS NO. 2 |
| | NO RESPONSE | STATUS NO. 1 | STATUS NO. 0 |

MONITORING SYSTEM, INFORMATION PROCESSING APPARATUS AND METHOD, RECORDING MEDIUM, AND PROGRAM

BACKGROUND OF THE INVENTION

1. Field of the Invention

The present invention relates to a monitoring system, information processing apparatus and method, a recording medium, and a program. More particularly, the present invention relates to a monitoring system, information processing apparatus and method, a recording medium, and a program, in which necessary event is simply presented without fail in response to user's request and the power consumption is suppressed.

2. Description of the Related Art

Conventionally, Japanese Unexamined Patent Application Publication No. 2000-348265 (Patent document 1) suggests a monitoring apparatus comprising a microwave sensor and an image sensor, wherein a person who intrudes into a monitoring area is detected based on outputs from both the microwave sensor and the image sensor.

However, an ultrasonic sensor using the Doppler effect has an unstable output depending on conditions due to the characteristics of the sensor. In the monitoring apparatus disclosed in Japanese Unexamined Patent Application Publication No. 2000-348265 (Patent Document 1), the countermeasure is not considered and there is a problem that the detecting precision of the intruder deteriorates.

Further, according to Japanese Unexamined Patent Application Publication No. 2000-348265 (Patent Document 1), although a determining condition on the person's invasion in the monitoring area is decided, it is determined that the human body intrudes into the monitoring area and then the fact is notified irrespective of an action pattern of the intruder. Therefore, an event which is not necessary for a user is notified and unnecessary power is consumed.

The present invention is devised in consideration of the above-mentioned situation, and it is an object of the present invention to simply present an event necessary for the user without fail and to suppress the power consumption.

SUMMARY OF THE INVENTION

According to the present invention, a monitoring system comprises: a first sensor which outputs first data based on the monitoring operation of a monitoring area; a second sensor which outputs second data based on the monitoring operation of the monitoring area; event detecting means which detects the status of an event in the monitoring area based on a preset detecting condition from the first data outputted from the first sensor; notifying control means which controls the notification of the event based on the status of the event which is detected by the event detecting means; presenting control means which controls the presenting operation of the second data which is outputted from the second sensor on the event that is controlled to be notified by the notifying control means; input obtaining means which obtains an input for estimating whether or not the notification of a user is necessary for the second data presented under the control of the presenting control means; and detecting condition adjusting means which adjusts the detecting condition based on feature data indicating the feature of the event on the basis of the event status and the input for estimating whether or not the notification obtained by the input obtaining means is necessary.

The detecting condition adjusting means adjusts the detecting condition based on not only the feature data of the event and the input for estimating whether or not the notification is necessary but also the first data on the event.

The monitoring system further comprises: determining information generating means which generates determining information that determines, based on the event status and the input for estimating whether or not notification is necessary, whether or not the notification of the event is necessary, and the notifying controls means controls the event notification based on the determining information.

When the estimation for the event that the notification is necessary from the user, obtained from the input obtaining means, does not match the determining result based on the determining information that the notification for the event is necessary, the detecting condition adjusting means adjusts the detecting condition to a condition for detecting the status of the first sensor from the smaller change of the first data outputted from the first sensor.

The monitoring system further comprises: storing means which correlates the first data on the event, the feature data of the event, and the input for estimating whether or not notification is necessary with each other. The detecting condition adjusting means adjusts the detecting condition, based on the feature data of the event and the input for estimating whether or not the notification is necessary which are stored by the storing means and the first data on the event stored by the storing means, so that the estimation on notification need of the even from the user obtained by the input obtaining means matches the determining result based on the determining information that the event notification is necessary.

The detecting condition adjusting means updates the feature data of the event stored by the storing means, based on the first data on the event stored by the storing means and the detecting condition adjusted by the detecting condition adjusting means, and the determining information generating means generates the determining condition, based on the feature data of the updated event and the input for estimating whether or not the notification is necessary, which is stored by the storing means.

The first sensor comprises a microwave sensor, and the second sensor comprises a camera.

The first sensor, the second sensor, the event detecting means, the presenting control means, the input obtaining means, and the detecting condition adjusting means are separately arranged to any of a first information processing apparatus and a second information processing apparatus.

The first information processing apparatus is communicated by radio with the second information processing apparatus.

The first information processing apparatus is driven by a battery.

The detecting condition is a threshold for comparing the number of the first data outputted by the first sensor for a current predetermined period, and the detecting condition adjusting means adjusts the threshold.

According to the present invention, a first information processing method comprises: a data obtaining step of obtaining first data based on the monitoring operation of a monitoring area by a first sensor; an event detecting step of detecting the status of an event in the monitoring area based on a preset detecting condition from the first data obtained by the processing in the data obtaining step; a notifying control step of controlling the event notification based on the status of the event which is detected by the processing in the event detecting step; a presenting control step of controlling the presenting operation of second data which is outputted based on the monitoring operation of the monitoring area by a second sensor on the event controlled to be notified by the processing in the notifying control step; an input obtaining step of inputting the estimation whether or not the notification of a user is necessary for the second data presented under the control by the processing in the presenting control step; and a detecting condition adjusting step of adjusting the detecting condition based on feature data indicating the feature of the event on the basis of the event status and the input for estimating whether or not the notification is necessary, obtained by the processing in the input obtaining step.

According to the present invention, a first program recorded to a recording medium comprises: a data obtaining step of obtaining first data based on the monitoring operation of a monitoring area by a first sensor; an event detecting step of detecting the status of an event in the monitoring area based on a preset detecting condition from the first data obtained by the processing in the data obtaining step; a notifying control step of controlling the event notification based on the status of the event which is detected by the processing in the event detecting step; a presenting control step of controlling the presenting operation of second data which is outputted based on the monitoring operation of the monitoring area by a second sensor on the event controlled to be notified by the processing in the notifying control step; an input obtaining step of inputting the estimation whether or not the notification of a user is necessary for the second data presented under the control by the processing in the presenting control step; and a detecting condition adjusting step of adjusting the detecting condition based on feature data indicating the feature of the event on the basis of the event status and the input for estimating whether or not the notification is necessary, obtained by the processing in the input obtaining step.

According to the present invention, a first program comprises: a data obtaining step of obtaining first data based on the monitoring operation of a monitoring area by a first sensor; an event detecting step of detecting the status of an event in the monitoring area based on a preset detecting condition from the first data obtained by the processing in the data obtaining step; a notifying control step of controlling the event notification based on the status of the event which is detected by the processing in the event detecting step; a presenting control step of controlling the presenting operation of second data which is outputted based on the monitoring operation of the monitoring area by a second sensor on the event controlled to be notified by the processing in the notifying control step; an input obtaining step of inputting the estimation whether or not the notification of a user is necessary for the second data presented under the control by the processing in the presenting control step; and a detecting condition adjusting step of adjusting the detecting condition based on feature data indicating the feature of the event on the basis of the event status and the input for estimating whether or not the notification is necessary, obtained by the processing in the input obtaining step.

According to the present invention, an information processing apparatus comprises: first obtaining means which obtains feature data indicating the feature of an event based on the status of the event detected under a preset detecting condition by the monitoring operation of a monitoring area by a first sensor, and which obtains data on the event outputted by a second sensor; presenting control means which controls the presenting operation of data outputted by the second sensor obtained by the first obtaining means; second obtaining means which obtains an input for estimating whether or not the notification of a user is necessary for the data which is presented under the control of the presenting control means and which is outputted by the second sensor; and detecting condition adjusting means which adjusts the detecting condition based on the feature data of the event obtained by the first obtaining means and the input for estimating whether or not the notification is necessary, obtained by the second obtaining means.

The information processing apparatus further comprises: sending mean which sends the detecting condition to another information processing apparatus.

The information processing apparatus further comprises: determining information generating means which generates determining information for determining, based on the feature data of the event and the input for estimating whether or not the notification is necessary, whether or not the event notification is necessary.

When the estimation on notification need of the event from the user obtained by the second obtaining means for the event does not match the determining result based on the determining information that the notification of the event is necessary, the detecting condition adjusting means adjusts the detecting condition to a condition for detecting the status of the first sensor from the smaller change of the data outputted based on the monitoring operation of the monitoring area by the first sensor.

The information processing apparatus further comprises: sending means for sending the determining information to another information processing apparatus.

The first obtaining means further obtains data on the event which is outputted based on the monitoring operation of the monitoring area by the first sensor, and the detecting condition adjusting means adjusts the detecting condition based on the feature data of the event, the input for estimating of the notification need, and the data on the event which is outputted by the first sensor.

The information processing apparatus further comprises: determining information generating means which generates determining information that determines whether or not notification of the event is necessary, based on the input for estimating of the notification need and the feature data of the event; and storing means which correlates the data on the event outputted by the first sensor, the feature data of the event, and the input for estimating whether or not notification is necessary with each other. The detecting condition adjusting means adjusts the detecting condition, based on the feature data of the event and the input for estimating whether or not the notification is necessary which are stored by the storing means and the first data on the event stored by the storing means, so that the estimation whether or not the notification of the event from the user obtained by the input obtaining means matches the determining result based on the determining information that the event notification is necessary.

The detecting condition adjusting means updates the feature data of the event stored by the storing means, based on the data on the event outputted by the first sensor and stored by the storing means and the detecting condition adjusted by the detecting condition adjusting means, and the determining information generating means generates the determining condition, based on the feature data of the updated event and the input for estimating whether or not the notification is necessary, which is stored by the storing means.

The detecting condition is a threshold for comparing the number of the data outputted by the first sensor for a current predetermined period, and the detecting condition adjusting means adjusts the threshold.

According to the present invention, a second information processing method comprises: a first obtaining step of obtaining data on an event detected under a preset detecting condition and outputted by a second sensor by the monitoring operation of a monitoring area of a first sensor; a presenting control step of controlling the presenting operation of the data outputted by the second sensor and obtained by the processing in the first obtaining step; a second obtaining step of obtaining feature data indicating the feature of the event based on the status of the event which is detected by the first sensor; a third obtaining step of obtaining an input for estimating whether or not the notification of the data which is presented under the control of the processing in the presenting control step and which is outputted by the second sensor is necessary from a user; a detecting condition adjusting step of adjusting the detecting condition based on the feature data of the event obtained by the processing in the second obtaining step and the input for estimating whether or not the notification is necessary, obtained by the processing in the third obtaining step.

According to the present invention, a second program recorded to a recording medium comprises: a first obtaining step of obtaining data on an event detected under a preset detecting condition and outputted by a second sensor by the monitoring operation of a monitoring area of a first sensor; a presenting control step of controlling the presenting operation of the data outputted by the second sensor obtained by the processing in the first obtaining step; a second obtaining step of obtaining feature data indicating the feature of the event based on the status of the event which is detected by the first sensor; a third obtaining step of obtaining an input for estimating whether or not the notification of the data which is presented under the control of the processing in the presenting control step and which is outputted by the second sensor is necessary from a user; a detecting condition adjusting step of adjusting the detecting condition based on the feature data of the event obtained by the processing in the second obtaining step and the input for estimating whether or not the notification is necessary, obtained by the processing in the third obtaining step.

According to the present invention, a second program comprises a first obtaining step of obtaining data on an event detected under a preset detecting condition by a second sensor and outputted by a second sensor by the monitoring operation of a monitoring area of a first sensor; a presenting control step of controlling the presenting operation of the data outputted by the second sensor obtained by the processing in the first obtaining step; a second obtaining step of obtaining feature data indicating the feature of the event based on the status of the event which is detected by the first sensor; a third obtaining step of obtaining an input for estimating whether or not the notification of the data which is presented under the control of the processing in the presenting control step and which is outputted by the second sensor is necessary from a user; a detecting condition adjusting step of adjusting the detecting condition based on the feature data of the event obtained by the processing in the second obtaining step and the input for estimating whether or not the notification is necessary, obtained by the processing in the third obtaining step.

According to the present invention, in the monitoring system, the first information processing method, the first program recorded to the recording medium, and the first program, the first data is obtained based on the monitoring operation of the monitoring area by the first sensor, the status of the event in the monitoring area is detected from the first data based on the preset detecting condition, the event notification is controlled based on the event status, the presentation of second data on the event which is controlled to be notified outputted based on the monitoring operation of the monitoring area by a second sensor is controlled, the input for estimating whether or not the notification for the presented second data from the user is necessary is obtained, and the detecting condition is adjusted based on the feature data indicating the feature of the event based on the event status and the input for estimation whether or not the notification is necessary.

According to the present invention, in the information processing apparatus, the second information processing method, the second program recorded to the recording medium, and the second program, the data on the event detected based on the preset detecting condition by the monitoring operation of the monitoring area by the first sensor and outputted by the second sensor is obtained, the presentation of the data outputted by the second sensor is controlled, the feature data indicating the feature of the event based on the event status detected by the first sensor is obtained, the input for estimating whether or not the notification of the presented data outputted by the second sensor from the user is necessary is obtained, and the detecting condition is adjusted based on the feature data of the event and the input for estimating the notification is necessary.

DESCRIPTION OF THE PREFERRED EMBODIMENTS

A description is given of embodiments of the present invention below with reference to the drawings.

Figure 1:
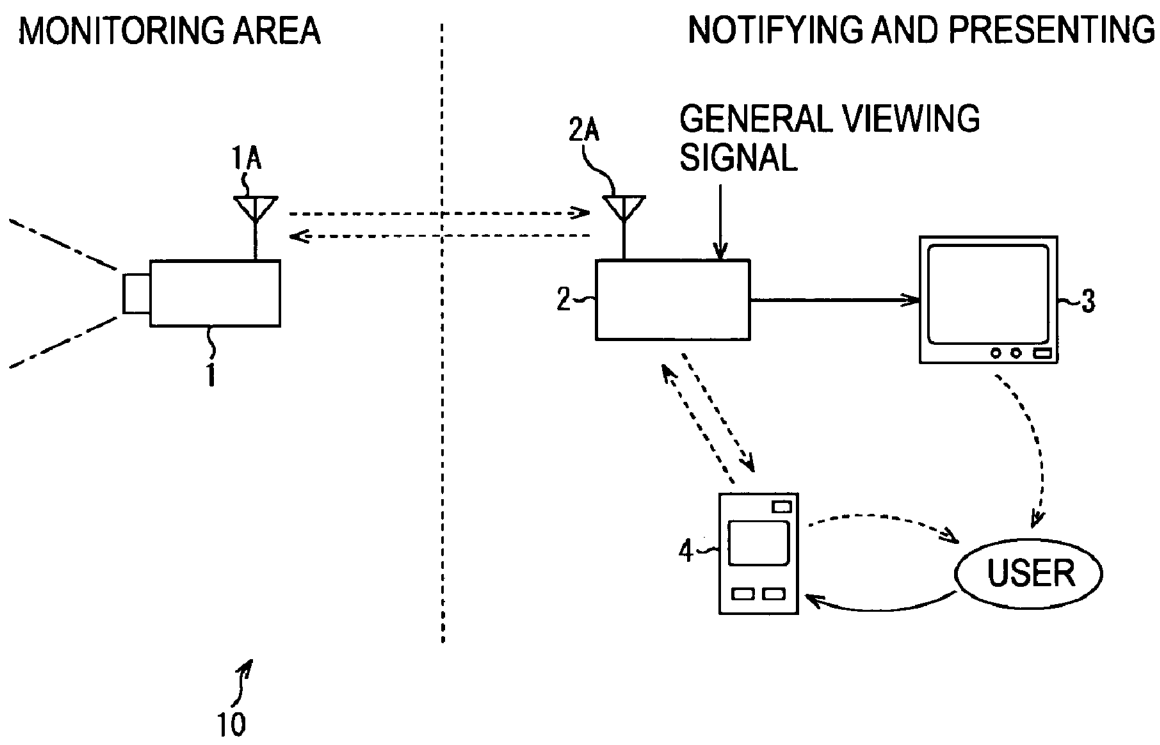
FIG. 1 is a diagram showing an example of the structure of a monitoring system according to the present invention.

FIG. 1 shows an example of the structure of a monitoring system 10 according to the first embodiment of the present invention. In the structure example, on the left side in FIG. 1, the monitoring system 10 comprises a multi-sensor camera 1 on the monitoring area side. On the right side in FIG. 1, the monitoring system 10 comprises: a processing box 2; a presenting unit 3; and a remote controller 4 for remotely controlling the processing box 2 on the notifying and presenting side. The multi-sensor camera 1 is communicated by radio with the processing box 2 via a radio antenna 1A and a radio antenna 2A. The processing box 2 is communicated by radio or by infrared with the remote controller 4. The processing box 2 is connected to the presenting unit 3 by wiring such as a bus or by wireless. The communication between the multi-sensor camera 1 and the processing box 2 is not limited to the radio communication but may be the wiring communication.

Figure 2:
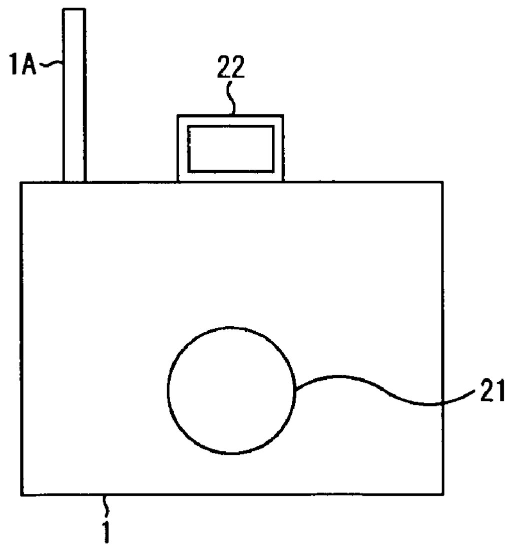
FIG. 2 is a diagram showing an example of the appearance structure of a multi-sensor camera.

The multi-sensor camera 1 is installed to an area for monitoring an event (necessary place). Referring to FIG. 2, the multi-sensor camera 1 further comprises a CCD (Charge Coupled Device) camera 21, and a microwave sensor 22. The CCD camera 21 and the microwave sensor 22 are driven by a battery (not shown).

The CCD camera 21 picks-up the image of the situation in the monitoring area (within an angle in the field of view) if necessary. Although the details thereof will be described later, the multi-sensor camera 1 determines based on the event detected by the microwave sensor 22 whether or not event data is notified. When the multi-sensor camera 1 determines that the event data is notified, the multi-sensor camera 1 sends, to the processing box 2, image data (event data) picked-up by the CCD camera 21.

Figure 3:
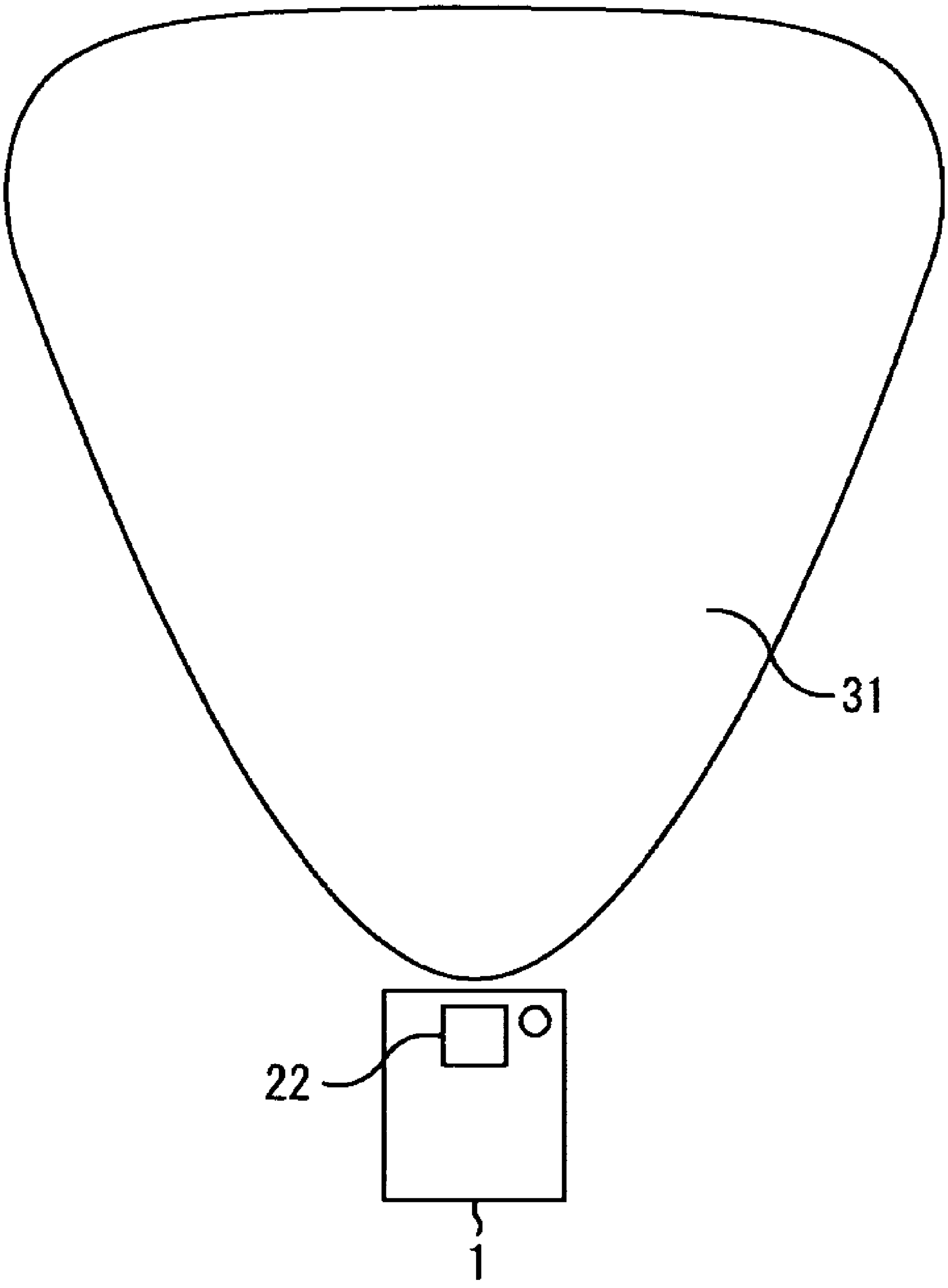
FIG. 3 is a plan view showing a monitoring area of a microwave sensor.

The microwave sensor 22 generates the microwaves. Referring to FIG. 3, the microwave sensor 22 irradiates the microwaves into an area 31 which can be monitored thereby, detects a reflecting wave upon hitting and reflecting the microwaves to a person (monitoring target), and generates sensor data indicating whether the reflecting wave advances or delays from the reference phase. The advance and delay of the phase are caused by the Doppler effect, corresponding to the close state and apart state, respectively. Hereinafter, the area 31 which can be monitored by the microwave sensor 22 is simply referred to as the monitoring area 31.

Referring back to FIG. 1, the multi-sensor camera 1 determines that the event is notified and then sends the data necessary for presenting the event to the processing box 2 via the radio antenna 1A.

The processing box 2 receives, via the radio antenna 2A, the data necessary for presenting the event sent from the multi-sensor camera 1, structures the presented image and the voice based on the received data, supplies or sends the structured data to the presenting unit 3 and the remote controller 4, and presents the event.

The presenting unit 3 is e.g., a general TV receiver. When the event is not generated (normal case), the presenting unit 3 displays a general viewing signal (video image based on a broadcasting signal). When the event is generated, the presenting unit 3 displays a picture-in-picture image in which the event image is inserted in a part of the general viewing signal. Incidentally, the presenting unit 3 is not limited to the TV receiver and may be any dedicated monitor. Further, the displayed image is not limited to the picture-in-picture image and may be an image indicating the entire screen.

A user determines the event displayed on the presenting unit 3. Based on the determining result, the user inputs various instructions from the remote controller 4. For example, when the user wants to know the generated event in the future, he/she inputs such a message as an instruction by operating an OK button (not shown). When the user does not want to know the currently-generated event in the future, he/she inputs such a message as an instruction by operating an NG button (not shown). A notification determining table (which will be described with reference to FIG. 16) is formed by the processing box 2 based on the input of the user's determination, and is used upon determining whether or not the event is notified. The notification determining table changes in accordance with the time passage. Therefore, every time the user uses the monitoring system 10, only the event desired by the user is detected and is notified.

The CCD camera 21 mounted on the multi-sensor camera 1 is operated only upon determining that the event is notified. Therefore, the unnecessary power-consumption is suppressed.

Figure 4:
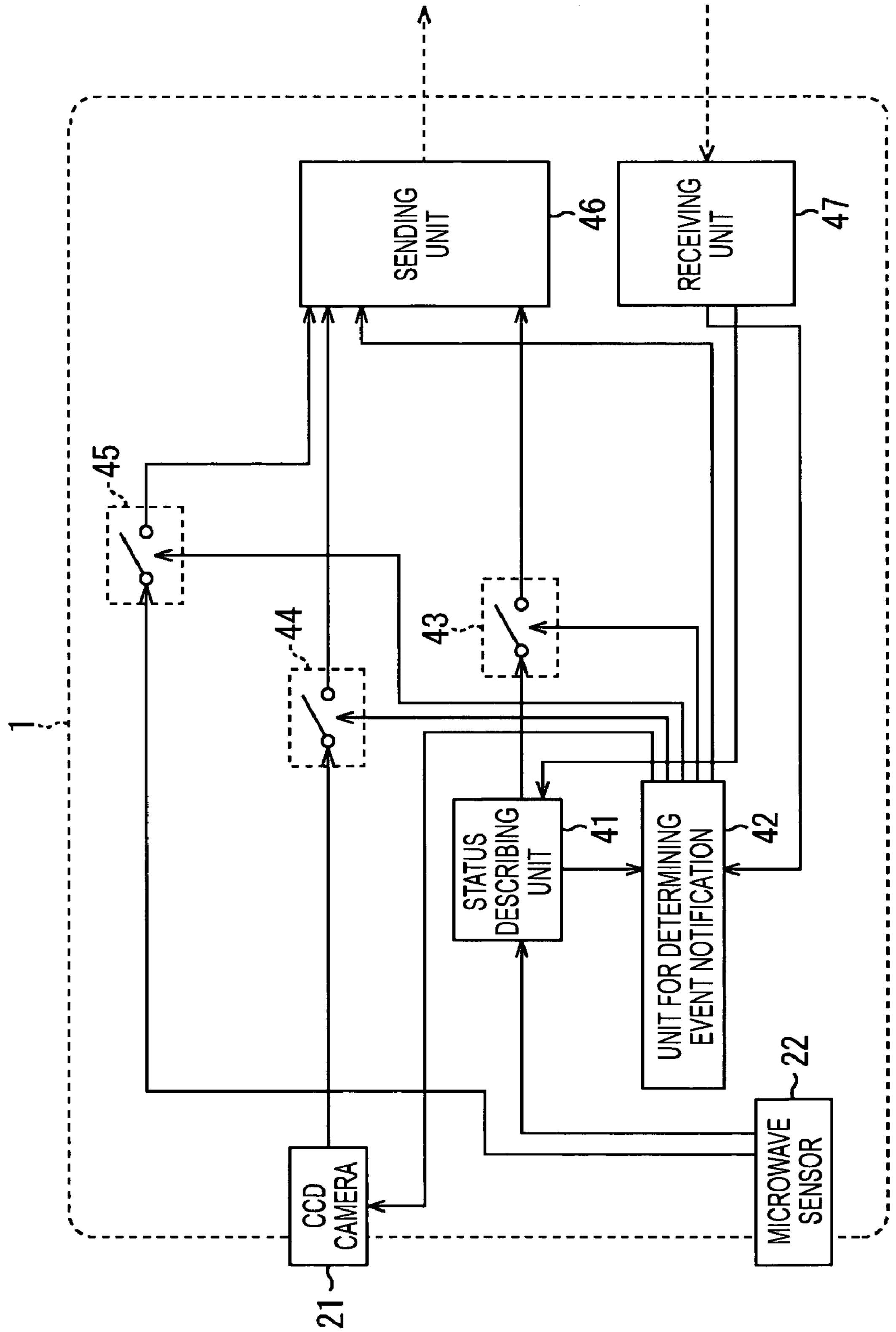
FIG. 4 is a block diagram showing an example of the functional structure of the multi-sensor camera shown in FIG. 1.
Figure 5:
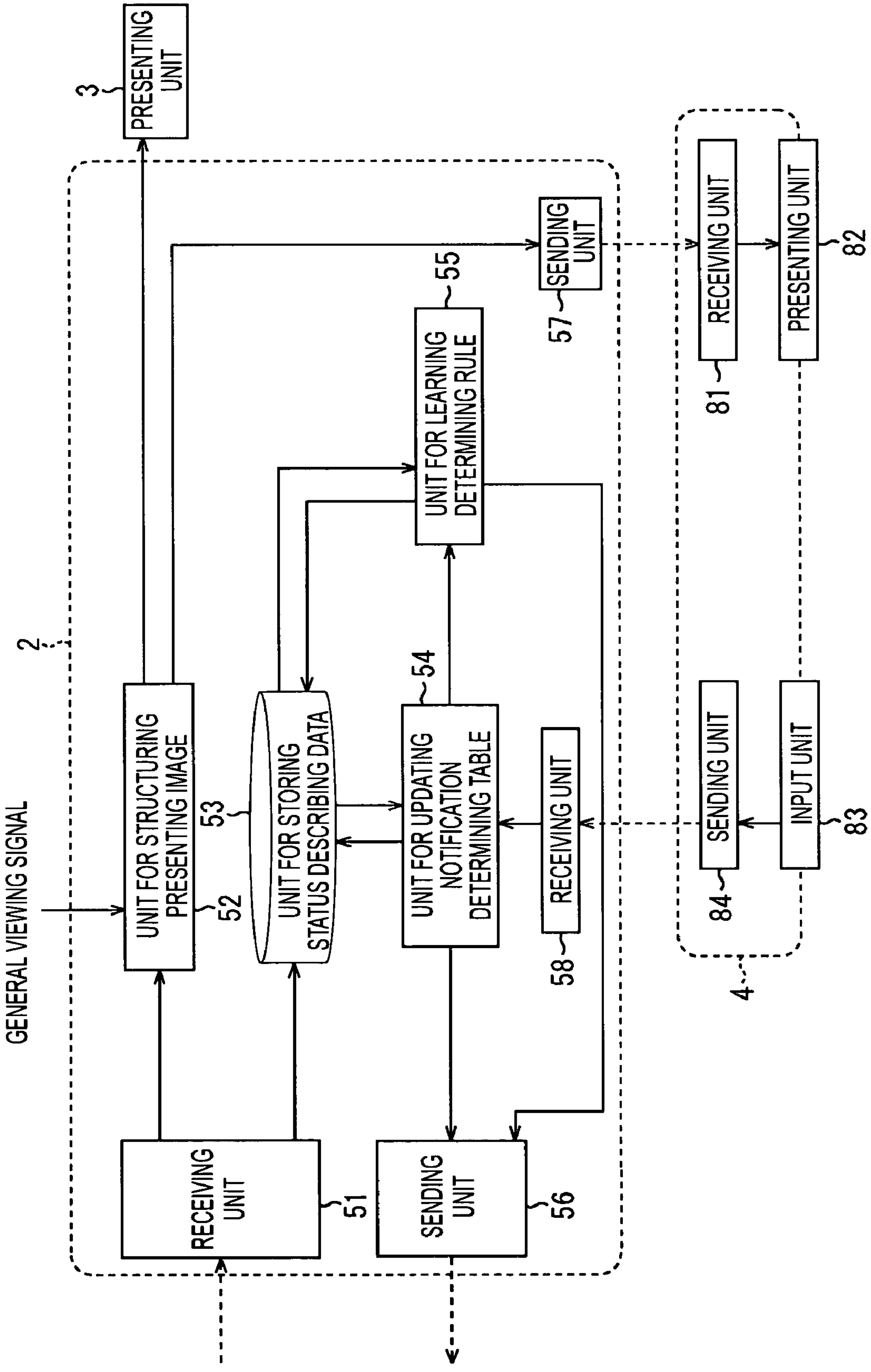
FIG. 5 is a block diagram showing an example of the functional structure of a processing box, a presenting unit, and a remote controller shown in FIG. 1.

FIGS. 4 and 5 are block diagrams showing examples of the functional structure of the monitoring system 10 shown in FIG. 1. FIG. 4 is a block diagram showing an example of the functional structure of the multi-sensor camera 1 in the monitoring system 10 shown in FIG. 1. FIG. 5 is a block diagram showing an example of the functional structure of the processing box 2, the presenting unit 3, and the remote controller 4 in the monitoring system 10 shown in FIG. 1.

First, a description is given of the example of the functional structure of the multi-sensor camera 1 in the monitoring system 10 with reference to FIG. 4.

The CCD camera 21 in the multi-sensor camera 1 picks-up an image of the situation in the monitoring area 31 if necessary, and supplies an image signal as notifying image data to a sending unit 46 via a switch 44.

The microwave sensor 22 irradiates the microwaves into the monitoring area 31 (refer to FIG. 3), and supplies, to a status describing unit 41, sensor data indicating the response of the close status and sensor data indicating the response of the apart status, as microwave sensor data.

A description is given of the principle of the microwave sensor 22 with reference to FIGS. 6 to 9B.

Figure 6:
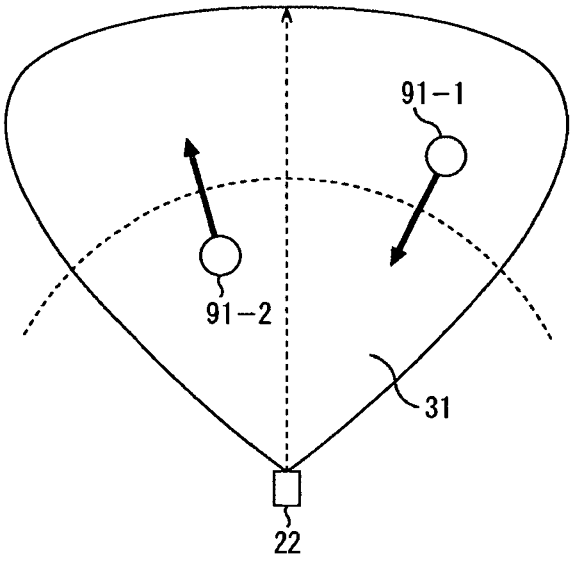
FIG. 6 is a diagram for explaining the motion of a person in the monitoring area of the microwave sensor.
Figure 7A:
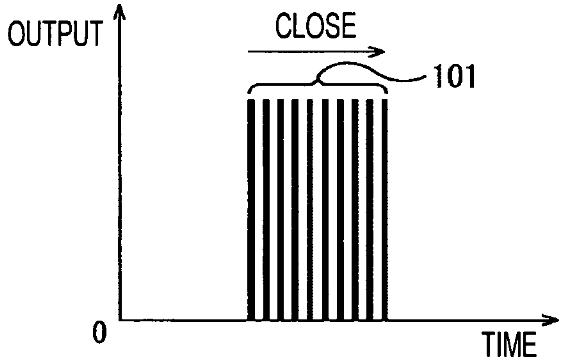
FIG. 7A is a diagram showing one example of sensor data which is outputted by the microwave sensor.
Figure 7B:
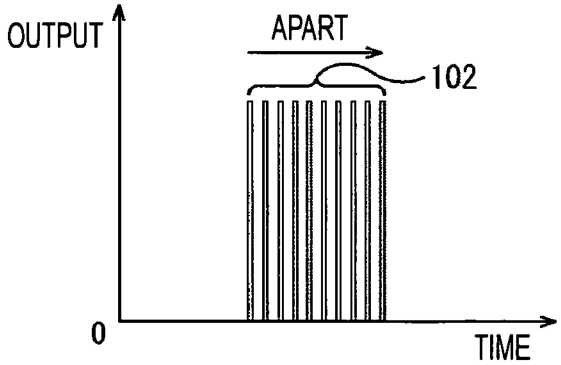
FIG. 7B is a diagram showing another example of sensor data which is outputted by the microwave sensor.

FIGS. 6 to 7B are diagrams for explaining examples of the sensor data outputted by the microwave sensor 22.

FIG. 6 schematically shows the statuses in which persons 91-1 and 91-2 are close to or apart from the microwave sensor 22 in the monitoring area 31 of the microwave sensor 22 as shown by an arrow therein. The microwave sensor 22 always irradiates the microwaves in the monitoring area 31. Referring to FIG. 6, when the person 91-1 acts so that he/she is vertically close to the circle having the center of the sensor, in accordance therewith, the microwave sensor 22 outputs sensor data (hereinafter, referred to as close response data) 101 indicating the close response as shown in FIG. 7A. When the person 91-2 acts so that he/she is vertically apart from the circle having the center of the sensor, in accordance therewith, the microwave sensor 22 outputs sensor data (hereinafter, referred to as apart response data) 102 indicating the apart response as shown in FIG. 7B. Referring to FIGS. 7A and 7B, the ordinate denotes the output level of the sensor data outputted by the microwave sensor 22, and the abscissa denotes the time. The close response data 101 and the apart response data 102 are binary outputs.

Figure 8A:
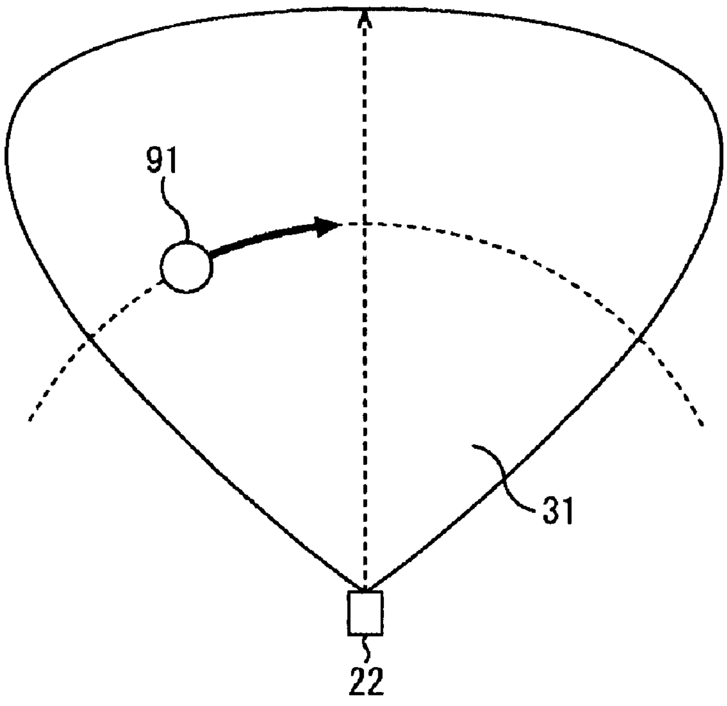
FIG. 8A is a diagram showing an example of the motion of the person in the monitoring area of the microwave sensor.
Figure 8B:
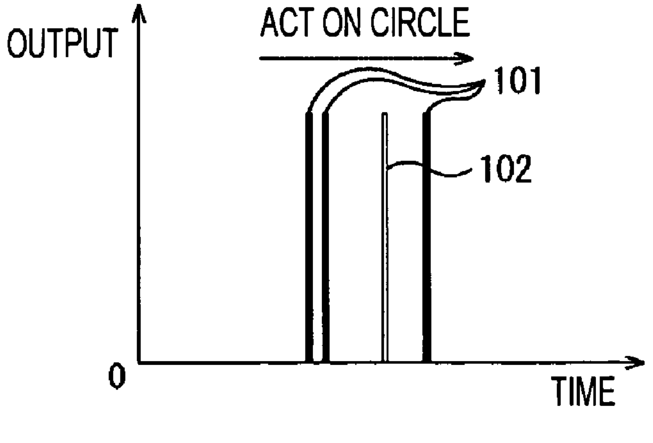
FIG. 8B is a diagram showing an example of the sensor data which is outputted by the microwave sensor for the person's motion in the monitoring area of the microwave sensor.

FIG. 8A and FIG. 8B are diagrams for explaining another example of the sensor data outputted by the microwave sensor 22.

FIG. 8A schematically shows the state in which the person 91 acts in a direction shown by an arrow in the diagram on the circle having the center of the sensor in the monitoring area 31 of the microwave sensor 22. As mentioned above, the microwave sensor 22 always irradiates the microwaves in the monitoring area 31. Referring to FIG. 8A, when the person 91 moves on the circle having the center of the sensor, in accordance therewith, the microwave sensor 22 outputs sensor data as shown in FIG. 8B. In the other example, the microwave sensor 22 irregularly outputs the close response data 101 and the apart response data 102 (outputs the sensor data of the unstable response).

Figure 9A:
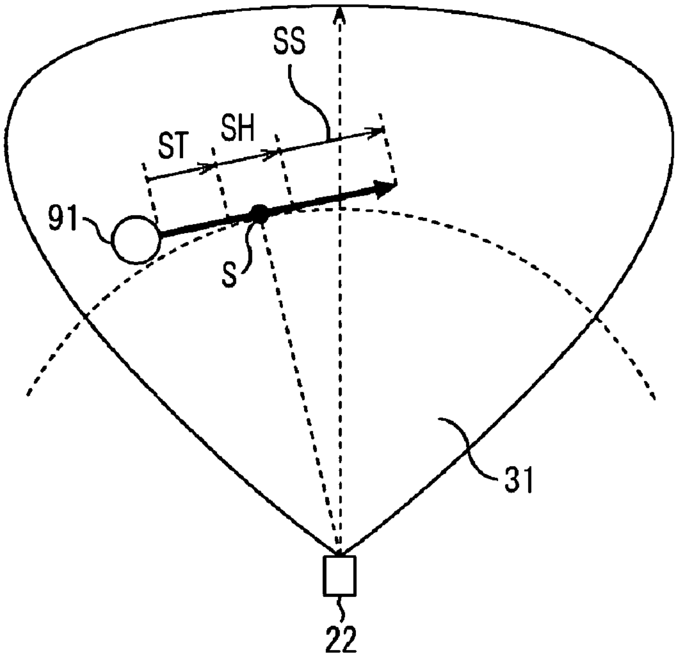
FIG. 9A is a diagram showing an example of the person's motion in the monitoring area of the microwave sensor.
Figure 9B:
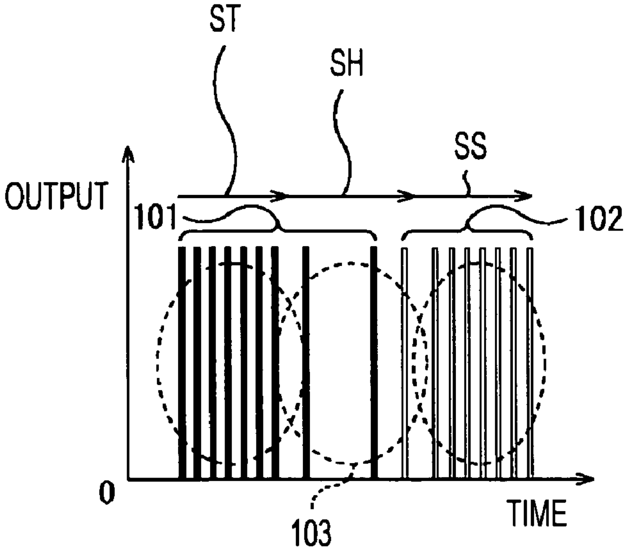
FIG. 9B is a diagram showing an example of the sensor data which is outputted by the microwave sensor for the person's motion in the monitoring area of the microwave sensor.

FIGS. 9A and 9B are diagrams for explaining another example of the sensor data outputted by the microwave sensor 22.

FIG. 9A schematically shows the state in which the person 91 moves in the direction parallel with the tangent of the circle near the circle having the center of the sensor in the monitoring area 31 of the microwave sensor 22. As mentioned above, the microwave sensor 22 always irradiates the microwaves in the monitoring area 31. Referring to FIG. 9A, when the person 91 moves near the tangent of the circle having the center of the sensor, in accordance therewith, the microwave sensor 22 outputs sensor data as shown in FIG. 9B. In the other example, before a point ST of a tangent point S of the circle (before passing through the point S), the microwave sensor 22 outputs the close response data 101. At a point SH near the tangent point S of the circle, the microwave sensor 22 outputs both the close response data 101 and the apart response data 102 (outputs the sensor data 103 indicating the unstable response). At a point SS after the tangent point S of the circle (after passing throaty the tangent S), the microwave sensor 22 outputs the apart response data 102.

Although not shown, as the person 91 is apart from the tangent point S of the circle (far from the microwave sensor 22), the sensor data outputted by the microwave sensor 22 indicates the unstable response and, and finally, becomes no response.

Referring back to FIG. 4, the status describing unit 41 describes data on the status of a series of actions (sensor response) of the person 91 in the monitoring area 31 (hereinafter, referred to as status describing data) based on the microwave sensor data supplied from the microwave sensor 22, supplies the described data to a unit 42 for determining the event notification, and further supplies the data to a sending unit 46 via a switch 43.

Here, a description is given of the status describing data which is described by the status describing unit 41 with reference to FIGS. 10 to 15.

As described above with reference to FIGS. 6 to 9B, upon observing the sensor data outputted from the microwave sensor 22 for a short time, the reliability is low. For example, even when the sensor data indicates the close response, it is not determined whether the close response is outputted in accordance with a part of the stably close movement or is a part of the unstable response. The action of the person 91 is not estimated. Then, it is necessary to observe the sensor data outputted from the microwave sensor 22 for a some time (the some time is, in other words, a time with some degree of length) (to determine the status of the microwave sensor 22 based on the number of outputs of the close response data 101 or apart response data 102 outputted for the some time).

The status describing unit 41 has a buffer (not shown), and stores the sensor data supplied from the microwave sensor 22 into the buffer. By determining whether or not the number of the close response data 101 and the number of apart response data 102 stored for a current predetermined time (hereinafter, referred to as a buffer size) is a predetermined threshold (hereinafter, referred to as a response threshold so as to identify the predetermined threshold from another threshold) or more among the microwave sensor data stored in the buffer, the status describing unit 41 determines whether he microwave sensor 22 indicates the close response or the apart response. Hereinafter, the buffer size and the response threshold for determining the response of the microwave sensor 22 are referred to as a determining rule. The determining rule is a detecting condition for detecting whether or not the event is generated in the monitoring area 31. The feedback from the user is reflected to the determining rule, thereby accurately detecting the event.

Figures 10, 11:
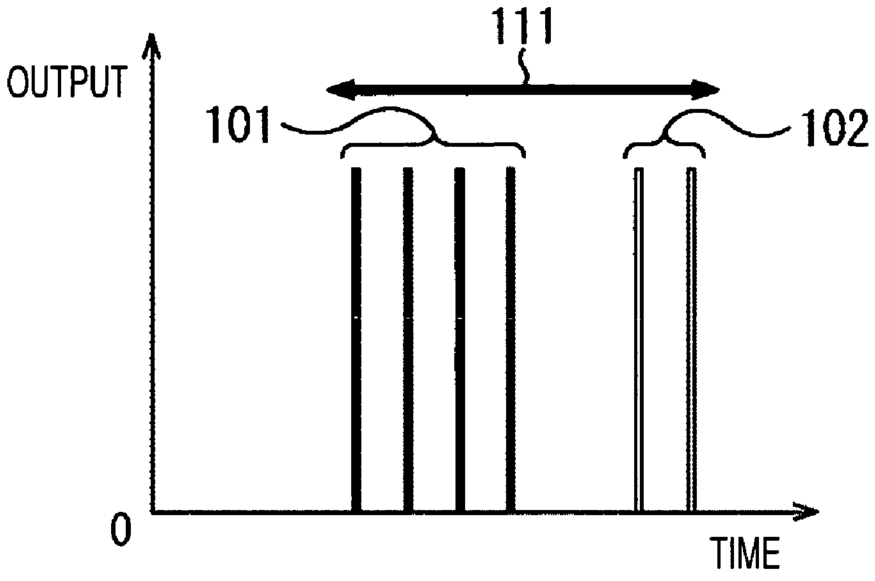
FIG. 10 is a diagram showing an example of the sensor data which is outputted by the microwave sensor.
FIG. 11 is a diagram showing an example of a status number (status No.) of the microwave sensor, which is described in accordance with the person's motion.

FIG. 10 is a diagram showing an example of the sensor data of the microwave sensor 22 inputted to the status describing unit 41. A period shown by an arrow 111 is the buffer size. When the status describing unit 41 determines the response of the microwave sensor 22 at the time point for inputting the apart response data 102 in the buffer of the status describing unit 41, the status describing unit 41 determines the response of the microwave sensor 22 based on the number of the microwave sensor data stored in the buffer for the period shown by the arrow 111 (hereinafter, referred to as processing for determining the response of the microwave sensor). In this case, the number of the close response data 101 stored in the buffer for the period shown by the arrow 111 is four, and the number of the apart response data 102 stored in the buffer for the period shown by the arrow 111 is two. Therefore, when the response threshold is three, the four pieces of close response data 101 is over the response threshold as three. Then, the status describing unit 41 determines that the microwave sensor 22 indicates the close response.

FIG. 11 is a diagram showing a number indicating the detecting status of the microwave sensor 22 which is obtained by the status describing unit 41 (hereinafter, referred to as a status No.). Referring to FIG. 10, when it is determined, by the processing for determining the response of the microwave sensor, that the microwave sensor 22 indicates the close response, the status No. is one. When it is determined, by the processing for determining the response of the microwave sensor, that the microwave sensor 22 indicates the apart response, the status No. is two. When the microwave sensor 22 indicates neither the close response nor the apart response, the status No. is zero.

When both the numbers of close response data and apart response data stored in the buffer of the status describing unit 41 are equal to the response threshold or more for the current period of the buffer size and it is determined by processing for determining the response of the microwave sensor that they indicate both the close response and the apart response, the status No. is determined in accordance with the current response (type of data that is currently outputted from the microwave sensor 22). When the microwave sensor 22 indicates the currently close response (the close response data 101 is currently outputted), the status No. is one. When the microwave sensor 22 indicates the currently apart response (the apart response data 102 is currently outputted), the status No. is 2.

At the status No. 1, the continuous time thereof corresponds to the continuous time for determining the close response in the processing for determining the response of the microwave sensor of the status describing unit 41. At the status No. 2, the continuous time thereof corresponds to the continuous time for determining the apart response.

Figure 12:
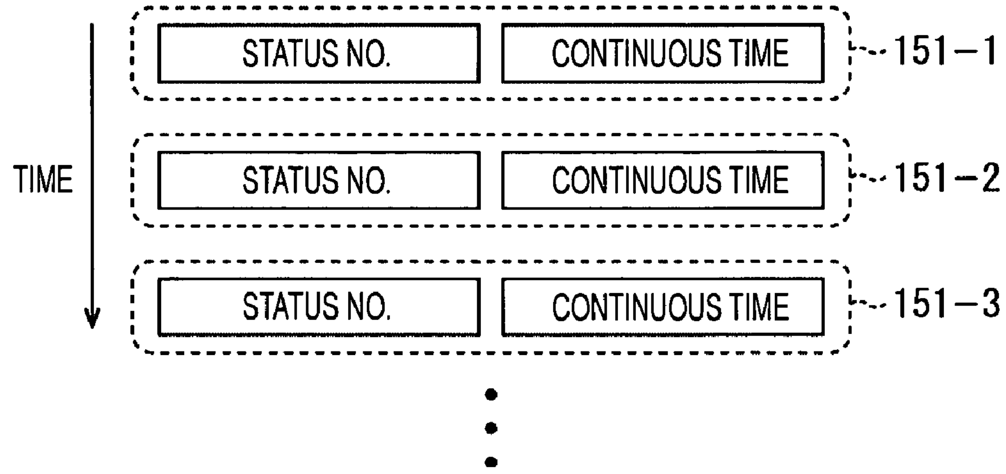
FIG. 12 is a diagram showing an example of status describing data.

FIG. 12 shows an example of the status describing data.

The status describing unit 41 describes the status No. described with reference to FIGS. 10 and 11 as the status of the microwave sensor 22. In this case, the status describing unit 41 describes the continuous time for determining the close response of the microwave sensor 22 or the continuous time for determining the apart response as the status continuous time of the status No.

That is, the status describing unit 41 sets the status No. indicating the status of the microwave sensor 22 and the continuous time as one unit. When the status Nos. which are continuously aligned on the time base are described as status describing data 151-1 to 151-n (hereinafter, when the status describing data 151-1 to 151-n are not individually identified, simply referred to as status describing data 151).

Figure 13:
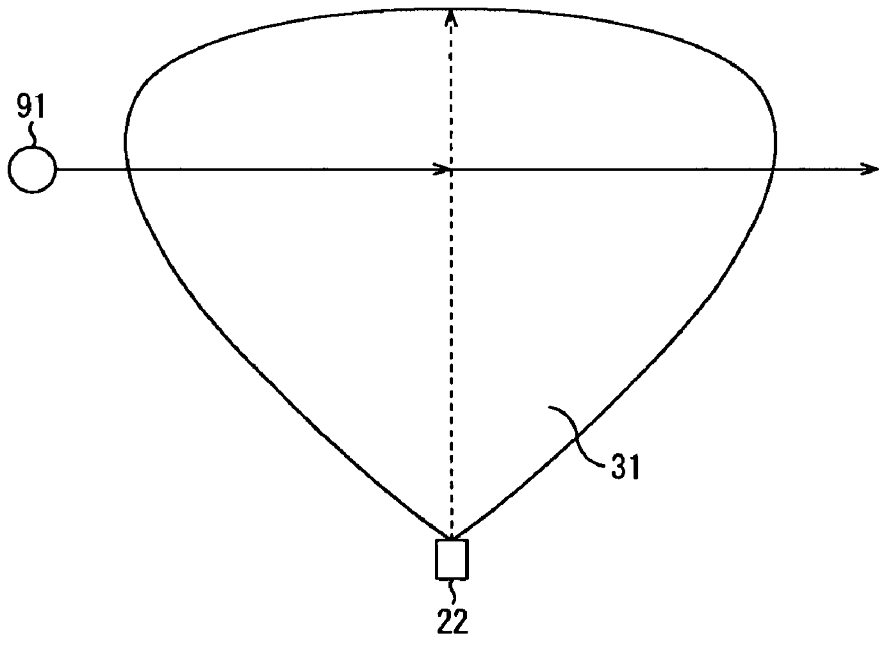
FIG. 13 is a diagram for explaining the person's motion in the monitoring area of the microwave sensor.
Figure 14:
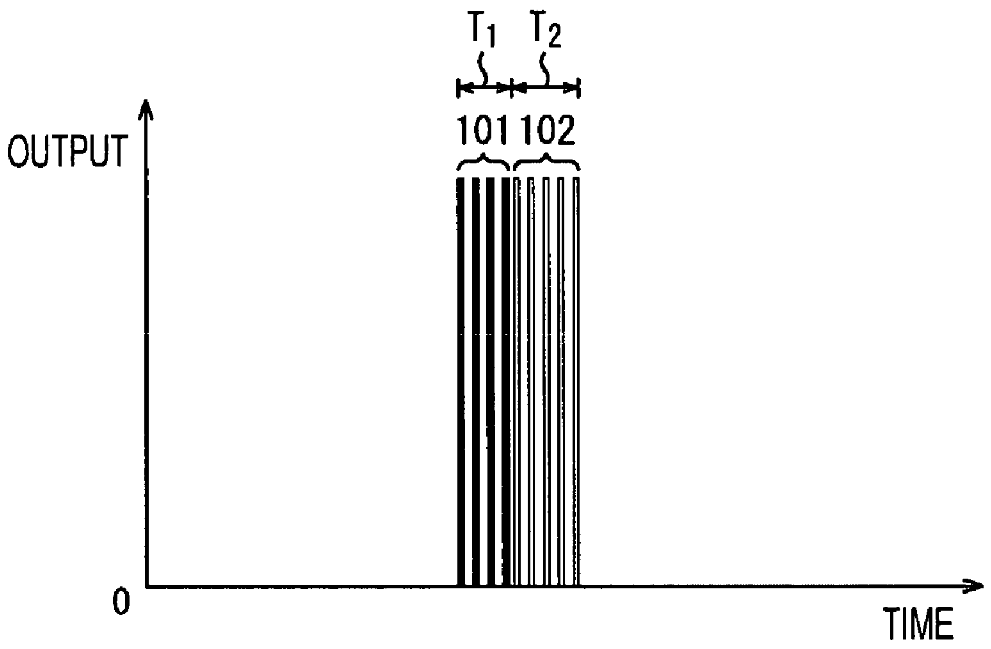
FIG. 14 is a diagram showing an example of the sensor data which is outputted by the microwave sensor.
Figure 15:
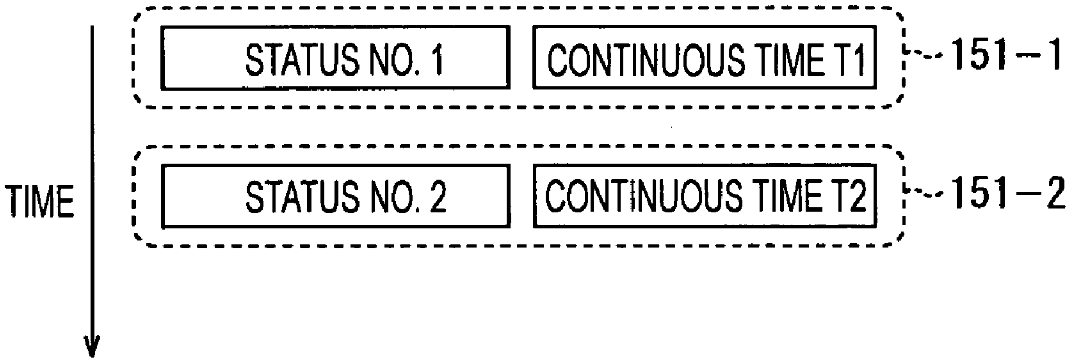
FIG. 15 is a diagram showing an example of the status describing data.

FIG. 13 schematically shows the status in which the monitoring area 31 of the microwave sensor 22 is horizontally crossed to the microwave sensor 22 in a direction shown by an arrow. In this case, referring to FIG. 14, the microwave sensor 22 outputs the close response data 101 for a period of T1 sec from the time when the person 91 intrudes into the monitoring area 31 to the time when the person 91 reaches the front of the microwave sensor 22 (in FIG. 14, as shown by a dotted line drawn in the up direction from the microwave sensor 22). Further, the microwave sensor 22 outputs the apart response data 102 for a period of T2 sec from the time when the person 91 is over the dotted arrow to the time when the person 91 exits from the monitoring area 31. In this case, the status describing unit 41 determines, based on the close reference data 101, that the microwave sensor 22 indicates the close response for the period of T1 sec. The status describing unit 41 determines, based on the apart response data 102, that the microwave sensor 22 indicates the apart response for the period of T2 sec. Referring to FIG. 15, the status describing data on the action of the person 91 (event) is sequentially described in the order of the status describing data 151-1 in which the status No. 1 and the continuous time T1 are described and the status describing data 151-2 in which the status No. 2 and the continuous time T2 are described.

As mentioned above, the status describing data indicates the feature of the event generated in the monitoring area. Further, the status describing data is observed by the processing for describing the status data of the status describing unit 41 based on the unit of period (buffer size) having some time of the response of the microwave sensor 22. If the status describing data is the unstable sensor data outputted from the microwave sensor 22 for a shorter period of the unit period, it is ignored (it is determined that the microwave sensor 22 does not respond and then the processing is performed). The detecting status of the microwave sensor 22 is simply patterned and the grouping and the determination of the same feature are easy.

Referring back to FIG. 4, the status describing unit 41 receives, from the processing box 2 via a receiving unit 47, the determining rule adjusted by the processing for learning the determining rule, which will be described later with reference to FIG. 26. Further, the status describing unit 41 describes the above-mentioned status describing data 151 based on the determining rule.

The unit 42 for determining the event notification executes the processing for determining the event notification, which will be described with reference to FIG. 17, based on the status describing data 151 (refer to FIG. 12) supplied from the status describing unit 41 and the notification determining table (which will be described with reference to FIG. 16) received from the processing box 2 via the receiving unit 47. When the unit 42 for determining the event notification determines that the event is notified, the unit 42 for determining the event notification supplies a notifying event generating signal to the sending unit 46, supplies a power control signal to the CCD camera 21 so as to turn on the power of the CCD camera 21, supplies a control signal for sending the status describing data to the switch 43 so as to turn on the switch 43, and supplies a control signal for sending a notifying image to the switch 44 so as to turn on the switch 44. Thus, the notifying image data outputted from the CCD camera 21 is supplied to the sending unit 46 via the switch 44, and the status describing data 151 outputted from the status describing unit 41 is supplied to the sending unit 46 via the switch 43.

During a period for which the processing box 2 performs processing for learning the determining rule (hereinafter, referred to as a period for learning the determining rule), when the unit 42 for determining the event notification determines that the event is notified, the unit 42 for determining the event notification supplies a control signal for sending the sensor data to a switch 45 so as to turn on the switch 45, and the microwave sensor 22 supplies the sensor data to the sending unit 46 via the switch 43.

During the period for learning the determining rule, the unit 42 for determining the event notification performs the above-mentioned processing for notifying the event from the time point for determining that the microwave sensor 22 outputs the close response data 101 or the apart response data 102, irrespective of the normal processing. for determining the event notification.

The unit 42 for determining the event notification receives a notification for fixing the determining rule from the processing box 2 via the receiving unit 47 upon ending the period for learning the determining rule, and recognizes the end of the period for learning the determining rule.

Figure 16:
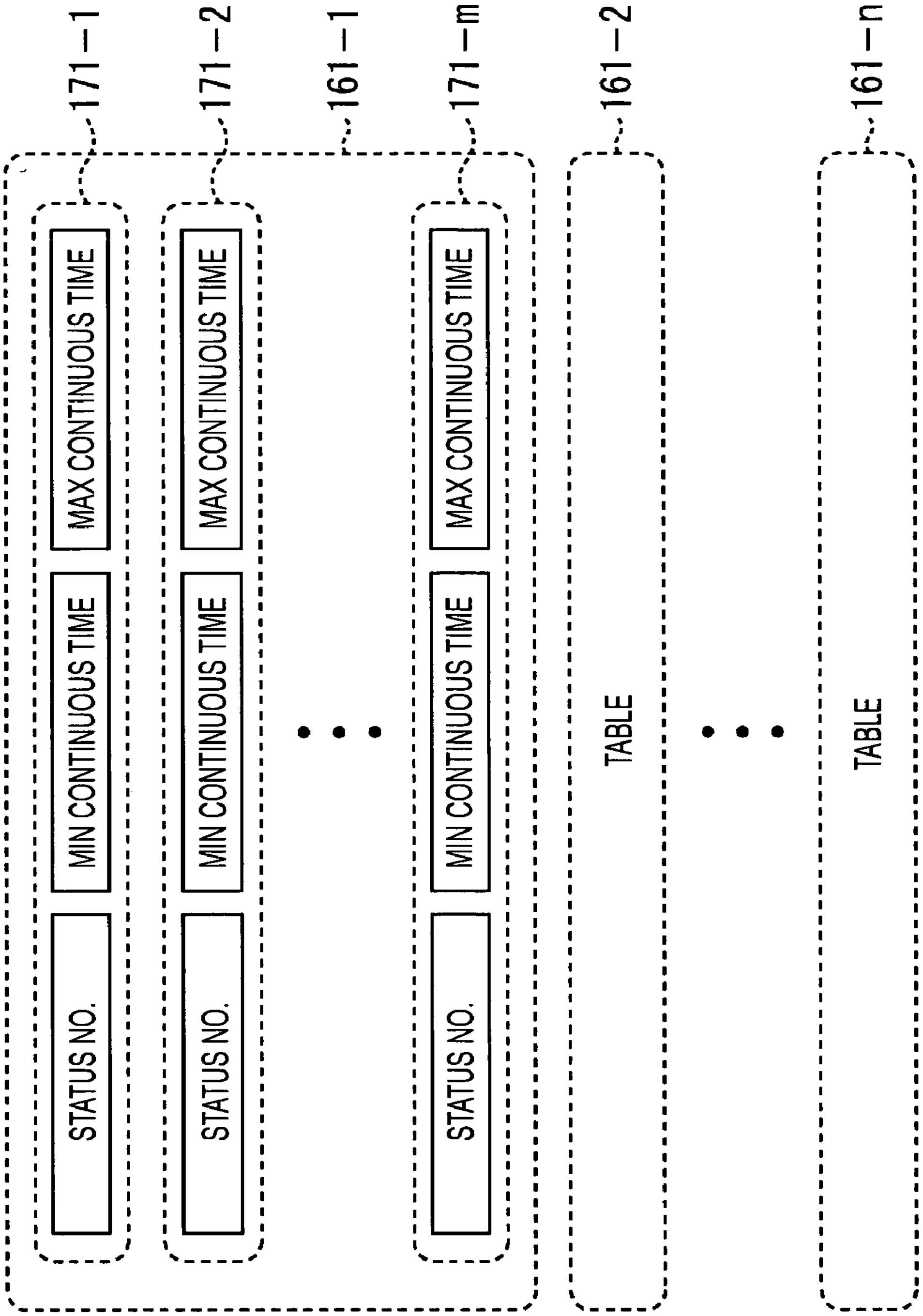
FIG. 16 is a diagram showing an example of a notification determining table.
Figure 17:
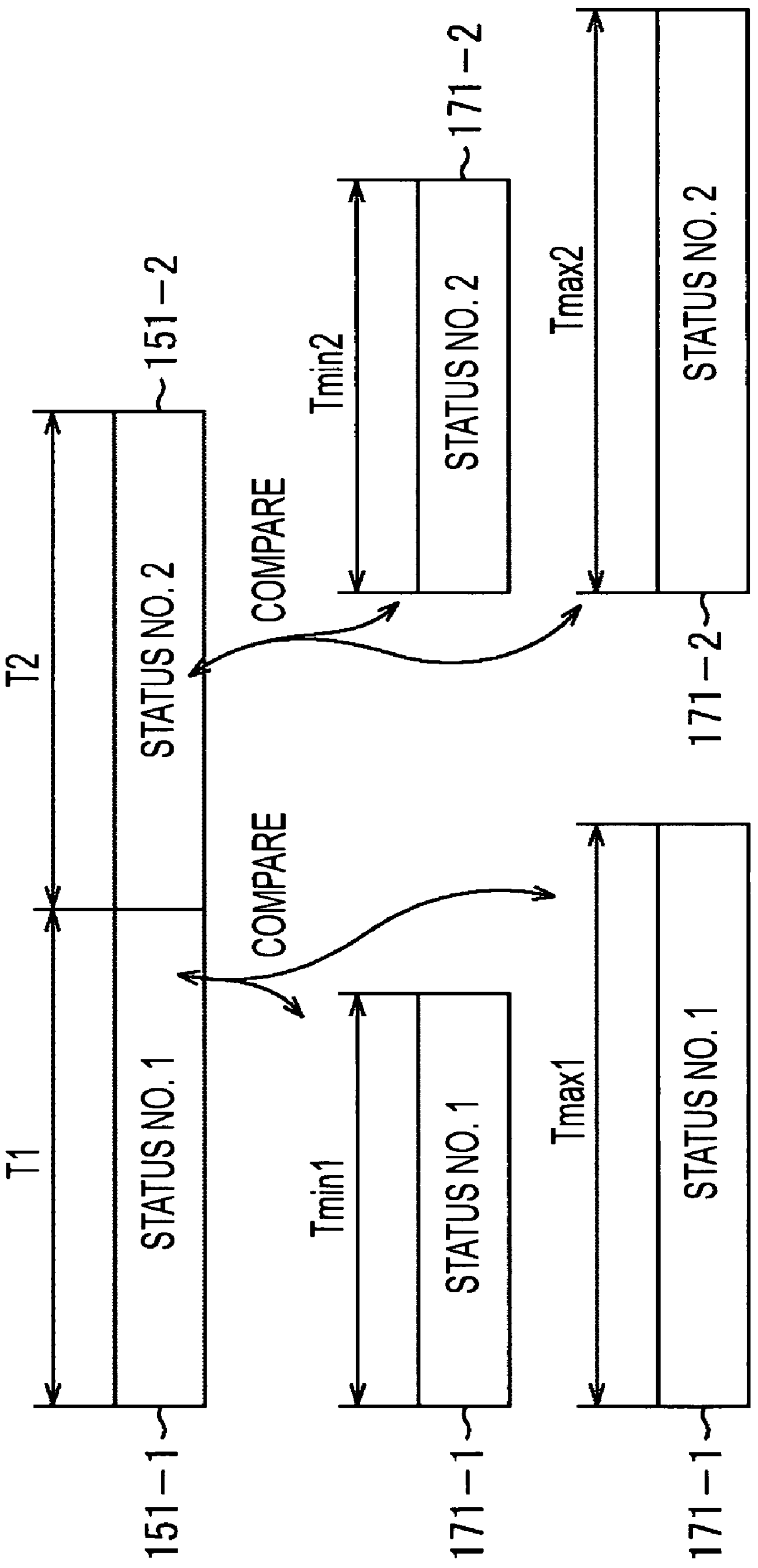
FIG. 17 is a diagram for explaining the processing for determining the event notification.

A description is given of an example of the notification determining table and the processing for determining the event notification with reference to FIGS. 16 and 17.

First, an example of the notification determining table will be described with reference to FIG. 16.

Event patterns unnecessary for the notification to the user are registered in the notification determining table. Referring to FIG. 16, the status No. of the microwave sensor 22 and the maximum and minimum continuous times at the status No. are prescribed to one piece of the status describing data. The person's action comprising status describing data 171-1 to 171-m is prescribed in one notification determining table. Notification determining tables comprising notification determining tables 161-1 to 161-n are formed and are updated by a unit 54 for updating the notification determining table in the processing box 2 shown in FIG. 5, and are supplied to the unit 42 for determining the event notification.

Hereinafter, when the status describing data 171-1 to 171-m is not individually identified, it is referred to as status describing data 171. When the notification determining tables 161-1 to 161-n is not individually identified, it is referred to as notification determining tables 161. A temporary notification determining table stored in a unit 215 for storing the temporary notification determining table shown in FIG. 18, which will be described later, has the same format as that of the notification determining table 161 mentioned above. It is referred to as the temporary notification determining table below and in FIG. 16.

Next, a description is given of an example of the processing for determining the event notification with reference to FIG. 17.

Referring to FIG. 17, when the status describing data 151-1 comprising the status No. 1 and the continuous time T1 and the status describing data 151-2 comprising the status No. 2 and the continuous time T2 are described in the status describing data of the event whose notification is determined as the necessary event or unnecessary event, the pattern having the order of the status Nos. 1 and 2 is compared with the pattern having the order of the status Nos. included in the status describing data 171 in the notification determining table 161 (refer to FIG. 16). If the pattern does not match it, it is determined that the event is not prescribed in the notification determining table 161 (notifying event).

On the contrary, when the notification determining table 161 matches the pattern of the status Nos. 1 and 2, referring to FIG. 17, it is determined whether or not the continuous time T1 of the status describing data 151-1 is within a range of a minimum continuous time Tmin1 to a maximum continuous time Tmax1 of the status describing data 171-1 of the notification determining table 161 (Tmin1≦T1≦Tmax1). Further, it is determined whether or not the continuous time T2 of the status describing data 151-2 is within a range of a minimum continuous time Tmin2 to a maximum continuous time Tmax2 of the status describing data 171-2 of the notification determining table 161 (Tmin2≦T2≦Tmax2). If at least one of the continuous time T1 and the continuous time T2 is not within the range, it is determined that the event is not the event prescribed by the notification determining table 161 (notifying event).

On the contrary, when the continuous time T1 of the status describing data 151-1 is within the range of the minimum continuous time Tmin1 to the maximum continuous time Tmax1 of the status describing data 171-1 in the notification determining table 161 (Tmin1≦T1≦Tmax1) and the continuous time T2 of the status describing data 151-2 is within the range of the minimum continuous time Tmin2 to the maximum continuous time Tmax2 of the status describing data 171-2 in the notification determining table 161 (Tmin2≦T2≦Tmax2), it is determined that the event is the event prescribed by the notification determining table 161 (non-notifying event).

Referring back to FIG. 4, the sending unit 46 sends, to the processing box 2, the notifying event generating signal supplied from the unit 42 for determining the event notification, and further sends, to the processing box 2, the status describing data 151 supplied from the status describing unit 41 and the notifying image data supplied from the CCD camera 21.

During the period for learning the determining rule, the sending unit 46 sends, to the processing box 2, the sensor data supplied from the microwave sensor 22.

The receiving unit 47 receives the notification for fixing the determining rule and the notification determining table 161 sent from the processing box 2, and supplies the received data to the unit 42 for determining the event notification. Further, the receiving unit 47 receives the determining rule sent from the processing box 2 and supplies the received data to the status describing unit 41.

Next, a description is given of an example of the functional structure of the processing box 2, the presenting unit 3, and the remote controller 4 in the monitoring system 10 shown in FIG. 1 with reference to FIG. 5.

A receiving unit 51 in the processing box 2 receives the notifying event generating signal and the notifying image data sent from the multi-sensor camera 1, and then supplies the received data and signal to a unit 52 for structuring the presenting image. Further, the receiving unit 51 supplies the status describing data 151 sent from the multi-sensor camera 1 to a unit 53 for storing the status describing data, and stores the data therein.

Furthermore, during the period for learning the determining rule, the receiving unit 51 supplies, to the unit 53 for storing the status describing data, the sensor data of the microwave sensor 22 sent from the multi-sensor camera 1, and stores the data therein.

The unit 52 for structuring the presenting image receives the notification of the event from the multi-sensor camera 1 via the receiving unit 51, then, structures (forms) the notifying data formed by inserting the notifying image data into a part of the general viewing signal, supplies the structured data to the presenting unit 3, and presents the data thereon. The unit 52 for structuring the presenting image structures the notifying data for the remote controller 4 comprising the notifying image data (including no general viewing signal), and supplies the structured data to a sending unit 57. When the event is not notified (in the normal case), the unit 52 for structuring the presenting image supplies the general viewing signal (video image based on the broadcasting signal), and presents the supplied data.

The notifying data for the presenting unit 3 is structured by inserting the notifying image data into the part of the general viewing signal. Therefore, the presenting unit 3 presents the picture-in-picture image. The notifying data for the remote controller 4 comprises the notifying image data and therefore a presenting unit 82 of the remote controller 4 presents only the event (e.g., the image at the monitoring place).

The unit 54 for updating the notification determining table receives a signal on user feedback (FB) (hereinafter, referred to as a user FB signal if necessary) from the remote controller 4 via a receiving unit 58 and, then, it supplies the user feedback to the unit 53 for storing the status describing data and stores it therein. The unit 54 for updating the notification determining table reads the status describing data 151 stored in the unit 53 for storing the status describing data and the user feedback corresponding thereto, compares the read data with the notification determining table 161, and updates the notification determining table 161 based on the comparison result. When the read data does not match the notification determining table 161 which is previously sent to the multi-sensor camera 1, the unit 54 for updating the notification determining table supplies the new notification determining table 161 to the sending unit 56.

Here, the user feedback means the input of user's determination that the user determines the presented event and inputs the determining result by using an input unit 83 of the remote controller 4. When the user wants to know the event in the future, he/she operates an OK button (not shown) of the input unit 83. When the event is not detected in the future, he/she operates an NG button (not shown) and thus can input the user feedback.

When the status describing data 151 is supplied from the receiving unit 51 and then the unit 54 for updating the notification determining table supplies the user feedback, the unit 53 for storing the status describing data correlates the status describing data 151 with the user feedback, and stores the status describing data 151 and the user feedback. When one of the status describing data 151 and the user feedback is supplied, the unit 53 for storing the status describing data stores the new status-describing data 151 or the new user-feedback.

During the period for learning the determining rule, the unit 53 for storing the status describing data stores the sensor data of the microwave sensor 22 supplied from the receiving unit 51 together with the status describing data 151 and the user feedback.

When a unit 55 for learning the determining rule receives the user feedback indicating "OK (the notification is necessary in the future)" from the remote controller 4 via the receiving unit 58 during the period for learning the determining rule, the unit 55 for learning the determining rule reads the sensor data, the status describing data 151, and the user feedback of the past event stored in the unit 52 for structuring the presenting image, and the notification determining table 161 stored in a unit 217 for storing the past notification determining table (refer to FIG. 18) of the unit 54 for updating the notification determining table. Further, the unit 55 for learning the determining rule performs the processing for learning the determining rule.

As a result of the above-mentioned processing for describing the status data, the unstable sensor data outputted from the microwave sensor 22 is ignored. However, the determining rule needs to be properly set so that the sensor data outputted for the action of the person 91 (e.g., sensor data for the action of the person 91 shown in FIG. 8) is not ignored and the response of the microwave sensor 22 is detected with the accuracy. Further, the determining rule needs to be properly set so as to describe the status describing data 151 for identifying whether the motion (event) of the person 91 is the event determined by the user as "OK (the notification is necessary in the future)" (notifying event) or the event determined by the user as "NG (the notification is not unnecessary)" (non-notifying event).

According to the present invention, the processing for learning the determining rule performed by the unit 55 for learning the determining rule adjusts the response threshold to be a proper value under the determining rule, and detects the status No. of the microwave sensor 22 precisely corresponding to the motion (event) of the person 91 based on the unstable output of the microwave sensor 22. Further, it is possible to precisely identify the event determined by the user as "OK" (notifying event) or the event determined by the user as "NG" (non-notifying event). The details of the processing for learning the determining rule will be described with reference to FIG. 26.

The unit 55 for learning the determining rule updates and stores the status describing data 151 of the past event stored in the unit 53 for storing the status describing data, based on the response threshold which is adjusted by the processing for learning the determining rule. Further, the unit 55 for learning the determining rule supplies, to the sending unit 56, the adjusted response threshold as the new determining-rule together with the buffer size. Furthermore, when the unit 55 for learning the determining rule determines that the processing for learning the determining rule is sufficient and the period for learning the determining rule ends, the unit 55 for learning the determining rule supplies the notification for fixing the determining rule to the sending unit 56.

The sending unit 56 sends, to the multi-sensor camera 1, the notification determining table 161 supplied from the unit 54 for updating the notification determining table and the determining rule and the notification for fixing the determining rule supplied from the unit 55 for learning the determining rule. The sending unit 57 sends, to the remote controller 4, the notifying data supplied from the unit 52 for structuring the presenting image. The receiving unit 58 receives the user FB signal sent from the remote controller 4, and supplies it to the unit 54 for updating the notification determining table.

A receiving unit 81 of the remote controller 4 receives the notifying data sent from the processing box 2, and presents the received data to the presenting unit 82. An input unit 83 receives the input based on the user's determination for the presented event and supplies a signal on the input (user feedback) to a sending unit 84. The sending unit 84 sends, to the processing box 2, the user FB signal supplied from the input unit 83.

As mentioned above, the user feedback means the input of the user's determination "event which is necessary in the future" or "event which is not necessary in the future" (estimation whether or not the notification of the event is necessary, and hereinafter the expression “whether or not” is referred to as “notification need”). The multi-sensor camera 1 and the processing box 2 change the processing based on the user feedback.

Figure 18:
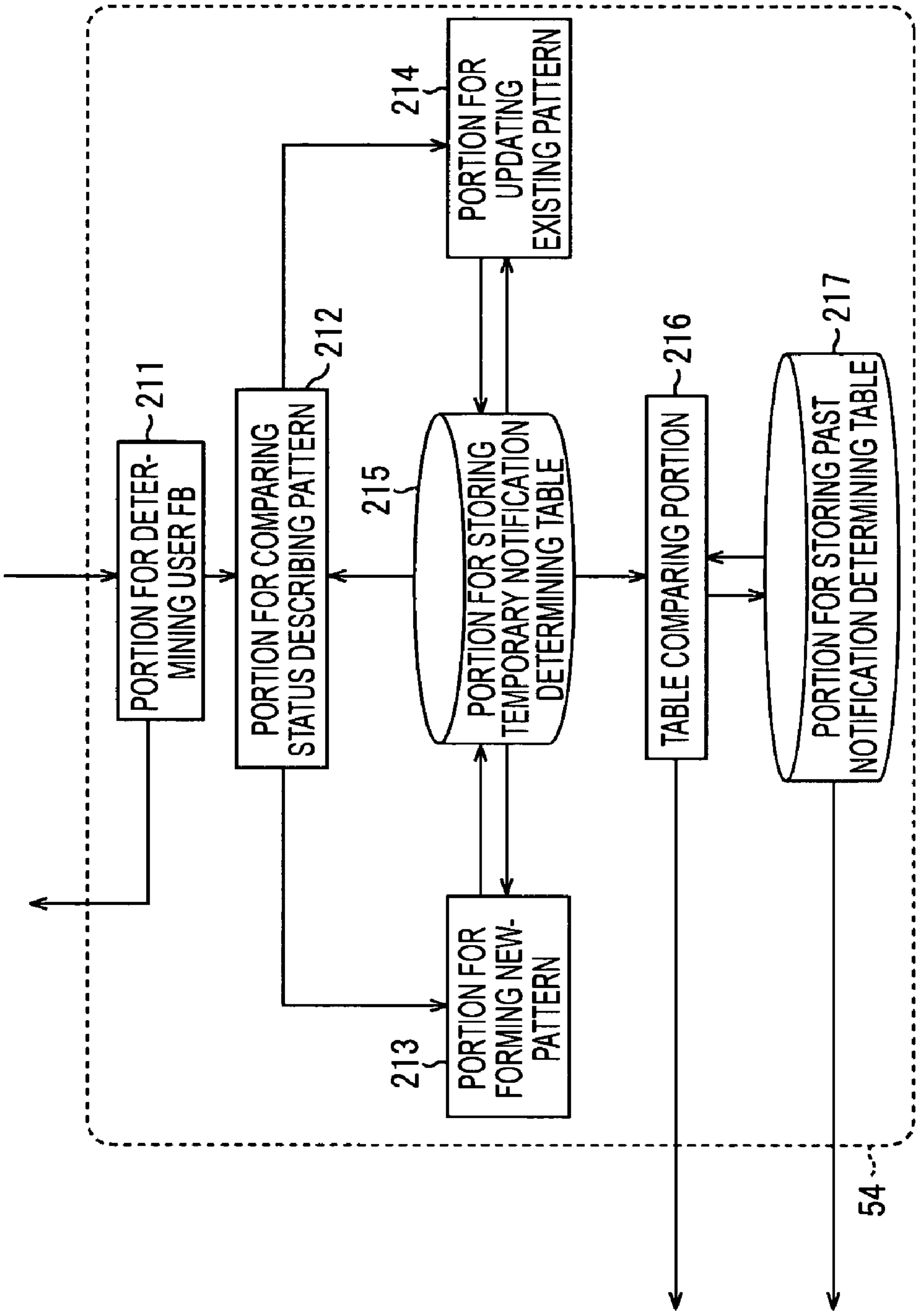
FIG. 18 is a block diagram showing an example of the detailed structure of a unit for updating the notification determining table shown in FIG. 4.

FIG. 18 is a block diagram showing an example of the detailed structure of the unit 54 for updating the notification determining table in the processing box 2 shown in FIG. 5.

A unit 211 for determining the user feedback (FB) reads the status describing data 151 (refer to FIG. 12) stored in the unit 53 for storing the status describing data and the user feedback corresponding thereto, determines whether the user feedback is data indicating “OK” or “NG”, and supplies the determining result and the status describing data 151 to a unit 212 for comparing the status describing pattern.

The unit 212 for comparing the status describing pattern compares the pattern of the status No. included in the status describing data 151 supplied from the unit 211 for determining user FB with the pattern of the status No. included in the entire status describing data 171 in the temporary notification determining table 161 stored in the unit 215 for storing the temporary notification determining table. If the temporary notification determining table 161 exists so that the status describing data 151 matches the pattern of the status No. as the comparing result, the unit 212 for comparing the status describing pattern supplies the temporary notification determining table 161 and the status describing data 151 to the unit 214 for updating the existing pattern. If the temporary notification determining table 161 does not exist so that the status describing data 151 does not match the pattern of the status No., the unit 212 for comparing the status describing pattern supplies the status describing data 151 to the unit 213 for forming the new pattern.

The unit 213 for forming the new pattern forms the new notification determining table 161 based on the status describing data 151 supplied from the unit 212 for comparing the status describing pattern, adds the formed table to the unit 215 for storing the temporary notification determining table, and stores it therein.

The unit 214 for updating the existing pattern updates the temporary notification determining table 161 supplied from the unit 212 for comparing the status describing pattern based on the status describing data 151, supplies the temporary notification determining table 161 to the unit 215 for storing the temporary notification determining table, and updates the temporary notification determining table 161 stored in the unit 215 for storing the temporary notification determining table.

The unit 215 for storing the temporary notification determining table stores, as the temporary notification determining tables 161, the notification determining table 161 added by the unit 213 for forming the new pattern and the notification determining table 161 updated by the unit 214 for updating the existing pattern.

The table comparing unit 216 compares the temporary notification determining table 161 stored in the unit 215 for storing the temporary notification determining table with the past notification determining table 161 stored in the unit 217 for storing the past notification determining table. When the temporary notification determining table 161 stored in the unit 215 for storing the temporary notification determining table does not match the past notification determining table 161 stored in the unit 217 for storing the past notification determining table, the temporary notification determining table 161 stored in the unit 215 for storing the temporary notification determining table is sent to the multi-sensor camera 1 via the sending unit 56 as the latest notification determining table 161. Further, the table comparing unit 216 supplies the temporary notification determining table 161 to the unit 217 for storing the past notification determining table, and updates the past notification determining table 161 stored in the unit 217 for storing the past notification determining table.

The unit 217 for storing the past notification determining table stores, as the past notification determining table 161, the notification determining table 161 updated by the table comparing unit 216.

Next, a description is given of the processing executed by the monitoring system 10 with reference to FIGS. 19 to 29. A description is given in the order of the processing executed by the monitoring system 10 during the period for learning the determining rule and the processing executed by the monitoring system 10 after ending the period for learning the determining rule.

Figure 19:
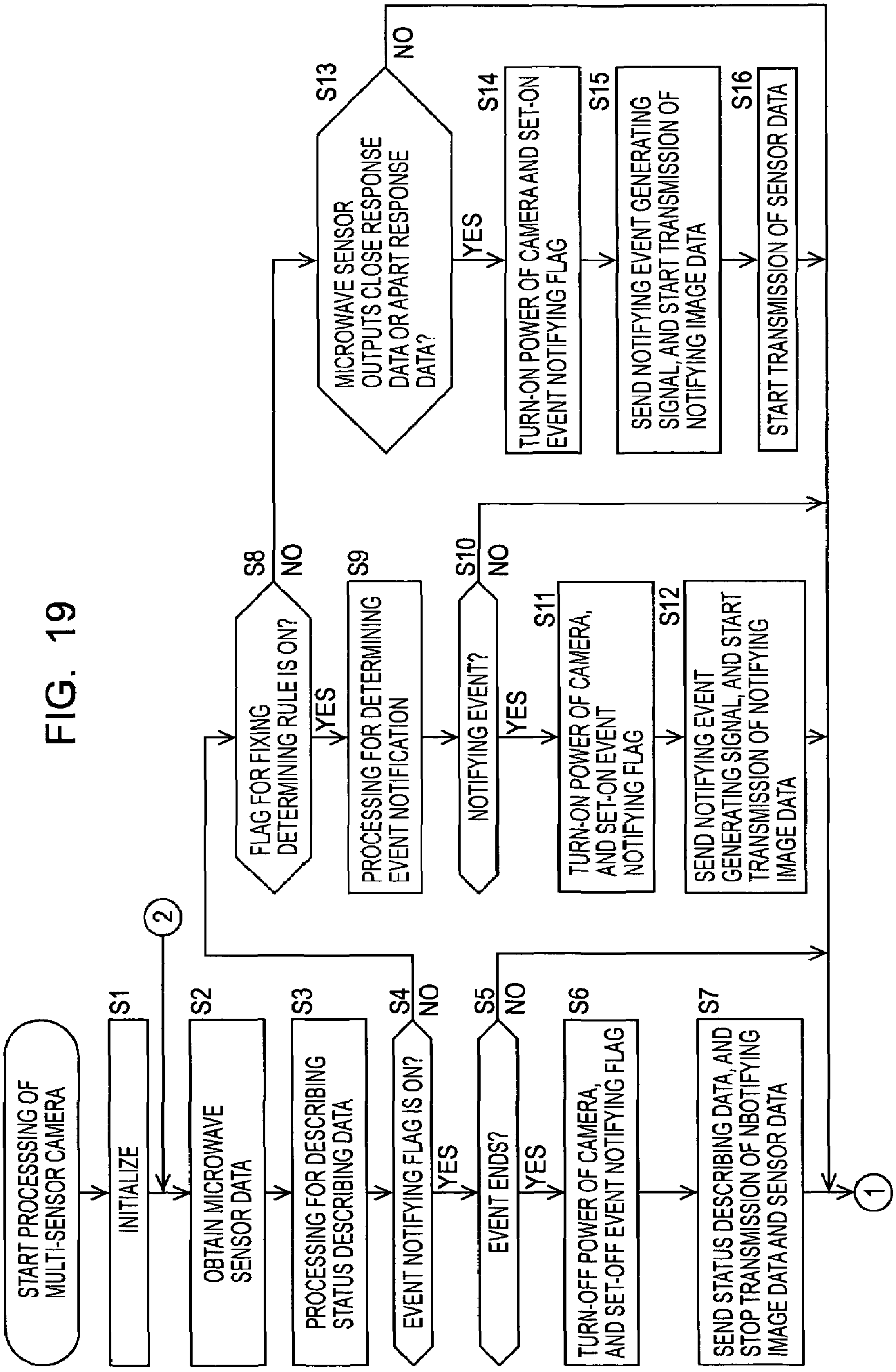
FIG. 19 is one flowchart for explaining the processing of the multi-sensor camera.
Figure 20:
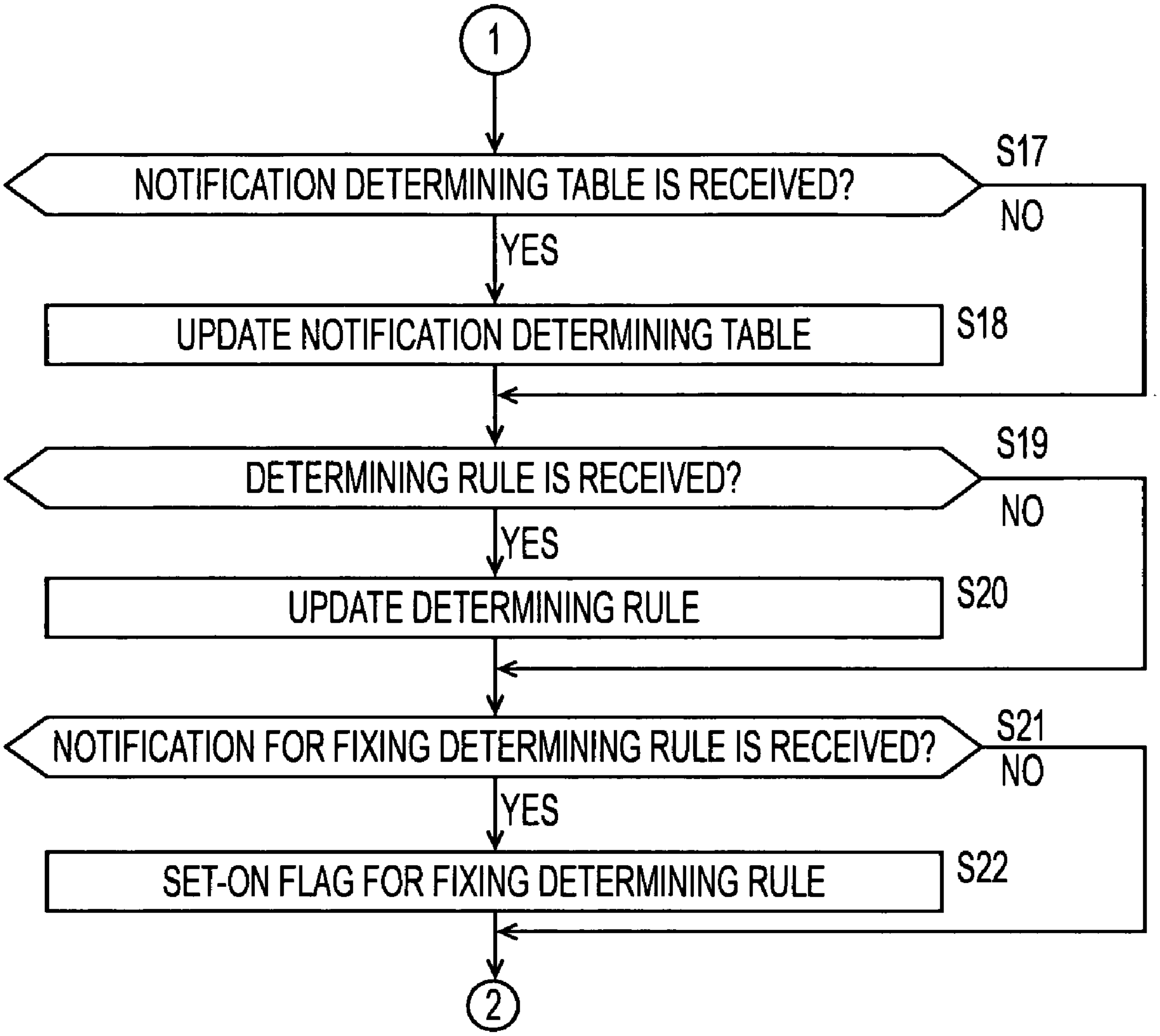
FIG. 20 is another flowchart for explaining the processing of the multi-sensor camera.

First, a description is given of the processing executed by the multi-sensor camera 1 during the period for learning the determining rule with reference to FIGS. 19 and 20. The processing starts when the user instructs the monitoring operation in the monitoring area.

In step S1, the multi-sensor camera 1 is initialized. Specifically, the status describing unit 41 sets the determining rule to an initial value. The unit 42 for determining the event notification supplies a power control signal to the CCD camera 21, thus turns off the power thereof, sets-off the event notifying flag and the flag for fixing the determining rule, and clears the held notification determining table 161.

In step S2, the status describing unit 41 obtains the sensor data from the microwave sensor 22.

In step S3, the status describing unit 41 performs the processing for describing the status data for a series of actions of the person 91 (moving thing as the monitoring target) in the monitoring area based on the sensor data obtained in step S2 and the determining rule which is set to the initial value in step S1. That is, as mentioned with reference to FIG. 12, the microwave sensor 22 detects the close response of the person 91, and then the status describing unit 41 sets the status No. 1. When the microwave sensor 22 detects the apart response of the person 91, the status describing unit 41 sets the status No. 2. Further, the status describing unit 41 correlates the status Nos. 1 and 2 with the continuous times, respectively. As mentioned above, the status describing data 151 including the described status No. and response continuous time is outputted to the unit 42 for determining the event notification.

In step S4, the unit 42 for determining the event notification determines whether or not the event notifying flag is on (the notifying event is currently generated). When the unit 42 for determining the event notification determines that the event notifying flag is not on but off (the notifying event is not currently generated), the processing advances to step S8. Since the event notifying flag is off in step S1, the processing advances to step S8.

In step S8, the unit 42 for determining the event notification determines whether or not the flag for fixing the determining rule is on. In this case, during the period for learning the determining rule, the flag for fixing the determining rule is off and therefore the processing advances to step S13.

In step S13, the status describing unit 41 determines whether the microwave sensor 22 outputs the close response data 101 or the apart response data 102. If the flag for fixing the determining rule is off, the status describing unit 41 does not use the response threshold. That is, if the number of outputs of the close response data 101 or apart response data 102 outputted from the microwave sensor 22 is the response threshold or less during the period designated by the current buffer size, when the status describing unit 41 determines at least one of the close response data 101 and the apart response data 102 outputted from the microwave sensor 22 even once, the processing advances to step S14.

In step S14, the unit 42 for determining the event notification supplies the power control signal to the CCD camera 21, turns on the power of the CCD camera 21, and the sets-on the event notifying flag.

In step S15, the unit 42 for determining the event notification sends the notifying event generating signal to the processing box 2 via the sending unit 46, supplies the control signal for sending the notifying image to the switch 44, and turns on the switch 44. Thus, the transmission of the notifying image data (event image obtained by picking-up the image of the monitoring area 31 by the CCD camera 21) starts from the CCD camera 21 to the processing box 2. The processing box 2 receives the notifying image data and presents the data on the presenting unit 3 (in step S53 in FIG. 23 which will be described later).

In step S16, the unit 42 for determining the event notification supplies the control signal for sending the sensor data to the switch 45, and turns on the halfway unit illuminating cover 45. Thus, the transmission of the sensor data of the event whose notification starts in step S15 starts from the microwave sensor 22 to the processing box 2 via the status describing unit 41. The microwave sensor 22 receives the sensor data, and stores the data in the unit 53 for storing the status describing data (in step S55 in FIG. 23 which will be described later). Then, the processing advances to step S17.

In step S13, it is determined that neither the close response data 101 nor the apart response data 102 is outputted from the microwave sensor 22, the processing in steps S14 to S16 is skipped and the processing advances to step S17.

As a result of the processing in steps S13 to S16, during the period for learning the determining rule, in order to perform the processing for learning the determining rule of all the events generated in the monitoring area 31, the processing for determining the event notification is not performed and all the events are notified to the user.

Irrespective of the result of the processing for determining the response of the microwave sensor based on the determining rule with reference to FIG. 10, if at least one of the close response data 101 and the apart response data 102 is outputted from the microwave sensor 22 even once, at this time point, the transmission of the event notification and the sensor data starts. This is caused by the following reason.

Figure 21:
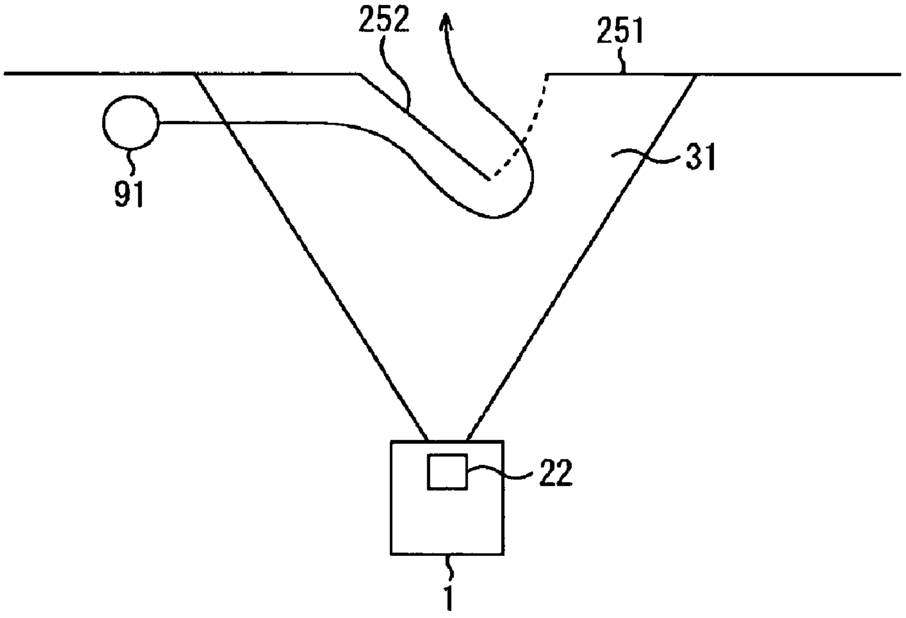
FIG. 21 is a flowchart for explaining the person's motion in the monitoring area of the microwave sensor.

Referring to FIG. 21, it is assumed that the multi-sensor camera 1 is installed at the position which is relatively far from a vestibule 251 and faces the vestibule 251. In this case, as shown by an arrow, the person 91 intrudes into the monitoring area 31 of the microwave sensor 22 along the wall of the vestibule 251, is close to a door 252, stops in front of the door 252, opens the key of the door 252, opens the door 252, and enters in the vestibule 251, the microwave sensor 22 outputs the sensor data as shown in FIG. 22.

Figure 22:
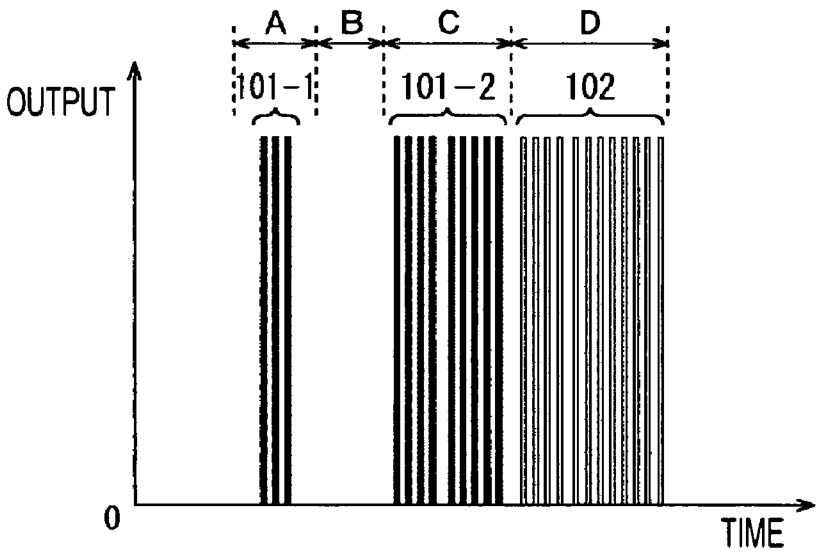
FIG. 22 is a diagram showing an example of the sensor data which is outputted by the microwave sensor.

Referring to FIG. 22, at an interval A at which the person 91 is close to the door 252, the distance to the person 91 from the microwave sensor 22 is relatively far and therefore the microwave sensor 22 outputs the unstable close response data 101-1 like pulses. At an interval B at which the person 91 stops in front of the door 252 and opens the key, the microwave sensor 22 outputs neither the close response data 101 nor the apart response data 102. At an interval C at which the person 91 opens the door 252, since the person 91 and the door 252 are temporarily close to the microwave sensor 22, the microwave sensor 22 stably outputs the close response data 101-2. At an interval D at which the person 91 closes the door 252 and enters in the vestibule 251, since the door 252 and the person 91 are apart from the microwave sensor 22, the microwave sensor 22 stably outputs the apart response data 102.

In the processing for determining the determining rule (processing in step S69 in FIG. 24), the response threshold is adjusted under the determining rule based on the sensor data of the microwave sensor 22, and the past event status describing data 151 is updated based on the adjusted response threshold. Based on the updated status describing data 151, the temporary notification determining table 161 is updated. For example, when the event shown in FIG. 21 is generated, the response threshold is high. At the interval A shown in FIG. 22, if it is determined based on the close response data 101-1 that the microwave sensor 22 does not indicate the response (event is not generated), the response threshold is adjusted later in the processing for learning the determining rule. It is determined that the event is generated at the interval A, and the status describing data is changed.

Therefore, during the period for learning the determining rule, if it is determined in the processing for determining the response of the microwave sensor that the microwave sensor 22 does not indicate the response (it is determined that the microwave sensor 22 does not indicate the response at the interval A shown in FIG. 22), when the microwave sensor 22 outputs the close response data 101 or the apart response data 102 (for example, the close response data 101-1 is outputted at the interval A shown in FIG. 22), the transmission of the event notification and the sensor data starts.

In step S8, it is determined that the determining rule flag is on and, then, the processing in steps S9 to S12 is executed. Since the determining rule flag is on, the period for learning the determining rule ends. Therefore, the processing in this case will be described later.

In step S4 (the event notifying flag is on in step S14, then, through the step S21 or S22, the processing advances to steps S2 and S3, after that, the processing in step S4 is performed), when it is determined that event notifying flag is on (the notifying event is currently generated), the processing advances to step S5 whereupon the unit 42 for determining the event notification determines whether or not the event ends. During the period for learning the determining rule, the unit 42 for determining the event notification checks whether or not the microwave sensor 22 outputs both the close response data 101 and the apart response data 102 to the status describing unit 41 for a predetermined period. When the microwave sensor 22 does not output the close response data 101 and the apart response data 102 for the predetermined period, the unit 42 for determining the event notification determines that the event ends, and the processing advances to step S6.

It is determined that the event ends after continuing a predetermined period for presetting a period for which microwave sensor 22 does not output both the close response data 101 and the apart response data 102 so as to present the erroneous determination that the event ends at a relatively short interval at which the microwave sensor 22 does not output the sensor data like the interval B in FIG. 22.

In step S6, the unit 42 for determining the event notification supplies a power control signal to the CCD camera 21, turns off the power of the CCD camera 21, and sets-off the event notifying flag.

In step S7, the unit 42 for determining the event notification supplies a control signal for sending the status describing data to the switch 43, turns on the switch 43, supplies a control signal for sending the notifying image to the switch 44, and turns off the switch 44. Thus, the status describing data 151 outputted from the status describing unit 41 in step S3 is sent to the processing box 2 via the switch 43 and the sending unit 46, and the transmission of the notifying image data (event image) sent to the processing box 2 via the switch 44 and the sending unit 46 from the CCD camera 21 is stopped. The processing box 2 receives the status describing data 151 and stores the received data in the unit 53 for storing the status describing data (in step S60 in FIG. 23 which will be described later). The unit 42 for determining the event notification supplies the control signal for sending the sensor data to the switch 45, and turns off the switch 45. The transmission of the sensor data sent from the microwave sensor 22 stops.

When it is determined in step S5 that the event does not end, the processing in steps S6 and S7 is skipped and advances to step S17.

In step S17, the unit 42 for determining the event notification determines whether or not the notification determining table 161 is received from the processing box 2 via the receiving unit 47 (notification determining table 161 is transmitted in step S73 in FIG. 24 which will be described later). If it is determined that the temporary notification determining table 161 is received, the processing advances to step S18 whereupon the unit 42 for determining the event notification updates the held notification determining table 161 by the received notification determining table 161. If it is determined that the notification determining table 161 is not received from the processing box 2, the processing in step S18 is skipped and advances to step S19.

During the period for learning the determining rule, since the multi-sensor camera 1 does not determine the event notification, the notification determining table 161 is not sent from the processing box 2. In step S72 in FIG. 24, which will be described later, if it is determined that the processing for learning the determining rule is sufficient (period for learning the determining rule ends), the notification determining table 161 is sent from the processing box 2. Further, the notification determining table 161 is received by the unit 42 for determining the event notification via the receiving unit 47.

In step S19, the status describing unit 41 determines whether or not the determining rule is received from the processing box 2 via the receiving unit 47. After executing the processing for learning the determining rule in step S69 in FIG. 24, which will be described later, the determining rule is sent from the processing box 2 in step S70 in FIG. 24. When the status describing unit 41 determines that the determining rule is received, the processing advances to step S20 whereupon the held determining rule is updated under the received determining rule.

The determining rule updated in step S20 is used for the processing for describing the status data in step S3. Until it is determined in step S72 in FIG. 24, which will be described later, that the processing for learning the determining rule is sufficient by the processing box 2 (period for learning the determining rule ends) and then the determining rule is fixed, the processing box 2 sends the determining rule which is adjusted by the processing for learning the determining rule in step S69 in FIG. 24. Under the determining rule, the processing for describing the status data is performed.

When it is determined in step S19 that the determining rule is not received from the processing box 2, or after the processing in step S20, the processing advances to step S21.

In step S21, the unit 42 for determining the event notification determines whether or not the notification for fixing the determining rule is received from the processing box 2 via the receiving unit 47. When the unit 42 for determining the event notification determines in step S72 in FIG. 24, which will be described later, that the processing for learning the determining rule is sufficient (period for learning the determining rule ends), in step S74 in FIG. 24, the notification for fixing the determining rule is sent from the processing box 2. During the period for learning the determining rule, the processing box 2 does not send the notification for fixing the determining rule. Therefore, the processing returns to step S2 whereupon the above-mentioned processing is repeatedly executed.

In step S3 after the second time, when the determining rule is updated in step S20, the status describing unit 41 describes the status data on a series of actions of the person 91 (moving thing as the monitoring target) within the monitoring area based on the updated determining rule.

When it is determined in step S72 in FIG. 24, which will be described later, that the processing for learning the determining rule is sufficient and the notification for fixing the determining rule is sent from the processing box 2 in step S74 in FIG. 24, in step S21, it is determined that the notification for fixing the determining rule is received and then the processing advances to step S22. In step S22, the unit 42 for determining the event notification sets-on the flag for fixing the determining rule and the processing returns to step S2. Subsequently, the multi-sensor camera 1 repeats the processing after ending the period for learning the determining rule, which will be described later.

Figure 23:
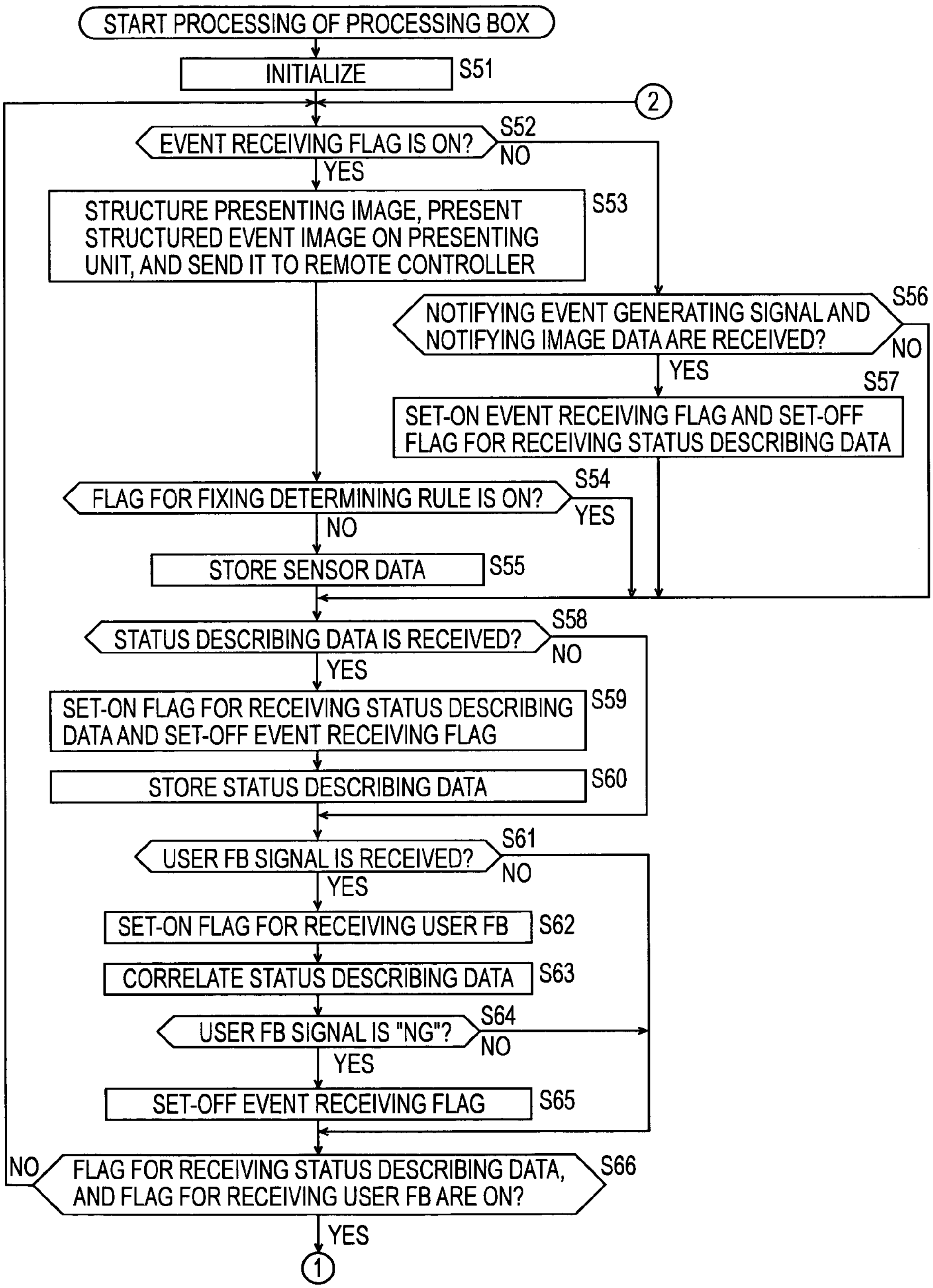
FIG. 23 is one flowchart for explaining the processing in a processing box.
Figure 24:
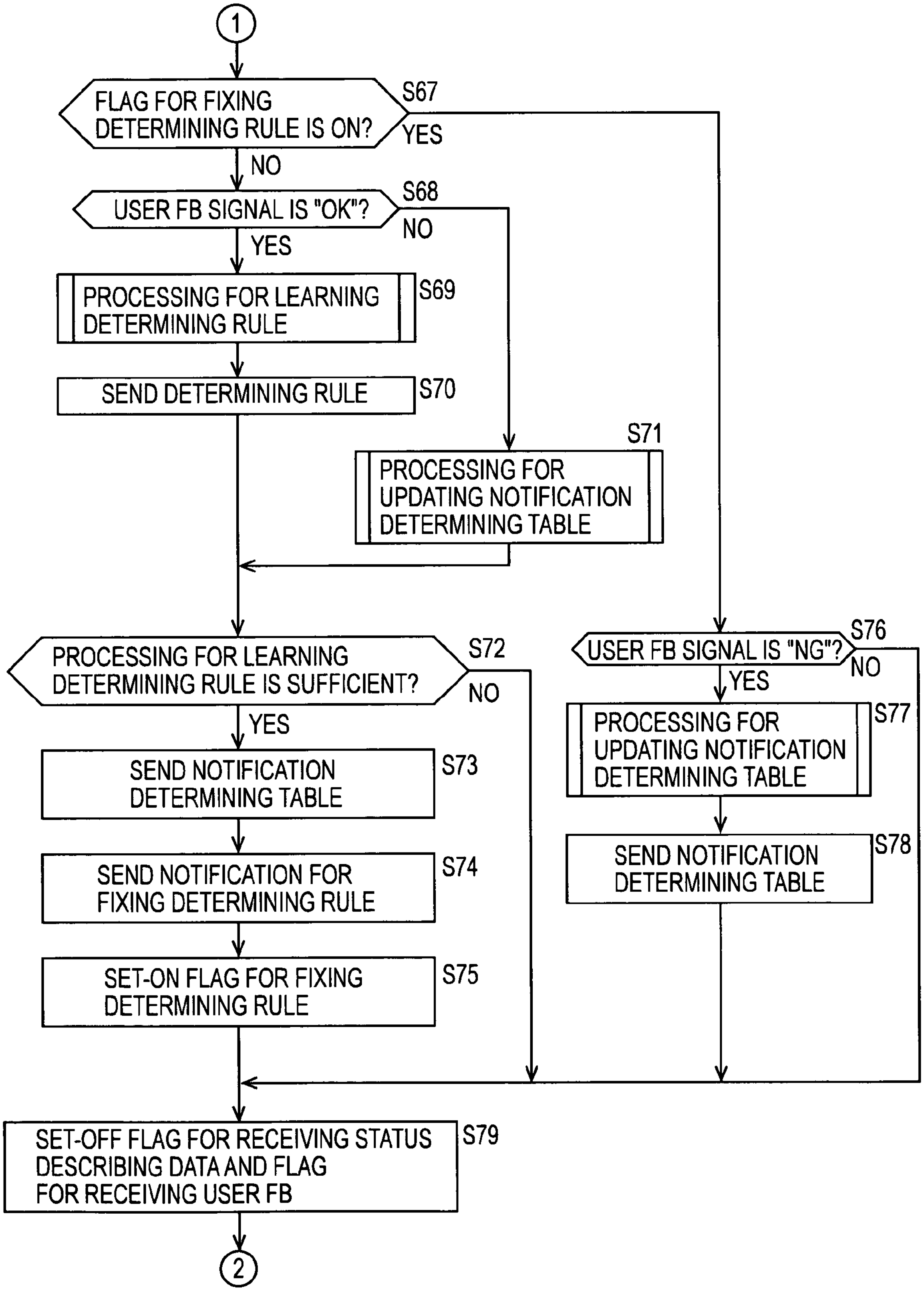
FIG. 24 is another flowchart for explaining the processing in the processing box.

Next, a description is given of the processing of the processing box 2, which is executed in accordance with the processing during the period for learning the determining rule of the multi-sensor camera 1 shown in FIGS. 19 and 20 with reference to FIGS. 23 and 24. The processing starts when the user issues an instruction for the monitoring operation within the monitoring area. Alternatively, the processing may automatically be started together with the processing shown in FIGS. 23 and 24 when the user issues an instruction for presenting the image in accordance with the general viewing signal (broadcasting signal) to the presenting unit 3.

In step S51, the processing box 2 is initialized. Specifically, the unit 54 for updating the notification determining table clears the status describing data 151 stored in the unit 53 for storing the status describing data and the temporary notification determining table 161 stored in the unit 215 for storing the temporary notification determining table. Further, the unit 54 for updating the notification determining table sets-off the flag for receiving the user feedback. The receiving unit 51 sets-off the event receiving flag and the flag for receiving the status describing data. The unit 55 for learning the determining rule sets-off the flag for fixing the determining rule and initializes the determining rule.

In step S52, the receiving unit 51 determines. whether or not the event receiving flag is on (during receiving the notifying event). When the receiving unit 51 determines that the event receiving flag is off (this determining result is obtained just after starting the processing), the processing advances to step S56 whereupon the receiving unit 51 determines whether or not the notifying event generating signal and the notifying image data are received from the multi-sensor camera 1. When the receiving unit 51 determines in step S56 that the notifying event generating signal and the notifying image data are received, the processing advances to step S57 whereupon the event receiving flag is set-on and the flag for receiving the status describing data is set-off (however, in the initial state, the flag for receiving the status describing data has already been set-off).

When it is determined in step S52 that the event receiving flag is on (after the processing in step S57, through the processing in step S66 or S79, which will be described later, the processing in step S52 is performed), in step S53, the receiving unit 51 supplies, to the unit 52 for structuring the presenting image, the notifying event generating signal and the notifying image data (sent by the processing in step S15 in FIG. 19 as mentioned above) sent from the multi-sensor camera 1.

In step S53, the unit 52 for structuring the presenting image structures the notifying data (image data which is presented as the picture-in-picture image) by inserting the notifying image data supplied from the receiving unit 51 to a part of the general viewing signal supplied to the presenting unit 3. Further, the unit 52 for structuring the presenting image supplies the structured data to the presenting unit 3 and presents it on the presenting unit 3. The unit 52 for structuring the presenting image structures notifying data dedicated for the remote controller 4 (image for displaying the event image), and sends the structured data to the remote controller 4 via the sending unit 57. The remote controller 4 receives the notifying data, and presents the data on the presenting unit 82 (in step S252 in FIG. 29, which will be described later). As mentioned above, the presenting unit 3 and the presenting unit 82 display the event image.

In step S54, the unit 55 for learning the determining rule determines whether or not the flag for fixing the determining rule is on. When it is determined in step S72 in FIG. 24, which will be described later, that the processing for learning the determining rule is sufficient, the flag for fixing the determining rule is set-on in step S75. Therefore, during the period for learning the determining rule, the flag for fixing the determining rule is not on. In this case, it is determined that the flag for fixing the determining rule is off and the processing advances to step S55.

In step S55, the receiving unit 51 stores the sensor data of the microwave sensor 22 received by the multi-sensor camera 1 into the unit 53 for storing the status describing data. The sensor data starts to be sent from the multi-sensor camera 1 in accordance with the event notification by the above-mentioned processing in step S16 in FIG. 19, and is used for the processing for learning the determining rule, which will be described later with reference to FIG. 26.

When it is determined in step S54 that the flag for fixing the determining rule is on after the processing in steps S55 and S57, or when it is determined in step S56 that the notifying event generating signal is not received, the processing advances to step S58 whereupon the receiving unit 51 determines whether or not the status describing data 151 is received from the multi-sensor camera 1.

When it is determined in step S58 that the status describing data 151 is received, the processing advances to step S59 whereupon the receiving unit 51 sets-on the flag for receiving the status describing data and sets-off the event receiving flag.

In step S60, the receiving unit 51 correlates the status describing data 151 (sent by the processing in step S7 in FIG. 19) sent from the multi-sensor camera 1 with the sensor data stored by the processing in step S55, and stores the resultant data into the unit 53 for storing the status describing data. Incidentally, when the flag for receiving the user FB is already on, the status describing data 151 is correlated with the user feedback and is stored in the status describing data storing unit 53.

After the processing in step S60, when it is determined in step S58 that the status describing data 151 is not received, the processing advances to step S61 whereupon the unit 54 for updating the notification determining table determines whether or not the user FB signal (sent by the processing in step S254 in FIG. 29, which will be described later) sent from the remote controller 4 via the receiving unit 58. If it is determined in step S58 that the user FB signal is received, the processing advances to step S62.

In step S62, the unit 54 for updating the notification determining table sets-on the flag for receiving the user feedback.

In step S63, when the flag for receiving the status describing data is on, the unit 54 for updating the notification determining table correlates the user feedback ("OK (notification is necessary in the future)" or "NG (notification is not necessary in the future)") with the sensor data stored in the unit 53 for storing the status describing data and the status describing data 151, and stores the correlated data.

When the unit 54 for updating the notification determining table determines in step S63 that event receiving flag is on and the flag for receiving the status describing data is off, the unit 54 for updating the notification determining table stores the user FB as the new user-FB. This is performed in the halfway of the event, the user inputs his/her determination of the event which is currently presented by using the input unit 83 of the remote controller 4 (before receiving the status describing data 151 of the event presented in step S58) and, in step S61, the user FB signal (sent by step S254 in FIG. 29, which will be described later) sent from the remote controller 4 via the receiving unit 58 is received. The stored new user-FB is correlated with the status describing data 151 (received in step S58 as mentioned above) received from the multi-sensor camera 1 upon ending the event in step S60 and the sensor data stored in the unit 53 for storing the status describing data in step S55, and is stored in the unit 53 for storing the status describing data.

If the event receiving flag is off and the flag for receiving the status describing data is off in step S63, that is, if the event is not presented and the status describing data 151 on the presented event is not received, the user FB is inputted irrespective of the event presentation and is ignored.

In step S64, the unit 54 for updating the notification determining table determines whether or not the user FB signal received in step S61 is "NG (notification is not necessary in the future)". If it is determined that the user FB signal is "NG", the processing advances to step S65 whereupon the receiving unit 51 sets-off the event receiving flag. Thus, the presentation of the event which is determined by the user as "NG" is stopped during the halfway of the event. After that, the notification of event from the multi-sensor camera 1 continues until the end of event (until the determination as the end of event in step S5 in FIG. 19 and the stop of notification of event from the multi-sensor camera 1 in steps S6 and S7). When the processing returns to step S52, it is determined that the event receiving flag is off and therefore the presenting processing in step S53 is not performed.

The event receiving flag that is off in step S65 is still off until it is determined in step S56 that the notifying event generating signal and the notifying image data are received from the multi-sensor camera 1 and the event receiving flag is set-on in step S57. Until the new event is detected and the processing in step S15 in FIG. 19 is performed, the notifying event generating signal is not sent from the multi-sensor camera 1. Therefore, until the new event is notified from the multi-sensor camera 1, the event receiving flag is still off.

After the processing in step S65, in step S61, it is determined that the user FB signal is not received. Or in step S64, when it is determined that the user FB signal is "OK (notification is necessary in the future)". In this case, in step S66, the unit 54 for updating the notification determining table determines whether or not the flag for receiving the status describing data and the flag for receiving the user FB are on. If the unit 54 for updating the notification determining table determines that at least one of the flag for receiving the status describing data and the flag for receiving the user FB is off, the processing returns to step S52 and the subsequent processing is repeated. If the unit 54 for updating the notification determining table determines that both the flag for receiving the status describing data and the flag for receiving the user FB are on (status describing data 151 of the presented event is received and the feedback of the event is inputted from the user), the processing advances to step S67.

In step S67, the unit 55 for learning the determining rule determines whether or not the flag for fixing the determining rule is on. In this case, determining rule is currently learned and the flag for fixing the determining rule is off and therefore the processing advances to step S68.

In step S68, the unit 55 for learning the determining rule determines whether or not the user FB signal (sent in step S254 in FIG. 29, which will be described later) sent from the remote controller 4 via the receiving unit 58 is "OK (notification is necessary in the future)". If the unit 55 for learning the determining rule determines that the user FB signal is "OK", the processing advances to step S69.

In step S69, the unit 55 for learning the determining rule adjusts the determining rule in the processing for learning the determining rule, which will be described later with reference to FIG. 26. In step S70, the unit 55 for learning the determining rule sends the adjusted determining rule to the multi-sensor camera 1 via the sending unit 56.

If the unit 55 for learning the determining rule determines in step S68 that the user FB signal is "NG (notification is not necessary in the future)", the processing advances to step S71 whereupon the unit 54 for updating the notification determining table executes the processing for updating the notification determining table, which will be described later with reference to FIG. 25. As a result of the processing, the notification determining table 161 stored in the unit 217 for storing the past notification determining table is updated.

In step S72, the unit 55 for learning the determining rule determines whether or not the processing for learning the determining rule is sufficient. Until the monitoring system 10 starts to the monitoring operation and then a predetermined time passes, the unit 55 for learning the determining rule determines that the processing for learning the determining rule is not sufficient. Therefore, the processing in steps S73 to S75 is skipped and advances to step S79.

As mentioned above, in step S72, it is determined, based on the start of monitoring operation of the monitoring system 10 and the passing time, whether or not the processing for learning the determining rule is sufficient. However, it may be determined, based on a predetermined number of times of the processing for learning the determining rule, whether or not the processing for learning the determining rule is sufficient.

In step S79, the unit 54 for updating the notification determining table sets-off the flag for receiving the user feedback, and the receiving unit 51 sets-off the flag for receiving the status describing data.

After the processing in step S79, the processing returns to step S52 and the above-mentioned processing is repeated.

As mentioned above, the event image is presented to the user and the feedback of the user corresponding thereto is inputted. The user feedback is inputted and then, when the feedback is "OK (notification is necessary in the future)", the determining rule is adjusted. Further, the determining rule is sent to the multi-sensor camera 1. When the feedback is "NG (notification is not necessary in the future), the notification determining table 161 is updated.

The monitoring system 10 starts the monitoring operation, then, the predetermined time passes, after that, if it is determined in step S72 that the processing for learning the determining rule is sufficient, the processing in step S73 is executed.

In step S73, the unit 54 for updating the notification determining table sends, to the multi-sensor camera 1 via the sending unit 56, the notification determining table 161 which is formed and updated by the processing for learning the determining rule in step S69 and the processing for updating the notification determining table in step S71. The multi-sensor camera 1 receives the notification determining table 161 in step S17 in FIG. 20.

In step S74, the unit 55 for learning the determining rule sends the notification for fixing the determining rule to the multi-sensor camera 1 via the sending unit 56. As mentioned above, the multi-sensor camera 1 receives the notification for fixing the determining rule in step S21 in FIG. 20. In step S22, the flag for fixing the determining rule is set on. After that, the processing after ending the processing for learning the determining rule is performed.

In step S75, the unit 55 for learning the determining rule sets-on the flag for fixing the determining rule. In step S79, the unit 54 for updating the notification determining table sets-off the flag for receiving the user feedback, and the receiving unit 51 sets-off the flag for receiving the status describing data. After that, the processing returns to step S52. After that, the processing after ending the period for learning the determining rule is repeated in the processing box 2.

When it is determined in step S67 that the flag for fixing the determining rule is on (after ending the period for learning the determining rule), the processing in steps S76 to S78 is executed, which will be described later.

Next, a detailed description is given of the processing for updating the notification determining table during the period for learning the determining rule in step S71 in FIG. 24 and in step S207 in FIG. 26, which will be described later, with reference to FIG. 25.

In step S101, the unit 212 for comparing the status describing pattern of the unit 54 for updating the notification determining table clears the temporary notification determining table 161 stored in the unit 215 for storing the temporary notification determining table.

In step S102, the unit 211 for determining the user feedback reads the latest status describing data 151 stored in step S111 in the unit 53 for storing the status describing data and the user feedback corresponding thereto.

In step S103, the unit 211 for determining the user feedback determines whether or not the user feedback read in step S102 is "NG (notification is not necessary in the future)". If the unit 211 for determining the user FB determines in step S103 that the user feedback is "NG", the determining result is supplied to the unit 212 for comparing the status describing pattern together with the status describing data 151 (refer to FIG. 12).

In step S104, the unit 212 for comparing the status describing pattern compares the pattern of the status No. included in the status describing data 151 supplied from the unit 211 for determining the user FB with the pattern of the status No. included in the status describing data 171 in the entire temporary notification determining tables 161 stored in the unit 215 for storing the temporary notification determining table.

In step S105, the unit 212 for comparing the status describing pattern determines whether or not the patterns match as a result of the comparing result in step S104, that is, whether or not there is the temporary notification determining table 161 in which the pattern of the status No. included in the status describing data 171 matches the status describing data 151. In this case, the temporary notification determining table 161 is cleared in step S101 and therefore it is determined that there is not any of the temporary notification determining table 161 in which the pattern matches the status describing data 151. The unit 212 for comparing the status describing pattern supplies the status describing data 151 to the unit 213 for forming the new pattern.

In step S107, the unit 213 for forming the new pattern adds and stores the status No. included in the status describing data 151 supplied from the unit 212 for comparing the status describing pattern and the continuous time corresponding thereto, as the new notification determining table 161, to the unit 215 for storing the temporary notification determining table. In this case, the continuous time is set as the minimum time and the maximum time on the notification determining table 161. In this case, since the temporary notification determining table 161 is cleared, the added notification determining table 161 becomes the first temporary notification determining table 161. After that, the processing advances to step S108.

When it is determined in step S103 that the user feedback is not "NG", the processing in steps S104 to S107 is skipped and advances to step S108. That is, the processing for adding the temporary notification determining table 161 is not executed.

In step S108, the unit 211 for determining the user feedback determines whether or not the entire status describing data 151 stored in the unit 53 for storing the status describing data and the user feedback corresponding thereto are read. If NO in step S108, the processing returns to step S102.

In step S102, the unit 211 for determining the user feedback reads the next status describing data 151 stored in the unit 53 for storing the status describing data and the user feedback corresponding thereto again.

If it is determined in the re-processing in step S103 that the user FB data read in step S102 is not "NG", the processing in steps S104 to S107 is skipped and advances to step S108. If it is determined in step S103 that the user FB data is "NG", the determining result is supplied to the unit 212 for comparing the status describing pattern together with the status describing data 151 (refer to FIG. 12), and the processing advances to step S104.

In step S104, the unit 212 for comparing the status describing pattern compares the pattern of the status No. included in the status describing data 151 supplied from the unit 211 for determining the user feedback with the pattern of the status No. included in the status describing data 171 in the entire temporary notification determining tables 161 stored in the unit 215 for storing the temporary notification determining table. Now, the processing corresponds to that after the second processing and therefore the temporary notification determining table 161 is stored in the processing in step S107 at least once. Thus, the patterns might match.

If the unit 212 for comparing the status describing pattern determines in step S105 that the patterns match as a comparing result of the processing in step S104, the unit 212 for comparing the status describing pattern supplies, to the unit 214 for updating the existing pattern, the status describing data 151 and the temporary notification determining table 161 in which the pattern of the status No. included in the status describing data 171 matches the status describing data 151, and the processing advances to step S106.

In step S106, the unit 214 for updating the existing pattern updates, based on the status describing data 151 supplied from the unit 212 for comparing the status describing pattern, the temporary notification determining table 161 in which the pattern matches the status describing data 151 supplied from the unit 212 for comparing the status describing pattern.

That is, the unit 214 for updating the existing pattern first compares the continuous time included in the status describing data 151 received from the multi-sensor camera 1 with the minimum continuous time and the maximum continuous time included in the status describing data 171 of the temporary notification determining table 161 in which the pattern matches the status describing data 151.

If the unit 214 for updating the existing pattern determines as the comparing result that the continuous time of the status describing data 151 is shorter than the minimum continuous time of the status describing data 171, the unit 214 for updating the existing pattern replaces (updates) the minimum continuous time of the status describing data 171 with the continuous time of the status describing data 151. Further, the unit 214 for updating the existing pattern determines that the continuous time of the status describing data 151 is longer than the maximum continuous time of the status describing data 171, the unit 214 for updating the existing pattern replaces (updates) the maximum continuous time of the status describing data 171 with the continuous time of the status describing data 151. Furthermore, the unit 214 for updating the existing pattern supplies the temporary notification determining table 161 in which the pattern matches the updated status describing data 151, as the updated notification determining table 161, to the unit 215 for storing the temporary notification determining table, and updates the temporary notification determining table 161 stored in the unit 215 for storing the temporary notification determining table.

When it is determined in step S105 that the temporary notification determining table 161, in which the pattern does not match as the comparing result in step S104, does not exist, similarly to the first processing, the unit 212 for comparing the status describing pattern supplies the status describing data 151 to the unit 213 for forming the new pattern, and the processing advances to step S107.

In step S107, similarly to the first processing, the unit 213 for forming the new pattern adds and stores the status No. included in the status describing data 151 supplied from the unit 212 for comparing the status describing pattern and the continuous time corresponding thereto, as the latest notification determining table 161 having the maximum one and the minimum one, to the unit 215 for storing the temporary notification determining table.

Until it is determined in step S108 that the entire status describing data 151 stored in the unit 53 for storing the status describing data and the user feedback corresponding thereto are read, the processing in steps S102 to S108 is repeated. Further, the temporary notification determining table 161 is formed from the entire status describing data 151 stored in the unit 53 for storing the status describing data and the user feedback corresponding thereto.

If it is determined in step S108 that the entire status describing data 151 and the user feedback corresponding thereto are read, the processing advances to step S109 whereupon the table comparing unit 216 determines whether or not the flag for fixing the determining rule is on. In this case, the determining rule is currently learned and the flag for fixing the determining rule is off and therefore the processing in steps S110 to S112 is skipped. Then, the processing advances to step S113. Thus, since the notification determining table 161 is not sent in step S112, the notification determining table 161 is not sent to the multisensor camera 1 during the period for learning the determining rule.

In step S113, the table comparing unit 216 supplies, to the unit 217 for storing the past notification determining table, the temporary notification determining table 161 stored in the unit 215 for storing the temporary notification determining table, and updates the past notification determining table 161 which has already been stored.

As a result of the above-mentioned processing, the unit 217 for storing the past notification determining table stores therein the notification determining tables 161 comprising the notification determining table 161-1 and the notification determining table 161-n as shown in FIG. 16. The pattern which is not notified as the event is stored in the notification determining table 161.

Figure 26:
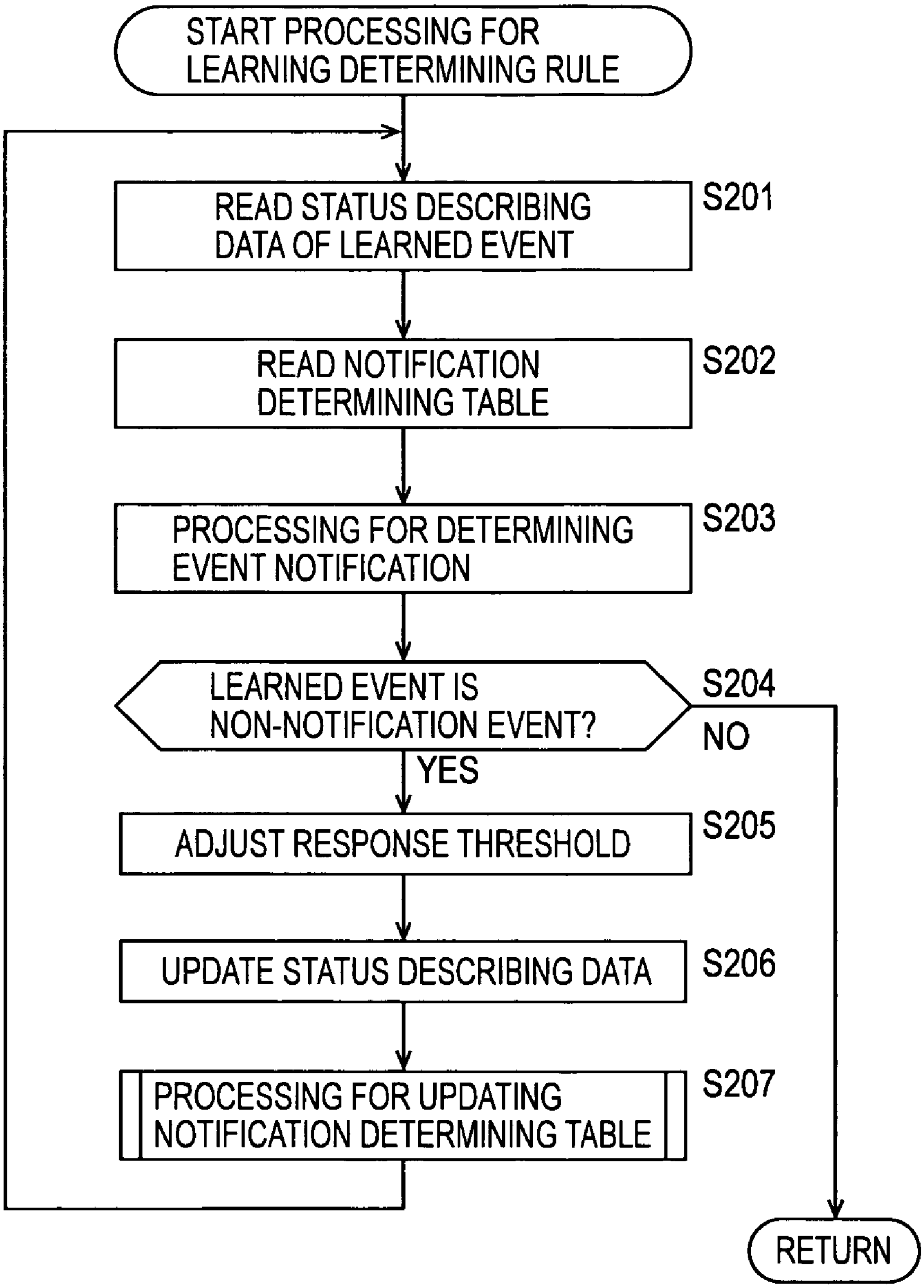
FIG. 26 is a flowchart for explaining the detailed processing for learning the determining rule.

Next, a detailed description is given of the processing for learning the determining rule in step S69 in FIG. 24 with reference to FIG. 26.

In step S151, the unit 55 for learning the determining rule reads, from the unit 53 for storing the status describing data, the status describing data 151 of the event which is presented to the user in step S53 in FIG. 23 and is determined that the user inputs the user FB signal indicating "OK (notification is necessary in the future)" in step S68 in FIG. 24 (hereinafter, referred to as a learned event in the following description with reference to FIG. 26).

In step S202, the unit 55 for learning the determining rule reads the notification determining table 161 from the unit 217 for storing the past notification determining table of the unit 54 for updating the notification determining table.

In step S203, the unit 55 for learning the determining rule performs the processing for determining the event notification of the learned event. As mentioned above with reference to FIG. 17, the unit 55 for learning the determining rule determines whether or not the notification determining table 161, in which the pattern matches the pattern of the status No. of the status describing data 151 of the learned event, exists. If it is determined that the notification determining table 161, in which the pattern matches the pattern of the status No. of the status describing data 151, exists, the unit 55 for learning the determining rule determines whether or not the continuous time of the status No. of the status describing data 151 is within the range of the minimum continuous time to the maximum continuous time of the status No. of the notification determining table 161. If it is determined that the notification determining table 161, in which pattern matches the pattern of the status No. of the status describing data 151 of the learned event, exists and that the continuous time of the status No. of the status describing data 151 is within the range of the minimum continuous time to the maximum continuous time of the status No. of the notification determining table 161, the learned event is determined as the non-notifying event (event prescribed in the temporary notification determining table 161). If not so, the learned event is determined as the notifying event (which is not the event prescribed in the notification determining table 161).

In step S204, the unit 55 for learning the determining rule determines whether or not the learned event is the non-notifying event as the result of the processing in step S203. If it is determined that the learned event is the non-notifying event, that is, if it is determined that the event determined as "OK" by the user is not prescribed as the notification unnecessary event in the notification determining table 161, the determining rule is currently determined as the proper value, and the processing for learning the determining rule ends.

If it is determined in step S204 that the learned event is the non-notifying event, that is, if it is determined that the event determined as "OK" by the user is prescribed as the notifying unnecessary event in the notification determining table 161, the determining rule is not determined as the proper value. Then, the processing advances to step S205 whereupon the response threshold is adjusted.

In step S205, the unit 55 for learning the determining rule reads, from the unit 53 for storing the status describing data, the sensor data of the learned event and the sensor data of the past event corresponding to the notification determining table 161 determined as the learned event (having the pattern of the same status No. as that of the learned event and determined as "NG" from the user, hereinafter, referred to as an NG event). The unit 55 for learning the determining rule adjusts the response threshold based on the read sensor data so that the learned event becomes the (identifying) status describing data which is different from the NG event.

Referring to FIG. 21, when the person 91 is close to the door 252 from the left direction and opens the door 252 from the outside and enters in the unit inside the door 252, the microwave sensor 22 outputs the data as shown in FIG. 22. When the number (three) of the output data of the close response data 101-1 at the interval A in FIG. 22 is smaller than the response threshold (e.g., four), the status describing unit 41 does not recognize the action of the person 91 at the interval A as the close response and recognizes it as no response at the interval A. In this case, the status describing data 151 for the action of the person 91 shown in FIG. 21 is described based on the close response data 101-2 at the interval C and the apart response data 102 at the interval D. That is, the status describing data 151 for the action (event) of the person 91 shown in FIG. 21 is described as the patterns and the continuous times of the status Nos. 1 and 2.

Figure 27:
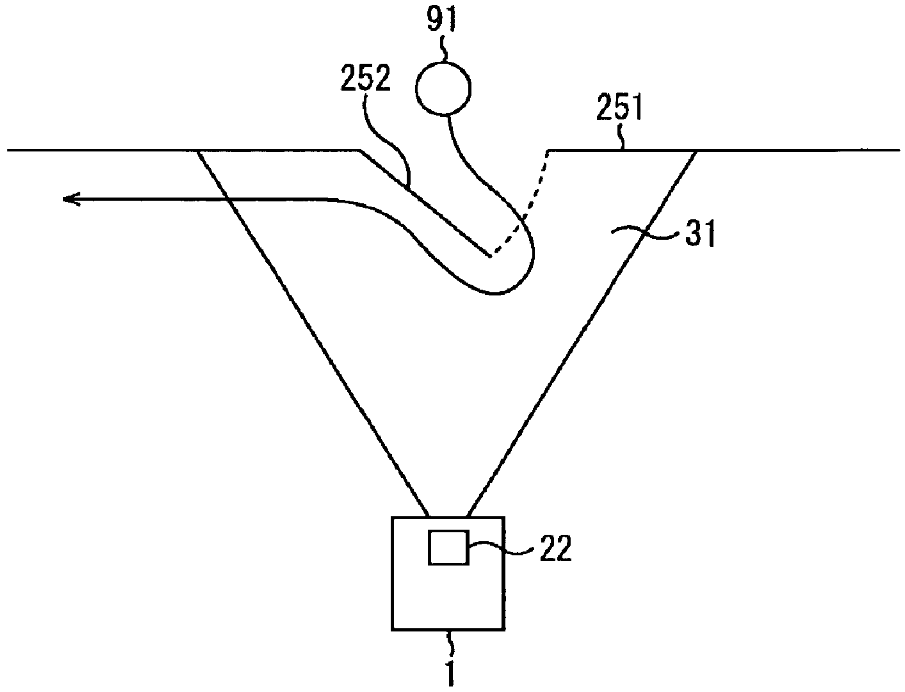
FIG. 27 is a diagram for explaining the person's motion in the monitoring area of the microwave sensor.

Referring to FIG. 27, on the contrary to the case shown in FIG. 21, the person 91 opens the door 252 from the inside, goes out, closes the door 252, and further goes out from the monitoring area 31 of the microwave sensor 22 along the wall of the vestibule 251 in the left direction without stopping. In this case, the microwave sensor 22 outputs the sensor data as shown in FIG. 28.

At the interval A where the person 91 opens the door 252, the door 252 and the person 91 are temporarily close to the microwave sensor 22 and therefore the close response data 101 is stably outputted. At the interval B where the person 91 closes the door 252 and goes out from the monitoring area 31 of the microwave sensor 22, the door 252 and the person 91 are apart from the microwave sensor 22 and therefore the apart response data 102 is stably outputted. In this case, the person 91 goes out from the monitoring area 31 without stopping after closing the door 252, the microwave sensor 22 outputs the apart response data 102 as a series of response.

Figure 28:
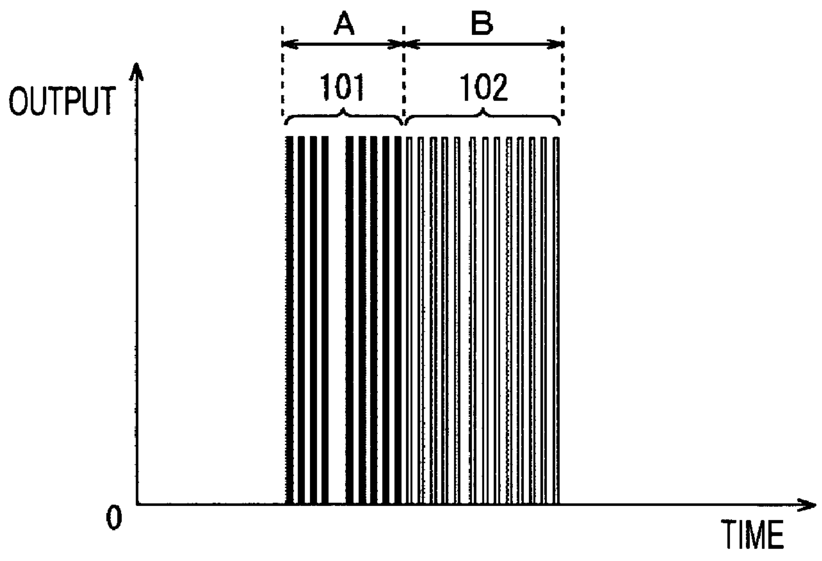
FIG. 28 is a diagram showing an example of the sensor data which is outputted by the microwave sensor.

The status describing data 151 for the action (event) of the person 91 shown in FIG. 27 is described based on the close response data 101 at the interval A shown in FIG. 28 and the apart response data 102 at the interval B. The patterns of the sensor data at the intervals A and B in FIG. 28 are similar to the patterns of the sensor data at the intervals C and D in FIG. 22. The status describing data 151 for the event in FIG. 27 is described as the patterns and the continuous times of the status Nos. 1 and 2, similarly to the status describing data 151 for the event shown in FIG. 21. Therefore, in the status describing data 151, the event in FIG. 21 is not identified from the event shown in FIG. 27.

As a result, when the user determines that the notification of the event in FIG. 27 (event indicating that the user opens the door 252 and goes out) is not necessary and the notification determining table 161 is formed based on the sensor data shown in FIG. 28, the event in FIG. 21 (event indicating the user opens the door 252 and goes in) is generated. Further, although the user determines that the notification of the event for the event in FIG. 21 is necessary, the status describing data 151 described based on the sensor data in FIG. 22 is determined as the notification determining table 161 formed based on the sensor data in FIG. 28. The event in FIG. 21 is determined as the non-notifying event. In this case, the learned event in the processing for learning the determining rule is determined as the non-notifying event in step S204.

In this case, in step S205, the unit 55 for learning the determining rule adjusts the response threshold based on the sensor data in FIG. 22 of the event in FIG. 21 stored in the unit 53 for storing the status describing data and the sensor data in FIG. 28 of the event in FIG. 27 so that the status describing data 151 of the two events is different from each other. In this case, the unit 55 for learning the determining rule updates the response threshold to be small so as to recognize the close response from the close response data 101-1 at the interval A in FIG. 22. That is, the detecting condition is adjusted so as to detect the status (event) of the microwave sensor 22 based on the smaller change of the sensor data. Thus, the pattern of the status describing data 151 for the event in FIG. 21 indicates the order of the status Nos. 1, 0, 1, and 2, and is identified from the pattern of the status describing data 151 (status Nos. 1 and 2). Thus, the event in FIG. 21 is determined as notifying event and the event in FIG. 27 is determined as the non-notifying event.

In step S206, the unit 55 for learning the determining rule updates the status describing data 151 stored in the unit 53 for storing the status describing data based on the response threshold and the existing buffer size which are adjusted in step S205. The unit 55 for learning the determining rule reads, one by one, the sensor data of the events stored in the unit 53 for storing the status describing data, re-describes the status describing data 151 based on the response threshold and the existing buffer size which are adjusted in step S205, and updates the status describing data 151 stored in the unit 53 for storing the status describing data to the re-described data.

When the head of the status describing data 151 is the status No. 0, the interval of the head status No. 0 is determined that the microwave sensor 22 does not indicate the response (event is not generated yet) in the processing for determining the response of the microwave sensor based on the response threshold and the existing buffer size which are adjusted in step S205. Therefore, the description of the head status No. 0 is deleted from the status describing data 151. When the end of the status describing data 151 is the status No. 0, the interval of the status No. 0 at the end of the status describing data 151 is determined that the microwave sensor 22 does not indicate the response (event has already ended) by the processing for determining the response of the microwave sensor based on the response threshold and the existing buffer size which are adjusted in step S205. Thus, the description of the status No. 0 at the end of the status describing data 151 is deleted from the status describing data 151. Thus, the status describing data 151 is described starting from the status No. except for the status No. 0 and ending to the status No. except for the status No. 0.

Figure 25:
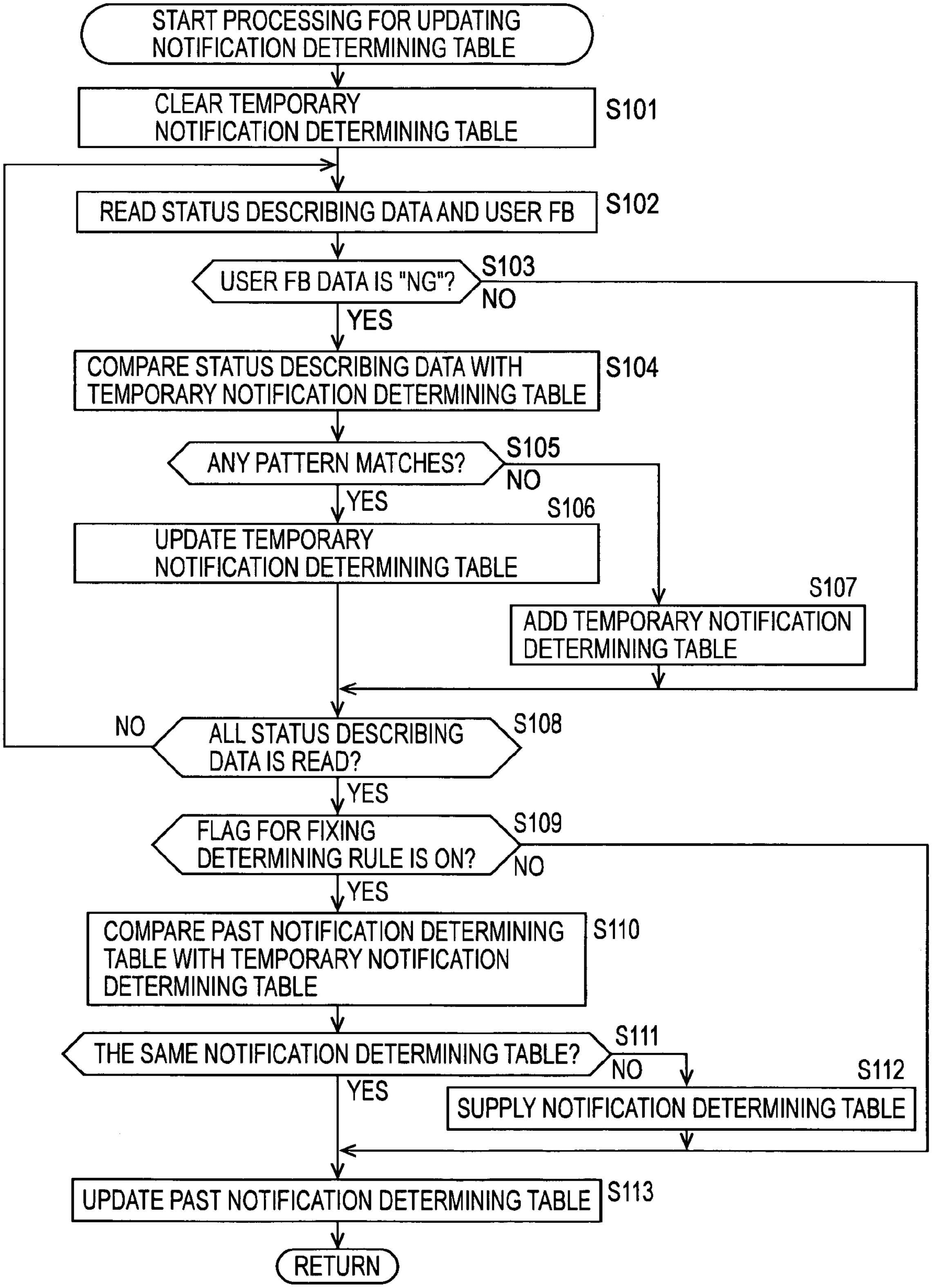
FIG. 25 is a flowchart for explaining the detailed processing for updating the notification determining table.

In step S207, the unit 54 for updating the notification determining table performs the processing for updating the notification determining table with reference to FIG. 25, and updates the notification determining table 161 stored in the unit 217 for storing the past notification determining table. The processing for updating the notification determining table is performed for the status describing data 151 updated in step S206, that is, the status describing data 151 which is updated based on the response threshold adjusted in step S205. Therefore, the notification determining table 161 is updated based on the response threshold adjusted in step S205.

After the processing in step S207, the processing returns to step S201. In steps S201 to S204, it is determined again, based on the status describing data 151 updated in step S206 and the notification determining table 161 updated in step S207, whether or not the learned event is the non-notifying event (is the event prescribed in the updated notification determining table 161). In step S204, when it is determined again that the leaned event is the non-notifying event, the processing advances to step S205 whereupon the response threshold is re-adjusted. After that, until it is determined in step S204 that the learned event is not the non-notifying event, the above processing is repeated.

The response threshold is adjusted to be proper by the above-mentioned processing so as to accurately identify the event (notifying event as determined "OK (notification is necessary in the future) and the event (non-notifying event) determined as "NG (notification is not necessary in the future). That is, the detecting condition of the status (event) of the microwave sensor 22 is adjusted so that the estimation whether or not the notification of the event is necessary from the user (estimation whether or not the notification is necessary by the feedback from the user) matches the determination based on the notification determining table 161 whether or not the notification of the event is necessary (processing for determining the event notification).

Figure 29:
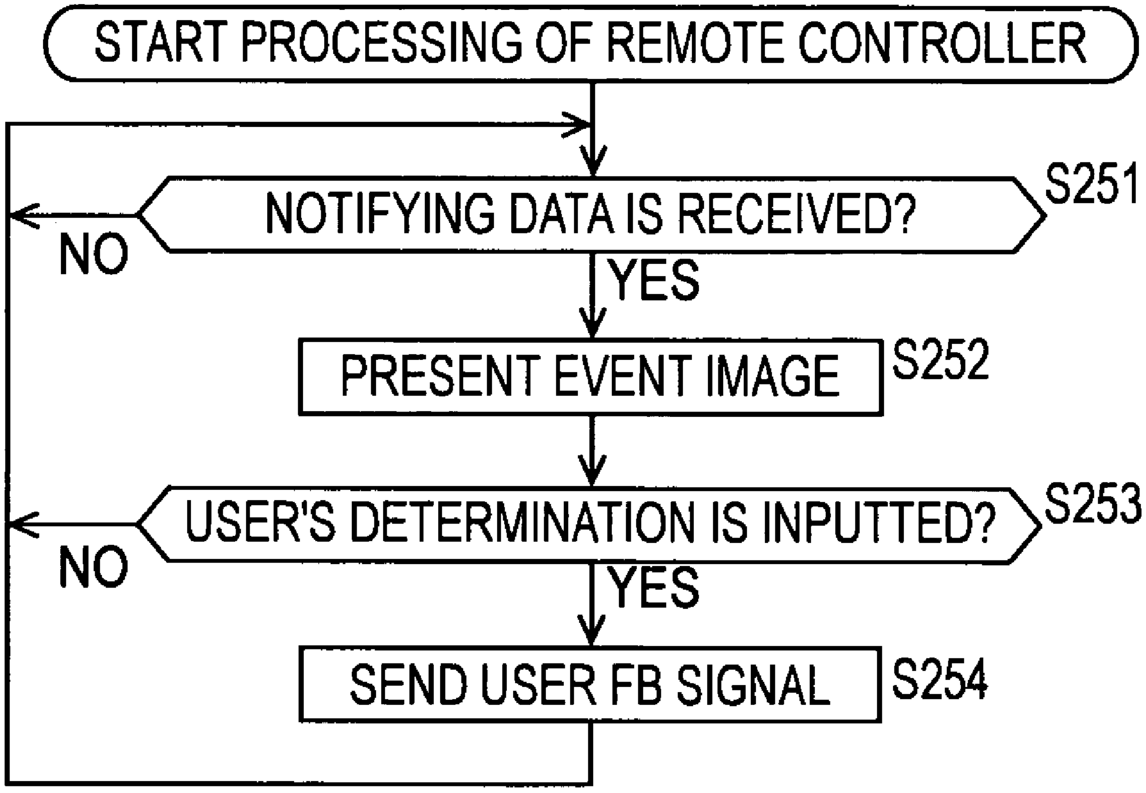
FIG. 29 is a flowchart for explaining the processing of the remote controller.

Next, a description is given of the processing of the remote controller 4 which is executed in accordance with the processing of the processing box 2 shown in FIGS. 23 and 24 in accordance with FIG. 29. When the power of the remote controller 4 is turned on, the processing starts.

In step S251, the receiving unit 81 determines whether or not the notifying data is received from the processing box 2, and waits until the notifying data is received. When it is determined that the notifying data is received, in step S252, the receiving unit 81 allows the presenting unit 82 to present the event image (notifying image data) based on the notifying data (sent by the processing in step S53 in FIG. 23) sent from the processing box 2.

The user views the event image presented on the presenting unit 82, and operates the input unit 83. Further, the user inputs the determination (whether or not the currently-presented event needs to be notified in the future).

In step S253, the input unit 83 determines whether or not the determination for the presented event (user feedback) is inputted from the user. If it is determined that the user feedback is inputted, the input unit 83 supplies the user FB signal to the sending unit 84, and the processing advances to step S254.

In step S254, the sending unit 84 sends, to the processing box 2, the user FB signal supplied from the input unit 83. The processing box 2 receives the signal, and correlates the received data with the status describing data 151 stored in the unit 53 for storing the status describing data (step S63 in FIG. 23).

After the processing in step S254 or in step S253, when it is determined that the user feedback is not inputted, the processing returns to step S251 whereupon the above processing is repeated.

As mentioned above, the monitoring system 10 starts the monitoring operation and the predetermined time passes, then, it is determined that the processing for learning the determining rule is sufficient in step S72 in FIG. 24, in step S75, the flag for fixing the determining rule of the processing box 2 is on. In step S74, the notification for fixing the determining rule is sent to the multi-sensor camera 1 from the processing box 2. In step S21 in FIG. 20, the notification for fixing the determining rule is received by the multi-sensor camera 1. In step S22, the flag for fixing the determining rule of the multi-sensor camera 1 is on. After setting-on the flag for fixing the determining rule in the multi-sensor camera 1 and the processing box 2, the monitoring system 10 executes the processing after ending the period for learning the determining rule. That is, based on the determining rule fixed by the processing for learning the determining rule, the monitoring system 10 performs the monitoring operation.

Next, a description is given of the processing which is executed by the monitoring system 10 after ending the period for learning the determining rule.

First, a description is given of the processing which is executed by the multi-sensor camera 1 after ending the period for learning the determining rule with reference to FIGS. 19 and 20.

Upon ending the period for learning the determining rule, in step S72 in FIG. 24, it is determined that the processing for learning the determining rule is sufficient. In step S74, the notification for fixing the determining rule is sent from the processing box 2. In step S21, the multi-sensor camera 1 receives the notification for fixing the determining rule. In step S22, the flag for fixing the determining rule is set-on. After that, the processing returns to step S22 and the status describing unit 41 obtains the sensor data from the microwave sensor 22.

In step S3, the status describing unit 41 performs the processing for describing the status data on a series of actions of the person 91 (moving thing as the monitoring target) within the monitoring area based on the determining rule fixed by the processing for learning the determining rule and the sensor data obtained in the processing in step S2. That is, as described with reference to FIG. 12, the status describing unit 41 sets the status No. 1 when the microwave sensor 22 detects the close response of the person 91, further sets the status No. 2 when the microwave sensor 22 detects the apart status of the person 91, and correlates the status Nos. 1 and 2 with the continuous times. The status describing data 151 including the above-described status Nos. and the response continuous times is outputted to the unit 42 for determining the event notification.

In step S4, the unit 42 for determining the event notification determines whether or not the event notifying flag is on (the notifying event is currently generated). If it is determined that the event notifying flag is not on but off (the notifying event is not currently generated), the processing advances to step S8.

In step S8, the unit 42 for determining the event notification determines whether or not the flag for fixing the determining rule is on. In this case, the period for learning the determining rule has already ended and the flag for fixing the determining rule is on. Thus, the processing advances to step S9.

In step S9, the unit 42 for determining the event notification performs the processing for determining the event notification, that is, determining whether or not the notifying event is generated. As mentioned above with reference to FIG. 17, the unit 42 for determining the event notification determines whether or not the notification determining table 161, in which the pattern matches the pattern of the status No. of the status describing data 151 obtained in step S3, exists. If it is determined that the notification determining table 161, in which the pattern matches the pattern of the status No. of the status describing data 151 obtained in step S3, exists, the unit 42 for determining the event notification determines whether or not the continuous time of the status No. of the status describing data 151 is within the range of the minimum continuous time to the maximum continuous time of the status No. in the notification determining table 161. When the notification determining table 161, in which the pattern matches the pattern of the status No. of the status describing data 151, does not exist or when the continuous time of the status No. of the status describing data 151 is not within the range of the minimum continuous time to the maximum continuous time of the status No. in the notification determining table 161, it is determined that notifying event (event which is not prescribed in the notification determining table 161) is generated. If not so, it is determined that the notifying event is not generated.

In step S10, the unit 42 for determining the event notification determines, based on the processing result in step S9, whether or not the generated event is the notifying event. If it is determined that the generated event is the notifying event, the processing advances to step S11 whereupon the unit 42 for determining the event notification supplies a power control signal to the CCD camera 21, turns on the power of the CCD camera 21, and sets-on the event notifying flag. That is, only when it is determined that the generated event is the notifying event, the power of the CCD camera 21 is turned on. If it is determined that the generated event is not the notifying event, the power of the CCD camera 21 is off. Thus, the unnecessary battery-consumption is prevented.

In step S12, the unit 42 for determining the event notification sends the notifying event generating signal to the processing box 2 via the sending unit 46, supplies the control signal for sending the notifying image to the switch 44, and turns-on the switch 44. Thus, the transmission of the notifying image data (event image obtained by picking-up the monitoring area 31 by the CCD camera 21) starts to the processing box 2 from the CCD camera 21. The processing box 2 receives the notifying image data, and allows the presenting unit 3 to present the data in step S53 in FIG. 23. That is, steps S9 to S12 is different from the steps during the period for learning the determining rule. The normal processing for determining the event notification is performed. Based on the determining result, the user event is notified.

In step S10, the generated event is not the notifying event, that is, it is determined that the generated event is the non-notifying event. Then, the processing in steps S11 and 12 is skipped and advances to step S17.

In step S4 (the event notifying flag is on in step S11, via the processing in step S21 or S22, after steps S2 and S3, the processing in step S4 which is executed again), it is determined that the event notifying flag is on (notifying event is generated). Then, the processing advances to step S5.

In step S5, the unit 42 for determining the event notification determines whether or not the event ends. After ending the period for learning the determining rule, the steps are different from those during the period for learning the determining rule, and the normal determination of the event end is performed. That is, the unit 42 for determining the event notification determines whether or not the status No. 0 (state in which the microwave sensor 22 indicates neither the close response nor the apart response) continues for a predetermined period. If the unit 42 for determining the event notification determines that the status No. 0 continues for the predetermined period, the unit 42 for determining the event notification determines that the event ends. When it is determined that the event ends, the processing advances to step S6.

It is determined that the event ends after determining the status of the status No. 0 continues for a predetermined period which is preset so as to prevent the erroneous determination that the event ends at the relatively short interval of the status No. 0 (microwave sensor 22 does not indicate the response) as shown at the interval B in FIG. 22.

In step S6, the unit 42 for determining the event notification supplies a power control signal to the CCD camera 21, turns off the power of the CCD camera 21, and sets-off the event notifying flag.

In step S7, the unit 42 for determining the event notification supplies the control signal for sending the status describing data to the switch 43, turns on the power of the switch 43, supplies the control signal for sending the notifying image to the switch 44, and turns off the power of the switch 44. Thus, the status describing data 151 outputted from the status describing unit 41 in step S3 is sent to the processing box 2 via the switch 43 and the sending unit 46, and the transmission of the notifying image data (event image) sent to the processing box 2 via the switch 44 and the sending unit 46 from the CCD camera 21 stops. After ending the period for learning the determining rule, the sensor data is not sent to the processing box 2 and therefore the processing for stopping the transmission of the sensor data is not performed in step S7.

When it is determined in step S5 that the event does not end, the processing in steps S6 and S7 is skipped and advances to step S17.

In step S17, the unit 42 for determining the event notification determines whether or not the notification determining table 161 is received from the processing box 2 via the receiving unit 47 (sent in the processing in step S78 in FIG. 24). When it is determined that the notification determining table 161 is received, the processing advances to step S18 whereupon the unit 42 for determining the event notification updates the held notification determining table 161 by the received notification determining table 161. When it is determined that the notification determining table 161 is not received by the processing box 2, the processing in step S18 is skipped and the processing advances to step S19.

In step S19, the status describing unit 41 determines whether or not the determining rule is received from the processing box 2 via the receiving unit 47. The processing for learning the determining rule is not performed in the processing box 2 after ending the period for learning the determining rule and the determining rule is not sent. Therefore, the processing in step S20 is skipped and the processing advances to step S21.

In step S21, the unit 42 for determining the event notification determines whether or not the notification for fixing the determining rule is received from the processing box 2 via the receiving unit 47. In this case, the period for learning the determining rule ends, the determining rule is fixed, and the notification for fixing the determining rule is not sent from the processing box 2. Thus, the processing in step S22 is skipped, the processing returns to step S2, and the above-mentioned processing repeats.

After ending the period for learning the determining rule, the status describing data 151 is described under the determining rule fixed by the processing for learning the determining rule. The processing for determining the event notification is performed based on the described status describing data 151. If it is determined that the notifying event is generated, the event is notified to the processing box 2.

Next, a description is given of the processing in the processing box 2 which is executed in accordance with the processing after the period for learning the determining rule of the multi-sensor camera 1 shown in FIGS. 19 and 20 with reference to FIGS. 23 and 24.

Upon ending the period for learning the determining rule, in step S72, it is determined that the processing for learning the determining rule is sufficient. In steps S73 and S74, the notification determining table 161 and the notification for fixing the determining rule are sent to the multi-sensor camera 1. In step S75, the flag for fixing the determining rule is set-on. After that, in step S79, the flag for receiving the status describing data and the flag for receiving the user feedback are set-off. The processing returns to step S52.

The processing during the period for learning the determining rule is the same as the processing in steps S52 to S66 (processing for presenting the event to the user and for receiving the status describing data 151 of the presented event and the user FB signal of the presented event), and a description thereof is omitted. However, after ending the period for learning the determining rule, it is determined in step S54 that the flag for fixing the determining rule is on and the processing in step S55 is skipped. Therefore, the sensor data of the presented event is not stored and only the user feedback and the status describing data 151 are stored in the unit 53 for storing the status describing data.

In step S67, the unit 55 for learning the determining rule determines whether or not the flag for fixing the determining rule is on. In this case, it is determined that the flag for fixing the determining rule is on and the processing advances to step S76.

In step S76, the unit 54 for updating the notification determining table determines whether or not the user FB signal obtained in step S61 is "NG (notification is not necessary in the future)". If it is determined that the user FB signal is "NG", the processing advances to step S77.

In step S77, the unit 54 for updating the notification determining table performs the processing for updating the notifying determining table (partly different from the processing for updating the notification determining table during the period for learning the determining rule) with reference to FIG. 25. The processing updates the notification determining table 161 which is stored in the unit 217 for storing the past notification determining table.

When the notification determining table 161 different from the past notification determining table 161 is formed in step S77 and the resultant table is stored in the unit 217 for storing the past notification determining table, in step S78, the unit 54 for updating the notification determining table sends the new notification determining table 161 to the multi-sensor camera 1 via the sending unit 56. The multi-sensor camera 1 receives and updates the new notification determining table 161 (in steps S17 and S18 in FIG. 20).

If it is determined in step S76 that the user FB signal is not "NG (notification is not necessary in the future), the processing in steps S77 and S78 is skipped. The processing for updating the notification determining table is not performed and the processing advances to step S79.

In step S79, the unit 54 for updating the notification determining table sets-off the flag for receiving the user feedback, and the receiving unit 51 sets-off the flag for receiving the status describing data.

After the processing in step S79, the processing returns to step S52 and the above-mentioned processing repeats.

As mentioned above, after ending the period for learning the determining rule, the event image is presented to the user. In response to the presentation, the user inputs the feedback indicating "NG (notification is not necessary in the future), then, the notification determining table 161 is updated, and it is sent to the multi-sensor camera 1.

Next, a detailed description is given of the processing for updating the notification determining table after ending the period for learning the determining rule in step S77 in FIG. 24 with reference to FIG. 25.

The processing in steps S101 to S108 is the same as that during the period for learning the determining rule. That is, after ending the period for learning the determining rule, the same processing as that during the period for learning the determining rule is performed, thereby forming the temporary notification determining table 161.

In step S109, the table comparing unit 216 determines whether or not the flag for fixing the determining rule is on. In this case, the period for learning the determining rule ends and the flag for fixing the determining rule is on. Therefore, the processing advances to step S110.

In step S110, the table comparing unit 216 compares the past notification determining table 161 stored in the unit 217 for storing the past notification determining table with the temporary notification determining table 161 which is stored in the unit 215 for storing the temporary notification determining table.

In step S111, the table comparing unit 216 determines based on the comparing result in step S110 whether or not the past notification determining table 161 is the same as the temporary notification determining table 161. If it is determined in step S111 that the past notification determining table 161 is not the same the temporary notification determining table 161, the processing advances to step S112 whereupon the table comparing unit 216 supplies, to the sending unit 56, the temporary notification determining table 161 stored in the unit 215 for storing the notification determining table as the latest notification determining table 161. As mentioned above, the latest notification determining table 161 is sent to the multi-sensor camera 1 in step S78 in FIG. 24.

If it is determined in step S111 that the past notification determining table 161 is the same the temporary notification determining table 161, the same notification determining table 161 has already been sent to the multi-sensor camera 1 and therefore the processing in step S112 is skipped. Then, the processing advances to step S113.

In step S113, the table comparing unit 216 supplies, to the unit 217 for storing the past notification determining table, the temporary notification determining table 161 stored in the unit 215 for storing the temporary notification determining table, and updates the past notification determining table 161 which has already been stored.

As a result of the above processing, the notification determining tables 161 comprising the notification determining tables 161-1 to 161-n as shown in FIG. 16 are stored in the unit 217 for storing the past notification determining table. The pattern when the notification of event is not necessary is stored in the notification determining table 161. After ending the period for learning the determining rule, unlike the period for learning the determining rule, when the updated notification determining table 161 is different from the past notification determining table 161 stored in the unit 217 for storing the past notification determining table, the updated notification determining table 161 is sent to the multi-sensor camera 1 via the sending unit 56.

The processing of the remote controller 4 after ending the period for learning the determining rule is the same as the processing during the period for learning the determining rule mentioned above with reference to FIG. 29, and a description thereof is omitted.

As mentioned above, the response threshold is adjusted based on the feedback from the user and the sensor data of the microwave sensor 22. The status describing data 151 of the past event is updated based on the adjusted response threshold and the existing buffer size (determining rule), and the notification determining table 161 is updated. Only the event which is necessary for the user is notified and the power of the CCD camera 21 is turned on only when the event is notified. Therefore, the unnecessary battery-consumption is suppressed.

Further, in the above-mentioned monitoring system 10, during the period for learning the determining rule, the multi-sensor camera 1 sends the sensor data of the microwave sensor 22 to the processing box 2, and the processing for learning the determining rule is performed based on the sensor data. However, the multi-sensor camera 1 does not send the sensor data to the processing box 2 and the processing for learning the determining rule is performed without the sensor data. In the period for learning the determining rule without sending the sensor data to the processing box 2 from the multi-sensor camera 1, the transmission of the sensor data suppresses the power consumed by the multi-sensor camera 1. Hereinafter, a sensor data system is used for a system for the processing for learning the determining rule with the sensor data described with reference to FIGS. 19 to 29, and a power-consumption system is used for a system for the processing for learning the determining rule without the sensor data, which will be described later.

A description is given of the processing which is executed by the monitoring system 10 as the power-consumption system with reference to FIGS. 30 to 34. The same processing of the monitoring system 10 in the sensor data system and the power-consumption system is not described and only different processing is described. The processing after ending the period for learning the determining rule is the same as that in the sensor data system and the power-consumption system. Therefore, a description thereof is omitted, and only the processing in the power-consumption system is described during the period for learning the determining rule. Further, the processing of the remote controller 4 is the same as the processing in the sensor data system which is described above with reference to FIG. 29 and a description thereof is omitted.

Figure 30:
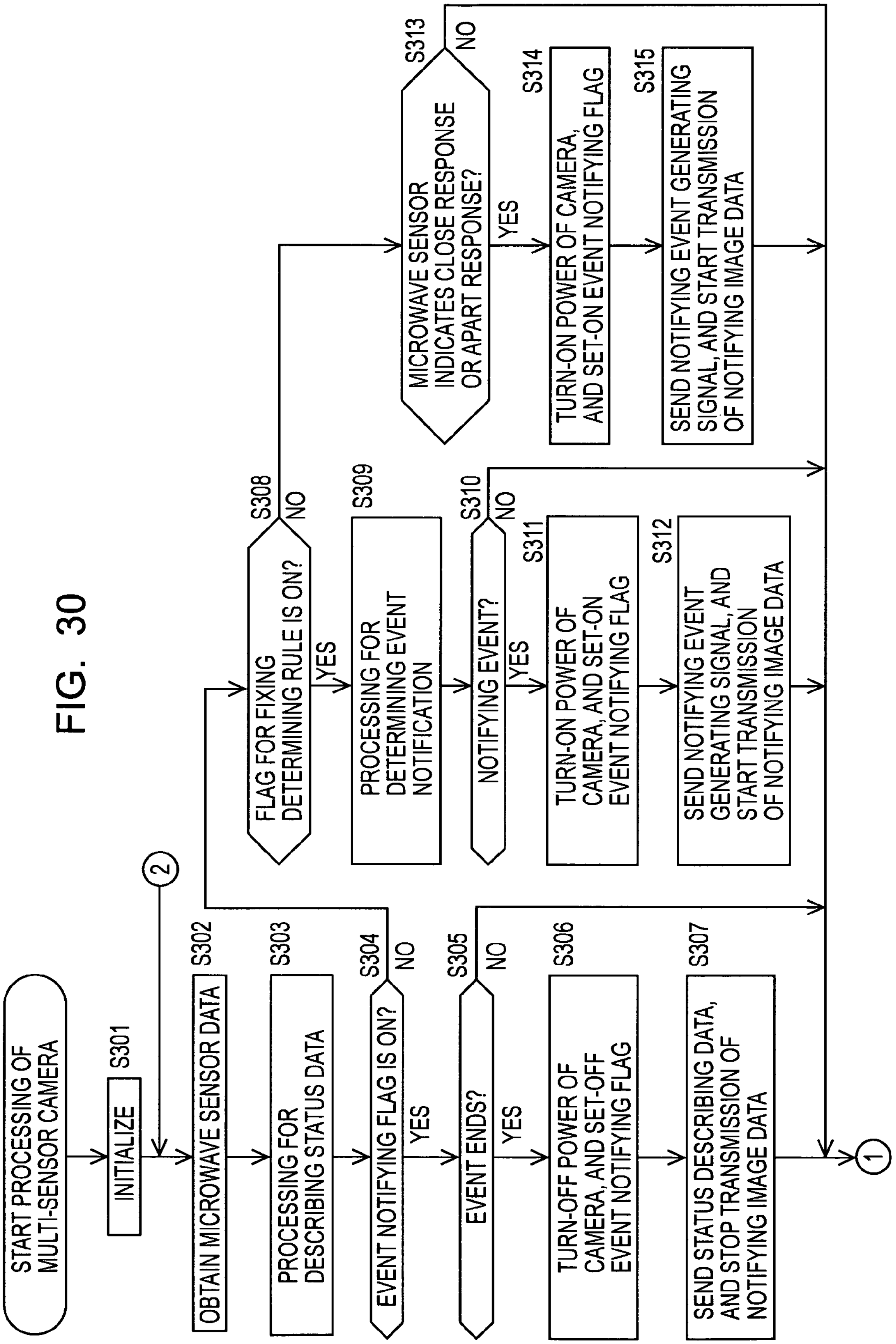
FIG. 30 is one flowchart for explaining the processing of the multi-sensor camera in a power consumption system.
Figure 31:
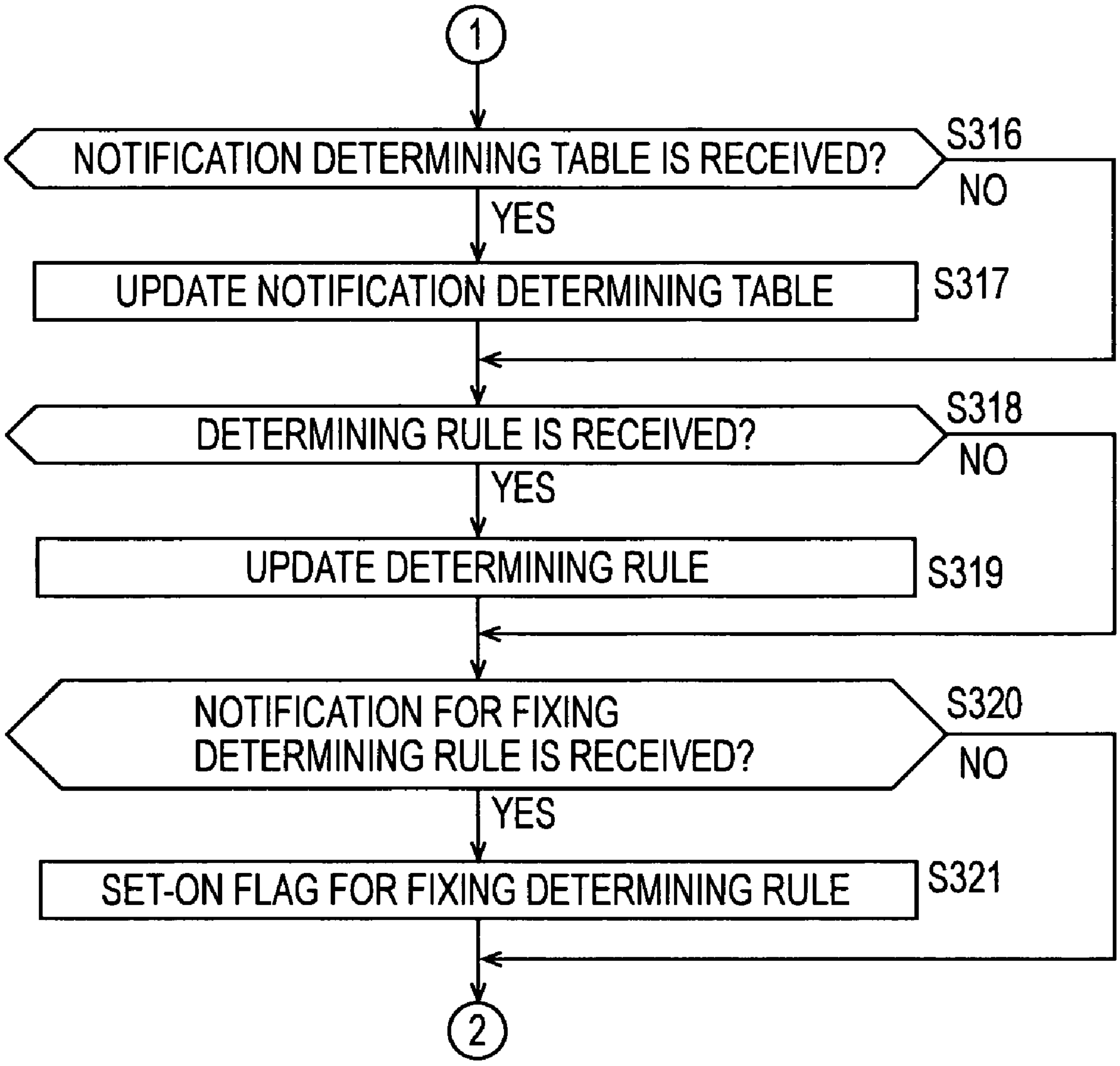
FIG. 31 is another flowchart for explaining the processing of the multi-sensor camera in the power consumption system.

First, a description is given of the processing for learning the determining rule of the power-consumption system, which is executed by the multi-sensor camera 1 during the period for learning the determining rule with reference to FIGS. 30 and 31. The processing for learning the determining rule of the power-consumption system will be described by the comparison with that in the sensor data system. When the user instructs the monitoring operation in the monitoring area, the processing starts.

As will be obvious by using the comparison with steps S1 to S22 in FIGS. 19 and 20, the processing in steps S301 to S321 in FIGS. 30 and 31 is basically the same in the power consumption system and the sensor data system. However, the start condition and the end condition for notifying the event during the period for learning the determining rule are different between the power-consumption system and the sensor data system. That is, between the power consumption system and the sensor data system, the period for notifying the event during the period for learning the determining rule is different.

In the sensor data system, in step S13 in FIG. 19, it is determined that at least one of the close response data 101 or the apart response data 102 is outputted even once from the microwave sensor 22 during the current buffer-size. Then, in steps S14 and S15, the transmission of the event image (event notification) starts. On the contrary, in the power consumption system, in step S313 in FIG. 30, the status describing unit 41 determines in the processing for determining the sensor response of the microwave sensor that the number of close response data 101 or apart response data 102 outputted during the period of the current buffer-size (microwave sensor 22 indicates the close response or apart response), the processing advances to step S314. In steps S314 and S315, the transmission of the event image (event notification) starts.

In the sensor data system, it is determined in step S5 in FIG. 19 that neither the close response data 101 nor the apart response data 102 is outputted from the microwave sensor 22 for a predetermined period, it is determined that the event ends. Then, in steps S6 and S7, the transmission of the event image (event notification) stops. On the contrary, in the power consumption system, in step S305 in FIG. 30, the status describing unit 41 determines whether or not the period determined by the processing for determining the sensor response of the microwave that the number of the close response data 101 or apart response data 102 outputted during the period for the current buffer-size is less than the response threshold (microwave sensor 22 indicates the close response nor the apart response (status No. 0)) continues for a predetermined period. If it is determined that the status No. 0 continues for the predetermined period, it is determined that the event ends. Then, the processing advances to step S306. In steps S306 and S307, the event notification stops.

In the sensor data system, the status describing data 151 is updated under the determining rule adjusted by the processing for learning the determining rule as mentioned above, and the period of the past generated event is changed. Therefore, the event is notified to the user for the period having the highest possibility that the event is generated based on the determination whether or not at least one of the close response data 101 and the apart response data 102 is outputted even once from the microwave sensor 22. The sensor data and the status describing data 151 are sent to the processing box 2.

On the contrary, in the power consumption system, in the processing for learning the determining rule, which will be described later with reference to FIG. 34, the status describing data 151 which has been described once is not updated, and the period of the event which was generated is not changed. Therefore, the event notification starts and stops based on the determination whether or not the microwave sensor 22 indicates the response (whether or not the event is generated) by the processing for determining the response of the microwave sensor under the determining rule upon generating the event. That is, the event detected under the determining rule upon generating the event is notified and the status describing data 151 is sent to the processing box 2.

The processing for sending the sensor data to the processing box 2 is performed in step S16 in FIG. 19 in the sensor data system. However, it is not performed in the power consumption system (processing corresponding to that in step S16 in FIG. 19 is not executed after the processing in step S315 in FIG. 30 but the processing in step S316 corresponding to that in step S17 in FIG. 19 is performed). That is, in the power consumption system, the sensor data of the microwave sensor 22 on the event notified to the user is not sent to the processing box 2.

Except for the above-mentioned processing, the processing of the multi-sensor camera 1 in the power consumption system is the same as that in the sensor data system during the period for learning the determining rule. Therefore, a description thereof is omitted.

Figure 32:
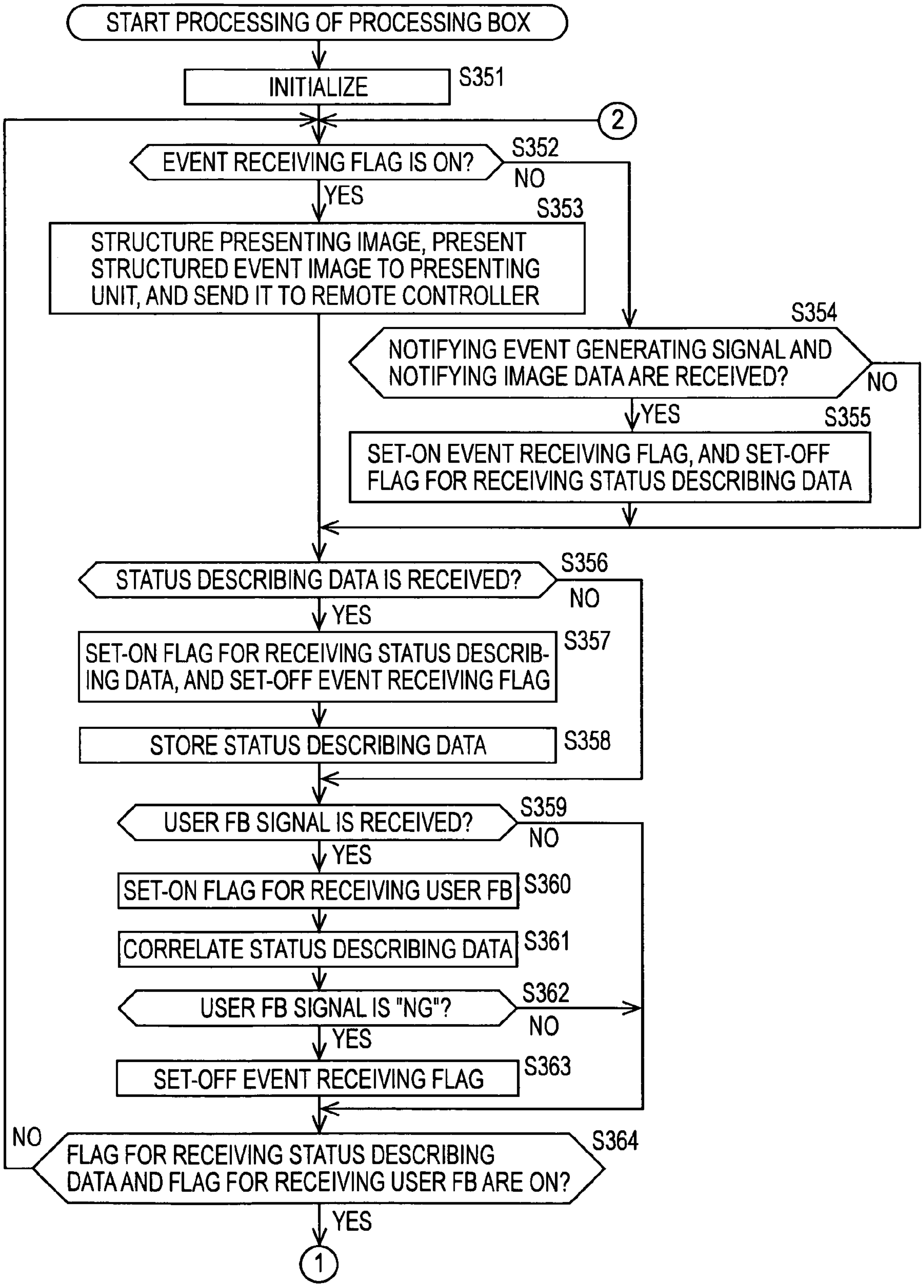
FIG. 32 is one flowchart for explaining the processing of the processing box in the power consumption system.
Figure 33:
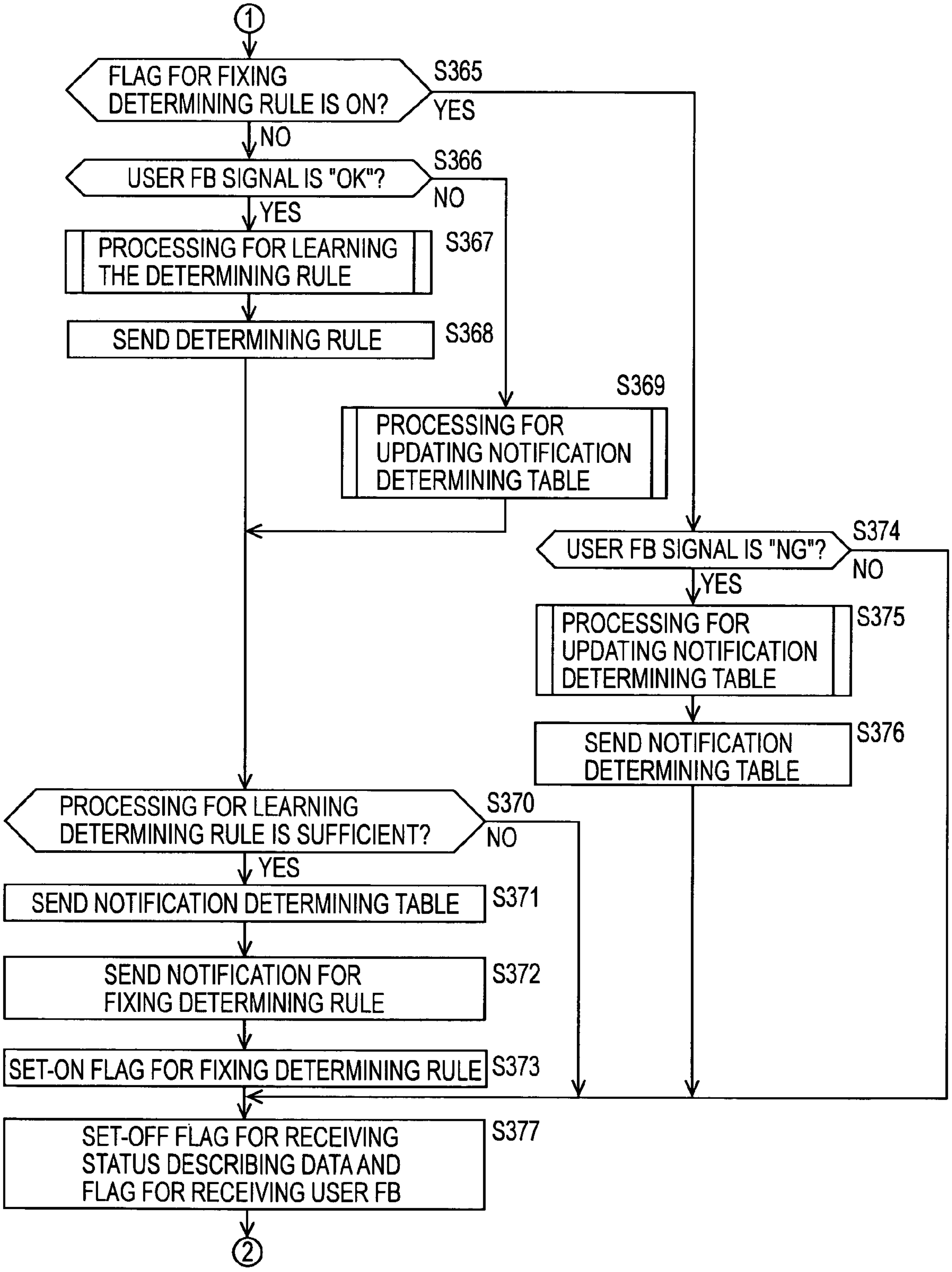
FIG. 33 is another flowchart for explaining the processing of the processing box in the power consumption system.

Next, a description is given of the processing of the processing box 2 which is executed in accordance with the processing during the period for learning the determining rule of the multi-sensor camera 1 shown in FIGS. 30 and 31 during the period for learning the determining rule in the power consumption system with reference to FIGS. 32 and 33. Incidentally, when the user instructs the presentation of the image corresponding to the general viewing signal (broadcasting program signal) to the presenting unit 3 or when the user instructs the monitoring operation in the monitoring area, the processing starts.

As will be obvious by comparing steps S351 to S377 in FIGS. 32 and 33 with steps S51 to S79 in FIGS. 23 and 24, the basic processing is the same in both the power consumption system and the sensor data system.

However, the processing for storing the sensor data in steps S54 and S55 in FIG. 23 in the sensor data system is not performed in the power consumption system. That is, the sensor data of the event notified to the user is not stored in the power consumption system (as mentioned above with reference to FIG. 30, the multi-sensor camera 1 does not send the sensor data).

The processing for learning the determining rule in step S367 in FIG. 33 in the power consumption system is different from the processing for learning the determining rule (refer to FIG. 26) in step S69 in FIG. 24 in the sensor data system. The details of the processing for learning the determining rule in the power consumption system will be described later with reference to FIG. 34.

Except for the above-mentioned processing of the processing box 2, the processing of the processing box 2 in the power consumption system is the same as that in the sensor data system during the period for learning the determining rule. Therefore, a description thereof is omitted. The processing for updating the notification determining table in step S369 in the power consumption system is the same as the processing in the sensor data system in FIG. 25 and therefore a description thereof is omitted.

Figure 34:
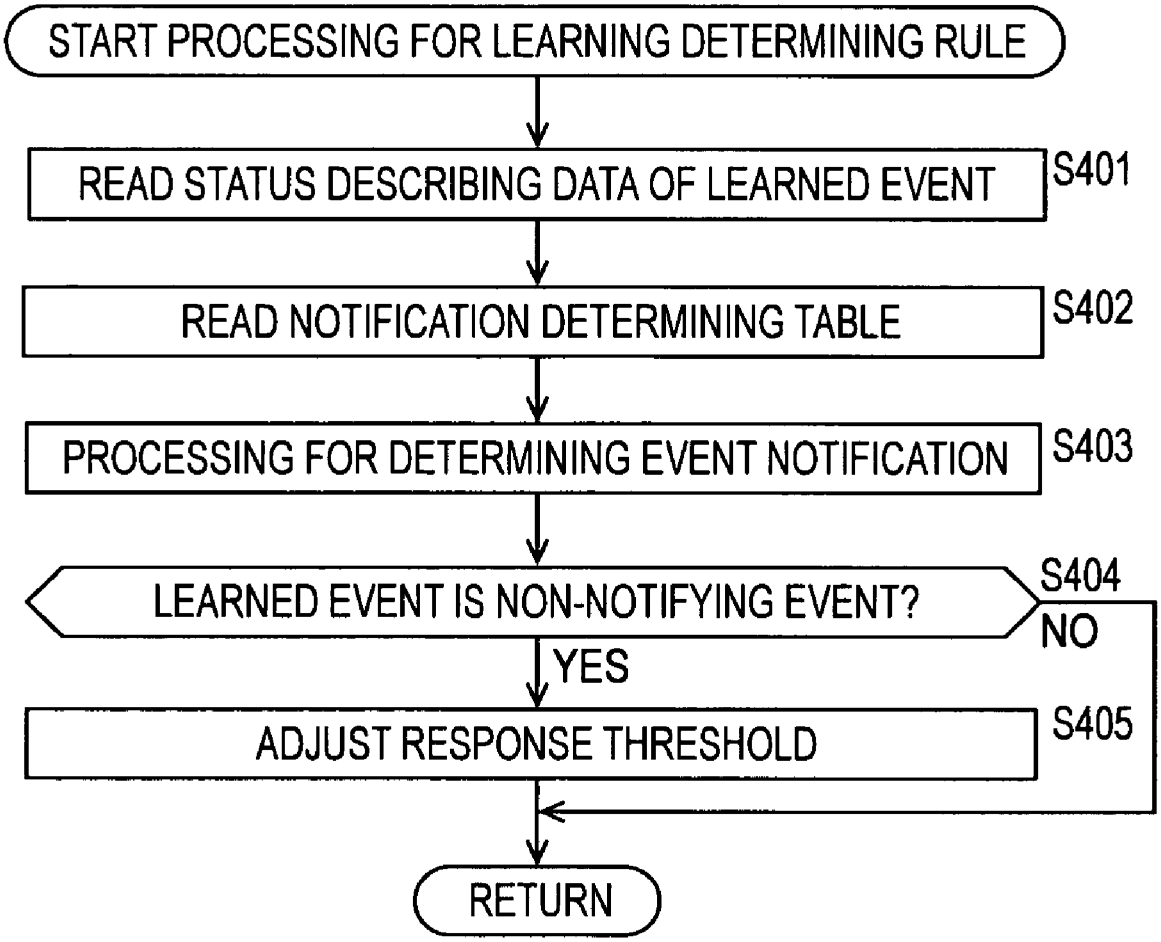
FIG. 34 is a flowchart for explaining the detailed processing for learning the determining rule in the power consumption system.

Next, a detailed description is given of the period for learning the determining rule in the power-consumption system in step S367 in FIG. 33 with reference to FIG. 34.

In step S401, the unit 55 for learning the determining rule reads, from the unit 53 for storing the status describing data, the status describing data 151 of the event (learned event)

which is presented to the user in step S353 in FIG. 32 and which is determined that the user FB signal indicating "OK (notification is necessary in the future)" is inputted from the user in step S366 in FIG. 33.

In step S402, the unit 55 for learning the determining rule reads the notification determining table 161 from the unit 217 for storing the past notification determining table of the unit 54 for updating the notification determining table.

In step S403, the unit 55 for learning the determining rule performs the processing for notifying the event notification. That is, as mentioned above in detail with reference to FIG. 17, the unit 55 for learning the determining rule determines whether or not the notification determining table 161, in which the pattern matches the pattern of the status No. of the status describing data 151 of the learned event, exists. If it is determined that the notification determining table 161, in which pattern matches the pattern of the status No. of the status describing data 151 of the learned event, exists, the unit 55 for learning the determining rule determines whether or not the continuous time of the status No. of the status describing data 151 is within the minimum continuous time to the maximum continuous time of the status No. of the notification determining table 161. When it is determined that the notification determining table 161, in which pattern matches the pattern of the status No. of the status describing data 151 of the learned event, exists and the continuous time of the status No. of the status describing data 151 is within the minimum continuous time to the maximum continuous time of the status No. of the notification determining table 161, the learned event is determined as the non-notifying event (event prescribed in the notification determining table 161). If not so, it is determined that the learned event is determined as the notifying event (event which is not prescribed in the notification determining table 161).

In step S404, the unit 55 for learning the determining rule determines whether or not the learned event is the notifying event as a result of the processing in step S403. If it is determined that the learned event is the notifying event, that is, the event determined as "OK" by the user is not prescribed in the notification determining table 161 as the non-notifying event, the event is determined that the determining rule currently has a proper value, and the processing for learning the determining rule ends.

If the unit 55 for learning the determining rule determines in step S404 that the learned event is the non-notifying event, that is, the event determined as "OK" by the user is prescribed as the non-notifying event in the notification determining table 161, it is determined that it does not have the proper value. The processing advances to step S405 whereupon the response threshold is adjusted.

In step S405, the unit 55 for learning the determining rule adjusts the response threshold to be smaller by a predetermined from the current value. That is, since the adjustment is performed based on the fixed value, the adjustment is possible without the sensor data. Thus, the detecting standard of the response of the microwave sensor 22 is lower due to the processing for determining the response of the microwave sensor (it is determined by the smaller number of the close response data 101 or apart response data 102 outputted from the microwave sensor 22 that the microwave sensor 22 indicates the close response or apart response). Then, status describing unit 41 has the higher sensitivity for detecting the response of the microwave sensor 22. That is, the detecting condition is adjusted so as to detect the status (event) of the microwave sensor 22 from the smaller change of the sensor data. The number of pattern of the status describing data 151 for the generated event is increased and the grouping of event is fine. Thus, the status describing data 151 of the event determined as "OK" by the user has the pattern different from that of the status describing data 151 of the event determined as "NG". The possibility for identifying the different events is increased.

In the sensor data system, it is not checked, based on the sensor data, whether or not the adjusted response threshold is currently under the best condition (condition under which the estimation whether or not the notification of the feedback from the user for the event matches the determining result of the processing for notifying event notification). Thus, in the power consumption system, the period for learning the determining rule is set to be longer than that of the sensor data system. Alternatively, when the period for learning the determining rule is prescribed by the number of executing times of the processing for learning the determining rule, the number of executing times is set to be larger than that of the sensor data system.

The above-mentioned processing in the power consumption system adjusts the response threshold without the sensor data.

According to the present invention, a CMOS (Complementary Metal Oxide Semiconductor) camera and another camera can be used in addition to the CCD camera.

Further, the numbers of the multi-sensor cameras 1 and the presenting units 3 are not limited to one but are plural. The processing box 2 is not the casing independent of the presenting unit 3 but is formed by integrating the presenting unit 3. The remote controller 4 does not have the presenting unit 82 and only the presenting unit 3 may present the data. Alternatively, the processing box 2 may have an input unit for inputting the user feedback to the processing box 2.

The series of processing is executed by the hardware or by software. Upon executing the series of processing by the software, a program forming the software is installed in a computer incorporated in a dedicated hardware. Or, various programs are installed. Thus, the program is installed from a network or a recording medium to a general personal computer for executing the functions.

Figure 35:
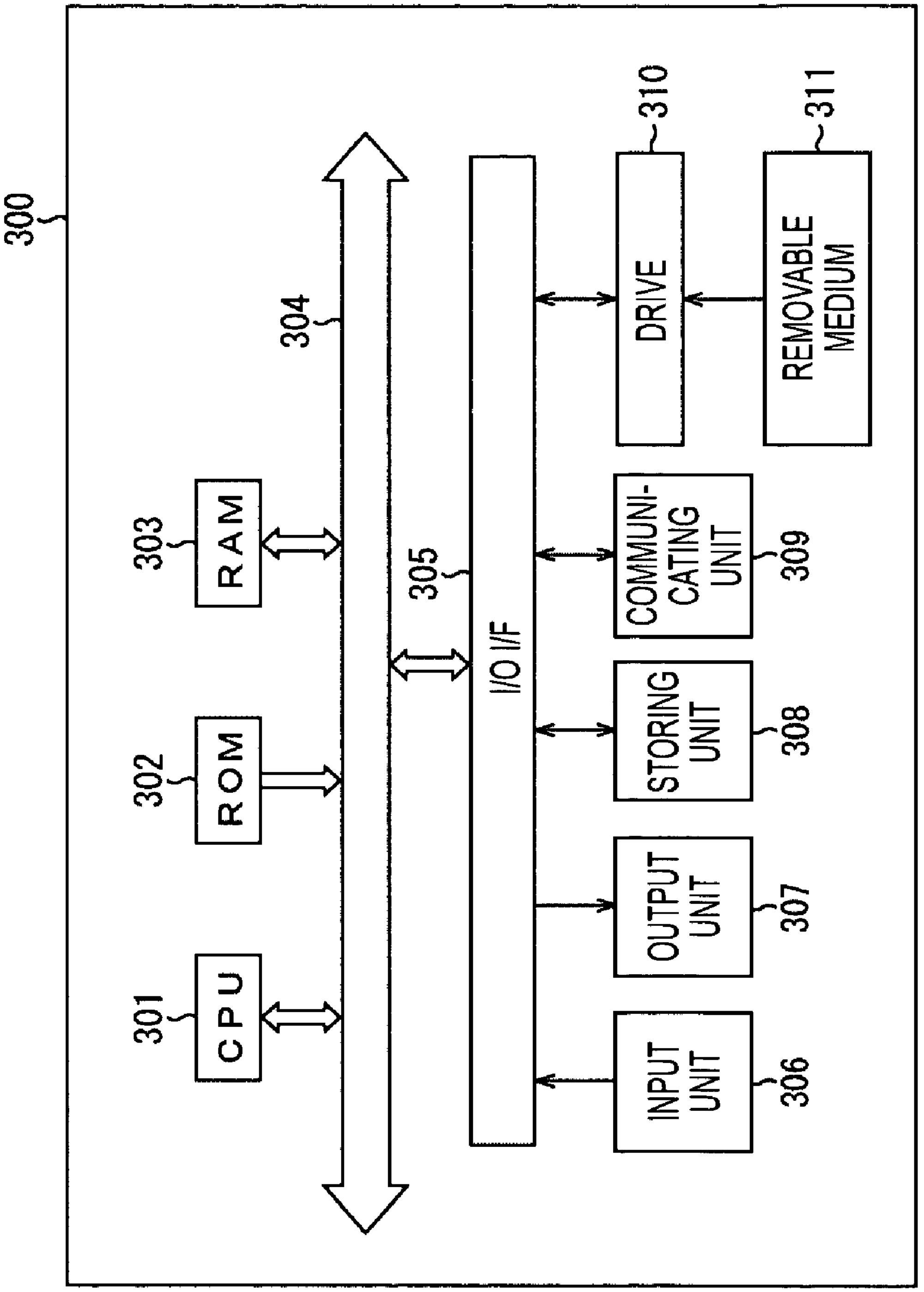
FIG. 35 is a block diagram showing an example of the structure of a general personal computer.

FIG. 35 is a diagram showing an example of the internal structure of a general personal computer 300. Referring to FIG. 35, a CPU (Central Processing Unit) 301 executes the various processing in accordance with a program stored in a ROM (Read Only Memory) 302 or a program loaded in a RAM (Random Access Memory) 303 from a storing unit 308. The RAM 303 properly stores data necessary for executing the various processing by the CPU 301.

The CPU 301, ROM 302, and RAM 303 are mutually connected via a bus 304. An input/output interface 305 is connected to the bus 304.

Connected to the input/output interface 305 are an input unit 306 comprising a button, switch, keyboard, and mouse, an output unit 307 comprising a display such as a CRT (Cathode Ray Tube) or an LCD (Liquid Crystal Display) and a speaker, the storing unit 308 comprising the hard disk, and a communicating unit 309 comprising a modem and a terminal adaptor. The communicating unit 309 performs the communication processing via the network including the Internet.

A drive 310 is connected to the input/output interface 305 if necessary. Further, a removable medium 311 comprising a magnetic disk, optical disk, a magneto-optical disk, or semiconductor memory is properly attached to the drive 310. A computer program read from the removable medium 311 is installed in the storing unit 308.

Referring to FIG. 35, the recording medium for recording a program which is installed in the computer and is executed by the computer comprises the removable medium 311 comprising a magnetic disk (including a flexible disk), an optical disk (including a CD-ROM (Compact Disc-Read Only Memory) or a DVD (Digital Versatile Disc)), an magneto-optical disk (including a MD (Mini-Disc) (registered trademark)), or a semiconductor memory, which is arranged to provide a program for the user, independently of the apparatus main body. Further, the recording medium comprises a hard disk included in the ROM 303 or the storing unit 308 which is previously incorporated in the apparatus main body and which records therein the program that is provided for the user.

In this specification, the step of describing the program stored in a program storing medium includes not only the processing which is executed on time series in order of the described order but also the processing which is not necessarily executed on time series but is executed in parallel or individually.

Further, in this specification, the system indicates the entire apparatus comprising a plurality of devices.

The present application contains subject matter related to Japanese patent application no. JP 2003-328266, filed in the JPO on Sep. 19, 2003, the entire contents of which being incorporated herein by reference.

What is claimed is:

1. A monitoring system comprising:

a first sensor configured to output first data based on a monitoring operation of a monitoring area;

a second sensor configured to output second data based on the monitoring operation of the monitoring area;

event detecting means for detecting a status of an event in the monitoring area, based on a preset detecting condition, from the first data;

notifying control means for controlling notification of the event based on the status of the event detected by said event detecting means;

presenting control means for controlling a presenting operation of the second data on the event that is controlled to be notified by said notifying control means, the presenting control means configured to detect a first event occurrence and a second event occurrence;

input obtaining means for obtaining an input for estimating whether or not the notification of a user is to be performed for the second data presented under the control of the presenting control means; and detecting condition adjusting means for adjusting the detecting condition based on feature data indicating a feature of the event based on the event status and the input for estimating whether or not the notification obtained by said input obtaining means is to be performed, wherein the notifying control means is configured to notify the user when the first event occurrence is detected, and the notifying control means does not notify the user when the second event occurrence is detected.

2. A monitoring system according to claim 1, wherein said detecting condition adjusting means adjusts the detecting condition based on the first data on the event.

3. A monitoring system according to claim 1, further comprising:

determining information generating means which generates determining information that determines, based on the event status and the input for estimating whether or not notification is to be performed, whether or not the notification of the event is to be performed, wherein said notifying controls means controls the event notification based on the determining information.

4. A monitoring system according to claim 3, wherein, when the estimation for the event that the notification of the user is to be performed, obtained from said input obtaining means, does not match the determining result based on the determining information that the notification for the event is to be performed, said detecting condition adjusting means adjusts the detecting condition to a second detecting condition.

5. A monitoring system according to claim 3, further comprising:

storing means which correlates the first data on the event, the feature data of the event, and the input for estimating whether or not notification is to be performed with each other, wherein said detecting condition adjusting means adjusts the detecting condition, based on the feature data of the event and the input for estimating whether or not the notification is to be performed which are stored by said storing means and the first data on the event stored by said storing means, so that the estimation of notification need of the event from the user obtained by said input obtaining means matches the determining result based on the determining information that the event notification is to be performed.

6. A monitoring system according to claim 5, wherein said detecting condition adjusting means updates the feature data of the event stored by said storing means, based on the first data on the event stored by said storing means and the detecting condition adjusted by said detecting condition adjusting means, and said determining information generating means generates the determining condition, based on the feature data of the updated event and the input for estimating whether or not the notification is to be performed, which is stored by said storing means.

7. A monitoring system according to claim 1, wherein said first sensor comprises a microwave sensor, and said second sensor comprises a camera.

8. A monitoring system according to claim 1, wherein said first sensor, said second sensor, said event detecting means, said presenting control means, said input obtaining means, and said detecting condition adjusting means are separately arranged to any of a first information processing apparatus and a second information processing apparatus.

9. A monitoring system according to claim 8, wherein said first information processing apparatus communicates by radio with said second information processing apparatus.

10. A monitoring system according to claim 8, wherein said first information processing apparatus is driven by a battery.

11. A monitoring system according to claim 1, wherein the detecting condition is a threshold for comparing the number of the first data outputted by said first sensor for a current predetermined period, and said detecting condition adjusting means adjusts the threshold.

12. An information processing method comprising:

a data obtaining step of obtaining first data based on a monitoring operation of a monitoring area by a first sensor;

an event detecting step of detecting a status of an event in the monitoring area based on a preset detecting condition from the first data;

a notifying control step of controlling the event notification based on the status of the event detected by the processing in said event detecting step;

a presenting control step of controlling a presenting operation of second data which is outputted based on the monitoring operation of the monitoring area by a second sensor on the event controlled to be notified by the processing in said notifying control step;

an input obtaining step of inputting an estimation whether or not the notification of a user is to be performed for the second data presented under the control by the processing in said presenting control step; and a detecting condition adjusting step of adjusting the detecting condition based on feature data indicating a feature of the event based on the event status and the input for estimating whether or not the notification is to be performed, obtained by the processing in said input obtaining step, wherein during the presenting control step a first event occurrence and a second event occurrence are detected, and wherein during the notifying control step the user is notified when the first event occurrence is detected, and the user is not notified during the notifying control step when the second event occurrence is detected.

13. A recording medium for storing a program, said program comprising:

a data obtaining step of obtaining first data based on a monitoring operation of a monitoring area by a first sensor;

an event detecting step of detecting a status of an event in the monitoring area based on a preset detecting condition from the first data;

a notifying control step of controlling the event notification based on the status of the event detected by the processing in said event detecting step;

a presenting control step of controlling a presenting operation of second data which is outputted based on the monitoring operation of the monitoring area by a second sensor on the event controlled to be notified by the processing in said notifying control step;

an input obtaining step of inputting an estimation whether or not the notification of a user is to be performed for the second data presented under the control by the processing in said presenting control step; and a detecting condition adjusting step of adjusting the detecting condition based on feature data indicating a feature of the event based on the event status and the input for estimating whether or not the notification is to be performed, obtained by the processing in said input obtaining step, wherein during the presenting control step a first event occurrence and a second event occurrence are detected, and wherein during the notifying control step the user is notified when the first event occurrence is detected, and the user is not notified during the notifying control step when the second event occurrence is detected.

14. A computer readable medium encoded with a program, the program performing a method comprising:

a data obtaining step of obtaining first data based on a monitoring operation of a monitoring area by a first sensor;

an event detecting step of detecting a status of an event in the monitoring area based on a preset detecting condition from the first data;

a notifying control step of controlling the event notification based on the status of the event detected by the processing in said event detecting step;

a presenting control step of controlling a presenting operation of second data which is outputted based on the monitoring operation of the monitoring area by a second sensor on the event controlled to be notified by the processing in said notifying control step;

an input obtaining step of inputting an estimation whether or not the notification of a user is to be performed for the second data presented under the control by the processing in said presenting control step; and a detecting condition adjusting step of adjusting the detecting condition based on feature data indicating a feature of the event based on the event status and the input for estimating whether or not the notification is to be performed, obtained by the processing in said input obtaining step, wherein during the presenting control step a first event occurrence and a second event occurrence are detected, and wherein during the notifying control step the user is notified when the first event occurrence is detected, and the user is not notified during the notifying control step when the second event occurrence is detected.

15. An information processing apparatus comprising:

first obtaining means for obtaining feature data indicating a feature of an event based on a status of the event detected under a preset detecting condition by a monitoring operation of a monitoring area by a first sensor, and which obtains data on the event outputted by a second sensor;

presenting control means for controlling a presenting operation of data outputted by said second sensor obtained by said first obtaining means, the presenting control means detecting a first event occurrence and a second event occurrence;

second obtaining means for obtaining an input for estimating whether or not notification of a user is to be performed for the data presented under the control of said presenting control means and which is outputted by said second sensor;

detecting condition adjusting means for adjusting the detecting condition based on the feature data of the event obtained by said first obtaining means and the input for estimating whether or not the notification is to be performed, obtained by said second obtaining means; and means for notifying the user when the first event occurrence is detected, the means for notifying not notifying the user when the second event occurrence is detected.

16. An information processing apparatus according to claim 15, further comprising:

sending means for sending the detecting condition to another information processing apparatus.

17. An information processing apparatus according to claim 15, further comprising:

determining information generating means for generating determining information for determining, based on the feature data of the event and the input for estimating whether or not the notification is to be performed, whether or not the event notification is to be performed.

18. An information processing apparatus according to claim 17, wherein, when the estimation of notification need of the user of the event obtained by said second obtaining means for the event does not match the determining result based on the determining information that the notification of the event is to be performed, said detecting condition adjusting means adjusts the detecting condition to a second detecting condition.

19. An information processing apparatus according to claim 17, further comprising:

sending means for sending the determining information to another information processing apparatus.

20. An information processing apparatus according to claim 15, wherein said first obtaining means further obtains data on the event which is outputted based on the monitoring operation of the monitoring area by said first sensor, and said detecting condition adjusting means adjusts the detecting condition based on the feature data of the event, the input for estimating of the notification need, and the data on the event which is outputted by said first sensor.

21. An information processing apparatus according to claim 20, further comprising:

determining information generating means for generating determining information that determines whether or not notification of the event is to be performed, based on the input for estimating on the notification need and the feature data of the event; and storing means for correlating the data on the event outputted by the first sensor, the feature data of the event, and the input for estimating whether or not notification is to be performed with each other, wherein said detecting condition adjusting means adjusts the detecting condition, based on the feature data of the event and the input for estimating whether or not the notification is to be performed which are stored by said storing means and the first data on the event stored by said storing means, so that the estimation whether or not the notification of the event from the user obtained by said input obtaining means matches the determining result based on the determining information that the event notification is to be performed.

22. An information processing apparatus according to claim 21, wherein said detecting condition adjusting means updates the feature data of the event stored by said storing means, based on the data on the event outputted by the first sensor and stored by said storing means and the detecting condition adjusted by said detecting condition adjusting means, and said determining information generating means generates the determining condition, based on the feature data of the updated event and the input for estimating whether or not the notification is to be performed, which is stored by said storing means.

23. An information processing apparatus according to claim 15, wherein the detecting condition is a threshold for comparing the number of the data outputted by said first sensor for a current predetermined period, and said detecting condition adjusting means adjusts the threshold.

24. An information processing method comprising:

a first obtaining step of obtaining data on an event detected under a preset detecting condition and outputted by a second sensor by a monitoring operation of a monitoring area of a first sensor;

a presenting control step of controlling a presenting operation of the data outputted by said second sensor and obtained by the processing in said first obtaining step;

a second obtaining step of obtaining feature data indicating a feature of the event based on a status of the event detected by said first sensor;

a third obtaining step of obtaining an input for estimating whether or not notification of the data presented under the control of the processing in said presenting control step and which is outputted by said second sensor to a user is to be performed;

a detecting condition adjusting step of adjusting the detecting condition based on the feature data of the event obtained by the processing in said second obtaining step and the input for estimating whether or not the notification is to be performed, obtained by the processing in said third obtaining step;

detecting a first event occurrence and a second event occurrence; and notifying the user when the first event occurrence is detected while not notifying the user when the second event occurrence is detected.

25. A recording medium for recording a program, said program for executing monitoring processing based on data outputted by a sensor, said program comprising:

a first obtaining step of obtaining data on an event detected under a preset detecting condition and outputted by a second sensor by a monitoring operation of a monitoring area of a first sensor;

a presenting control step of controlling a presenting operation of the data outputted by said second sensor obtained by the processing in said first obtaining step;

a second obtaining step of obtaining feature data indicating a feature of the event based on a status of the event detected by said first sensor;

a third obtaining step of obtaining an input for estimating whether or not notification of the data presented under the control of the processing in said presenting control step and which is outputted by said second sensor to a user is to be performed;

a detecting condition adjusting step of adjusting the detecting condition based on the feature data of the event obtained by the processing in said second obtaining step and the input for estimating whether or not the notification is to be performed, obtained by the processing in said third obtaining step;

detecting a first event occurrence and a second event occurrence; and notifying the user when the first event occurrence is detected while not notifying the user when the second event occurrence is detected.

26. A computer readable medium encoded with a program, the program performing a method comprising:

a first obtaining step of obtaining data on an event detected under a preset detecting condition and outputted by a second sensor by a monitoring operation of a monitoring area of a first sensor;

a presenting control step of controlling a presenting operation of the data outputted by said second sensor obtained by the processing in said first obtaining step;

a second obtaining step of obtaining feature data indicating a feature of the event based on a status of the event detected by said first sensor;

a third obtaining step of obtaining an input for estimating whether or not notification of the data presented under the control of the processing in said presenting control step and which is outputted by said second sensor to a user is to be performed;

a detecting condition adjusting step of adjusting the detecting condition based on the feature data of the event obtained by the processing in said second obtaining step and the input for estimating whether or not the notification is to be performed, obtained by the processing in said third obtaining step;

detecting a first event occurrence and a second event occurrence; and notifying the user when the first event occurrence is detected while not notifying the user when the second event occurrence is detected.

27. A monitoring system comprising:

a first sensor configured to output first data based on a monitoring operation of a monitoring area;

a second sensor configured to output second data based on the monitoring operation of the monitoring area;

an event detecting unit configured to detect a status of an event in the monitoring area based on a preset detecting condition from the first data;

a notifying control unit configured to control notification of the event based on the status of the event detected by said event detecting unit;

a presenting control unit configured to control a presenting operation of the second data outputted from said second sensor on the event that is controlled to be notified by said notifying control unit, the presenting control unit configured to detect a first event occurrence and a second event occurrence;

an input obtaining unit configured to obtain an input for estimating whether or not the notification of a user is to be performed for the second data presented under the control of the presenting control unit, the input obtaining unit notifying the user when the first event occurrence is detected and not notifying the user when the second event occurrence is detected; and a detecting condition adjusting unit configured to adjust the detecting condition based on feature data indicating a feature of the event based on the event status and the input for estimating whether or not the notification obtained by said input obtaining unit is to be performed.

28. An information processing apparatus comprising:

a first obtaining unit configured to obtain feature data indicating a feature of an event based on a status of the event detected under a preset detecting condition by a monitoring operation of a monitoring area by a first sensor, and which obtains data on the event outputted by a second sensor;

a presenting control unit configured to control a presenting operation of data outputted by said second sensor obtained by said first obtaining unit, the presenting control unit configured to detect a first event occurrence and a second event occurrence;

a second obtaining unit configured to obtain an input for estimating whether or not the notification of a user is to be performed for the data presented under the control of said presenting control unit and which is outputted by said second sensor;

a detecting condition adjusting unit configured to adjust the detecting condition based on the feature data of the event obtained by said first obtaining unit and the input for estimating whether or not the notification is to be performed, obtained by said second obtaining unit; and a notifying unit configured to notify the user when the first event occurrence is detected, the notifying unit configured not to notify the user when the second event occurrence is detected.

* * * * *